United States Patent
Lue

(10) Patent No.: US 7,337,392 B2
(45) Date of Patent: Feb. 26, 2008

(54) METHOD AND APPARATUS FOR ADAPTING WEB CONTENTS TO DIFFERENT DISPLAY AREA DIMENSIONS

(76) Inventor: Vincent Wen-Jeng Lue, 1484 Owen Sound Dr., Sunnyvale, CA (US) 94087

( * ) Notice: Subject to any disclaimer, the term of this patent is extended or adjusted under 35 U.S.C. 154(b) by 654 days.

(21) Appl. No.: 10/757,840

(22) Filed: Jan. 14, 2004

(65) Prior Publication Data

US 2004/0148571 A1    Jul. 29, 2004

Related U.S. Application Data

(60) Provisional application No. 60/442,873, filed on Jan. 27, 2003.

(51) Int. Cl.
*G06F 15/00* (2006.01)
(52) U.S. Cl. .................... 715/513; 715/514
(58) Field of Classification Search ............ 715/513, 715/514
See application file for complete search history.

(56) References Cited

U.S. PATENT DOCUMENTS

| | | | |
|---|---|---|---|
| 5,513,315 A * | 4/1996 | Tierney et al. ............... 714/37 |
| 5,845,126 A * | 12/1998 | Ju et al. .................... 717/114 |
| 6,167,409 A | 12/2000 | DeRose et al. | |
| 6,396,495 B1 * | 5/2002 | Parghi et al. ............... 345/426 |
| 6,430,624 B1 | 8/2002 | Jamtgaard et al. | |
| 6,535,896 B2 | 3/2003 | Britton et al. | |
| 6,640,307 B2 * | 10/2003 | Viets et al. ................. 726/15 |
| 6,646,652 B2 * | 11/2003 | Card et al. ................. 345/645 |
| 6,678,889 B1 * | 1/2004 | Burkett et al. ............. 718/104 |
| 6,725,424 B1 | 4/2004 | Schwerdtfeger et al. | |
| 2002/0065857 A1 * | 5/2002 | Michalewicz et al. ...... 707/532 |
| 2002/0083054 A1 * | 6/2002 | Peltonen et al. ............... 707/5 |
| 2002/0118214 A1 * | 8/2002 | Card et al. .................. 345/619 |
| 2002/0133637 A1 * | 9/2002 | Popp et al. ................. 709/315 |
| 2002/0135800 A1 * | 9/2002 | Dutta ........................ 358/1.15 |
| 2003/0018668 A1 * | 1/2003 | Britton et al. ............. 707/513 |
| 2003/0145062 A1 * | 7/2003 | Sharma et al. ............. 709/217 |
| 2004/0044963 A1 * | 3/2004 | Uchiyama et al. .......... 715/513 |
| 2004/0064475 A1 * | 4/2004 | Maeda et al. ........... 707/103 Y |
| 2004/0205694 A1 * | 10/2004 | James et al. ................ 717/104 |

(Continued)

OTHER PUBLICATIONS

Abiteboul et al., Compact Labeling Schemes for Ancestor Queries, ACM Jan. 2001; pp. 547-556.*

Eddy et al., An Algorithm for Efficiently Generating Summary Paragraphs Using Tree-adjoining grammar, ACM Jul. 2001, pp. 1-8.*

(Continued)

*Primary Examiner*—Cong-Lac Huynh

(57) ABSTRACT

A method is disclosed to generate, while preserving text, image, transactional and embedded presentation constraint information, a minimum set of simplified and navigable web contents from a single web document that is oversized for targeted smaller devices. The method includes a parser, a content tree builder, a document tree builder, a document simplifier, a virtual layout engine, a document partitioner, a content scalar and a markup generator. The parser generates markup and data tags from an HTML source document. The builder constructs a content tree. The simplifier transforms the document tree into an intermediate one defined by a subset of XHTML tags and attributes. Layout constraints, including size, area, placement order, and column/row relationships, are calculated for partitioning and scaling the document tree into sub document trees with assigned navigation order and hierarchical hyperlinks. A simplified HTML document is then generated with the markup generator.

62 Claims, 45 Drawing Sheets

U.S. PATENT DOCUMENTS

| | | | |
|---|---|---|---|
| 2004/0215665 A1* | 10/2004 | Edgar et al. | 707/200 |
| 2005/0071364 A1* | 3/2005 | Xie et al. | 707/102 |
| 2005/0081142 A1* | 4/2005 | Popp et al. | 715/513 |
| 2005/0102322 A1* | 5/2005 | Bagley et al. | 707/104.1 |
| 2005/0108732 A1* | 5/2005 | Musson et al. | 719/328 |
| 2005/0228787 A1* | 10/2005 | Linden et al. | 707/3 |
| 2006/0005174 A1* | 1/2006 | Feigenbaum et al. | 717/143 |
| 2006/0168095 A1* | 7/2006 | Sharma et al. | 709/217 |
| 2007/0009179 A1* | 1/2007 | Easwar | 382/276 |
| 2007/0051685 A1* | 3/2007 | Wittmer et al. | 210/695 |
| 2007/0185959 A1* | 8/2007 | Huck et al. | 709/204 |

OTHER PUBLICATIONS

Ko et al., A Structured Documents Retrieval Method Supporting Attribute-based Structure Information, ACM 2002, pp. 668-674.*

Fuller et al., Structured Answers for a Large Structured Document Collection, ACM 1993, pp. 204-213.*

Adelberg, NoDoSE- A Tool for Semi-Automatically Extracting Structured and Semistructred Data from Text Documents, ACM 1998, pp. 283-294.*

Mamas et al., Towards Portable Source Code Representations Using XML, IEEE 2000, pp. 172-182.*

* cited by examiner (a) Insert F as right of B under P (b) Insert F as left of D under P (c) Insert F as between A and E under P (d) Insert F between B and D under P (b) Table Simplifier (c) TR Simplifier (e) Img Simplifier (f) Iframe Simplifier (a) Steps to Split a T Rooted Tree with Selected Content Child Nodes N0, N1, ... Nk: Split(T, N0, N1, ... Nk)

(b) Split(T, N2, N3, N4, N5)

"... lots of text data and more data ..."

"... lots of text data"          "and more data ..."

METHOD AND APPARATUS FOR ADAPTING WEB CONTENTS TO DIFFERENT DISPLAY AREA DIMENSIONS

CROSS-REFERENCE TO RELATED APPLICATIONS

This application is based upon and claims the benefit of U.S. Provisional Application No. 60/442,873, filed Jan. 27, 2003.

BACKGROUND OF THE INVENTION

1. Field of the Invention

The present invention relates generally to automatic markup language based digital content transcoding and, more specifically, it relates to a method to simplify, split, scale and hyperlink HTML web content for providing a new method to repurpose legendary web content authored for desk top viewing to support smaller devices using limited network bandwidth such as palmtops, PDAs and data-enabled cell phones wirelessly connected with small display areas and processing capacities.

2. Description of the Related Art

With the popular use of Internet, vast and still growing amount of content have been made available through typical desktop browsers such as Internet Explorer (from Microsoft), Navigator (from AOL), and Opera (from Opera). They are coded in standard markup languages such as HTML and JavaScript. However, majority of them have been authored to fit regular desktop or notebook computers with large screen size, big processing capacity connected with high speed network.

As the web steadily increases its reach beyond the desktop to devices ranging from mobile phones, palmtops, PDAs and domestic appliances, problem in accessing legendary web content start to surface. Constraints from form factor and processing capacity render them practically useless on these devices. To solve this device dependency problem, one most cost effective approach is to provide intermediary adaptation in the content delivery chain.

Examples such as transcoding proxies can transform markup languages by removing HTML tags, reformatting table cells as text, converting image file formats, reducing image size, reducing image color depths, and translating HTML into other markup languages, e.g. WML, CHTML, and HDML. More involved approaches extract subsets of original content, either automatically or manually, or employ text summarizing techniques to condense the target content. Even more elaborated systems include client components using proprietary protocols between intermediaries and corresponding programs running in client devices to emulate standard browser interfaces, such as Zframeworks from Zframe Inc.

The main problem with conventional markup content transcoding is its inability to handle the sheer volume of content, both text and images, etc. inside the document for small devices. Arbitrary linear approach to partition the content based on markup language codes often makes the results unorganized with the original presentation intent lost. Summary techniques second guess the author's intent and are not able to always satisfy user's need.

Another problem with conventional markup content transcoding is its inability to handle common hidden semantics inside web documents such as HTML tables. However, authors are increasingly marking up content with presentation rather than semantic information and render the adapted content unusable.

Another problem with conventional markup content transcoding is its complexity in supporting new devices with different form factors. Instead of gracefully scaling the target transcoding result from small to large display devices, it relies on case-by-case settings requiring expensive development effort to support new devices.

Another problem with some conventional markup content transcoding is reliant on manual customizations to edit, select or annotate original content to assist adaptation process, which tends to be costly, error prone and not readily scalable.

Another problem with some conventional markup content transcoding is its dependency on specialized client software. Both deploying proprietary software to various client devices and administrating/configuring server adaptation engine increase cost significantly. This defies the original purpose of automatic content adaptation in place of adopting complete content re-authoring.

In these respects, Content Divide & Condense, the method to generate and scale document partitions with navigational links from single web content according to the present invention substantially departs from the conventional concepts and designs of the prior art, and in so doing provides an apparatus primarily developed for the purpose of providing a new method to transcode web content authored for desk top viewing into smaller ones to accommodate small display areas and capacities in mobile devices.

SUMMARY OF THE INVENTION

In view of the foregoing disadvantages inherent in the known types of markup content transcoding now present in the prior art, the present invention provides a new method, hereby named Content Divide & Condense, to simplify, partition, scale, and structure single content page onto hyperlinked and ordered set of content pages suitable for small device viewing before direct transcoding from HTML to the target markup language is applied, wherein the same can be utilized for providing a new method to transcode web content authored for desk top viewing into smaller ones to accommodate small display areas and capacities in mobile devices.

The general purpose of the present invention, which will be described subsequently in greater detail, is to provide a method to generate a minimum set of simplified and easily navigable web contents from a single web document, over-sized for targeted small devices, while preserving all text, image, transactional as well as embedded presentation constraint information. Each of the simplified web content fits in display size and processing/networking capacity constraints of the target device. The whole set of generated pages are hyperlinked and ordered according to the intended two dimensional navigation semantics embedded inside the original content. A subset of XHTML is adopted to define the kind of content to be extracted from the original document. With the reduced content complexity in each partitioned page and the preserved navigational organization from original content, final set of documents after applying direct transcoding from each HTML partition to target markup language represent a much more accurate presentation with respect to the original content yet suitable for small device viewing.

To attain this, the present invention, named as Content Divide & Condense, generally comprises HTML parser, content tree builder, document tree builder, document simplifier, virtual layout engine, document partitioner, content scalar, and markup generator. The parser generates a list of markup and data tags out of HTML source document. It handles script-generated content on the fly and redirected content fetch similar to how common web browsers behave. Based on a specific set of layout tags, the builder constructs a content tree out of the markup and data tags. It interprets loosely composed HTML document following a set of heuristic rules to be compatible with how standard browsers work. This builder completes document tree build from the rest of markup and data tags on top of content element tree. It also adjusts the tree structure to be in compliant with XML specification without changing rendering semantics of the source HTML document interpreted by common browsers. The simplifier transforms the document tree onto an intermediate one defined by a subset of XHTML tags and attributes through filtering and mapping operations on tree nodes. Spatial layout constraints are heuristically estimated and calculated for data and image content embedded inside the document tree according to the semantics of HTML tags. Layout constraints include size, area, placement order, and column/row relationships. Based on the display size and rendering/network capacity constraints, the document tree is partitioned into a set of sub document trees with added hyperlinks and order according to the layout order and content structure. With target device display size constraint, each sub document tree is scaled individually by adjusting height and width attributes through the scalar. Source image references are modified if needed to assure server side image transcoding capability is leveraged. Each document tree defines a simplified HTML document which is generated during the markup generation step. Navigation order and hierarchical hyperlinks are assigned at the same time. The original content is thus represented by the set of smaller documents with hyperlinks and order defined between each other. Additional files such as catalog file indicating network bandwidth required for each document or text only document partitions can be generated and hyperlinked together in the same manner. Each simplified document can be transcoded onto target markup languages such as WML and cached by applying available direct transcoding technique.

There has thus been outlined, rather broadly, the more important features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a method to simplify, split, scale, and structure web content for small devices that will overcome the shortcomings of the prior art devices.

An object of the present invention is to provide a method to simplify web content to contain only the most primitive parts such as texts, images, forms, hyperlinks, and layout presentation arrangements etc., supported by standard markup language browsers for small devices.

An object of the present invention is to provide a method to extract web content to contain only the selected parts, such as text only with images as text links, or forms only, while preserving layout presentation arrangements etc. supported by standard markup language browsers for small devices.

Another object is to provide a method to split two dimensional layout arrangement such as tables, framesets and alignment to fit content display to the screen width constraint of the target device.

Another object is to provide a method to partition web content along both logical and embedded layout structure according to display area and capacity constraints of the target client device.

Another object is to provide a method to apply minimal scaling to each document partition individually to fit in target device display width constraint.

Another object is to provide a method to present the original web content by a set of hyperlinked and ordered document partitions according to the two-dimensional navigation order embedded inside the original document.

Another object is to provide a method to utilize target device display size and resource capacities to partition the document by conducting virtual layout against the original content represented by a markup language.

Another object is to provide a method to present a hyperlinked catalog content indicating the required network bandwidth required for accessing each document partition from the target device.

Other objects and advantages of the present invention will become obvious to the reader and it is intended that these objects and advantages be within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
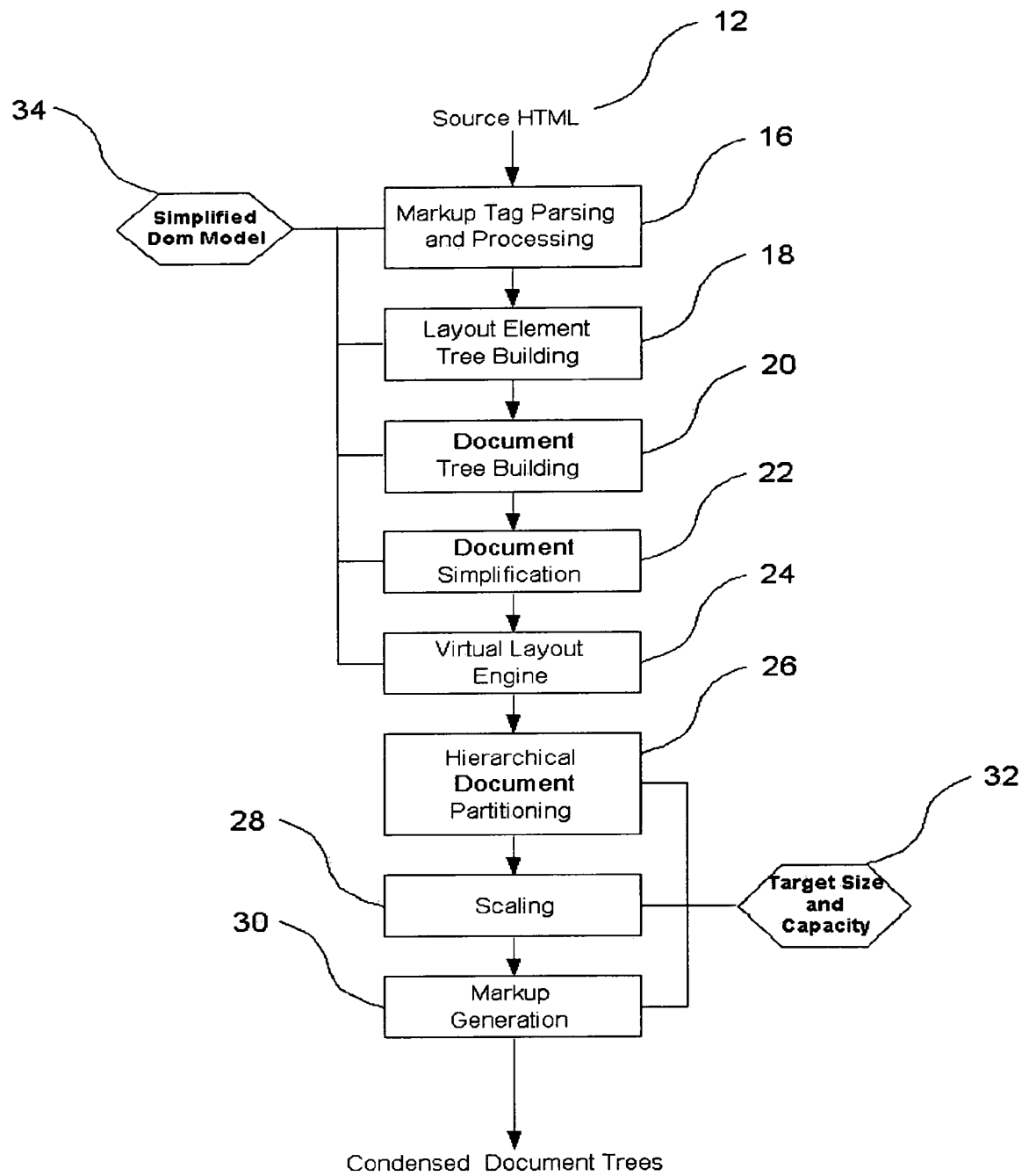
FIG. 1 is to illustrate the function of Content Divide & Condense.

Turning now descriptively to the drawings, the attached figures illustrate a method to generate and scale document partitions with navigation links from single web content for small device viewing, as shown in FIG. 1 which comprises HTML parser 16, content tree builder 18, document tree builder 20, document simplifier 22, virtual layout engine 24, document partitioner 26, content scalar 28, and markup generator 30. The parser 16 generates a list of markup and data tags out of HTML source document 12. It handles script generated content on the fly and redirected content fetch similar to how common web browsers behave. Based on a specific set of layout tags, the builder 18 constructs a content tree out of the markup and data tags. It interprets loosely composed HTML document following a set of heuristic rules 34 to be compatible with the manner how standard browsers work. This builder 18 completes document tree build from the rest of markup and data tags on top of content element tree. It also adjusts the tree structure to be in compliant with XML specification without changing rendering semantics of the source HTML 12 document interpreted by common browsers. The simplifier 22 transforms the document tree onto an intermediate one defined by a subset of XHTML tags and attributes through filtering and mapping operations on tree nodes. Spatial layout constraints are heuristically estimated and calculated for data and image content embedded inside the document tree according to the semantics of HTML tags. Layout constraints include size, area, placement order, and column/row relationships. Based on the display size and rendering/network capacity constraints, the document tree is partitioned into a set of sub document trees with added hyperlinks and order according to the layout order and content structure. With target device display size constraint 32, each sub document tree is scaled individually by adjusting height and width attributes through the scalar 28. Source image references are modified if needed to assure that the server side image transcoding capability is leveraged. Each document tree defines a simplified HTML document which is generated during the markup generation 30 step. Navigation order and hierarchical hyperlinks are assigned at the same time. The original content is thus represented by the set of smaller documents with hyperlinks and order defined between each other. Additional files such as catalog files indicating network bandwidth required for each document or text only document partitions can be generated and hyperlinked together in the same manner. Each simplified document can be transcoded onto target markup languages such as WML and cached by applying an available direct transcoding technique.

Figure 2:
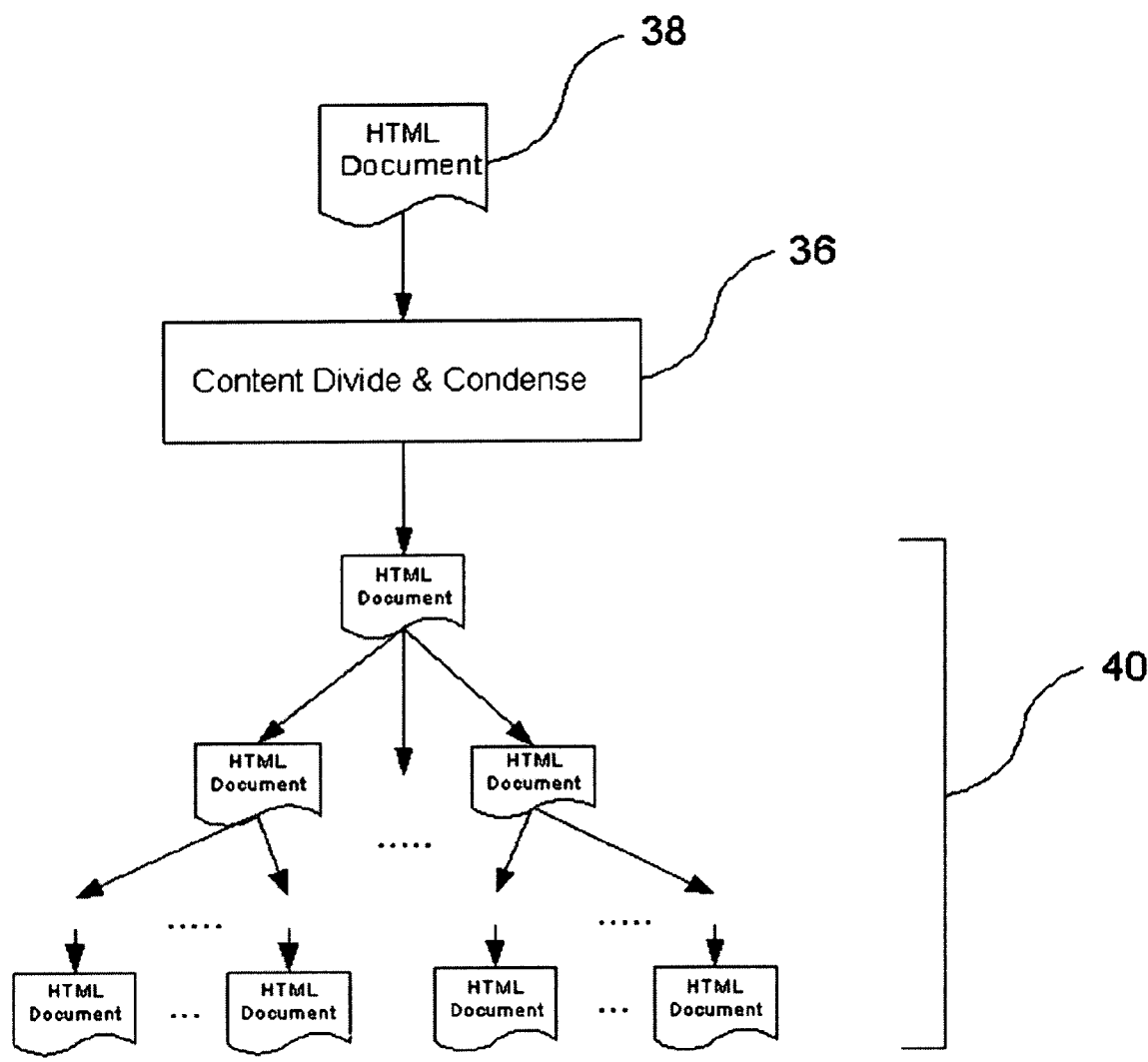
FIG. 2 is to show Content Divide & Condense working as part of a transcoding server.

Turning now to FIG. 2, overall effects of Content Divide & Condense 36 is illustrated. Input to the engine is a single web document such as HTML page 38. The engine then generates a set of simplified and small HTML documents 40 hyperlinked together. A linear navigation order is also assigned to each partition document.

The engine could process the same document with more than one settings at the same time. For example, it generates the partition both with and without images to allow the flexibility to turn on or off the image content while ensuring device capacity is fully utilized. The same text paragraph could appear in two partitions, one consists of only text data and the other contains also image links. Because image capacity is replaced by text data, these two partition documents can not be transcoded directly between each other by adding or removing image links. However, cross links can be inserted such that it is possible to access text data as preview and retrieve full image embedded one when interested.

Figure 3:
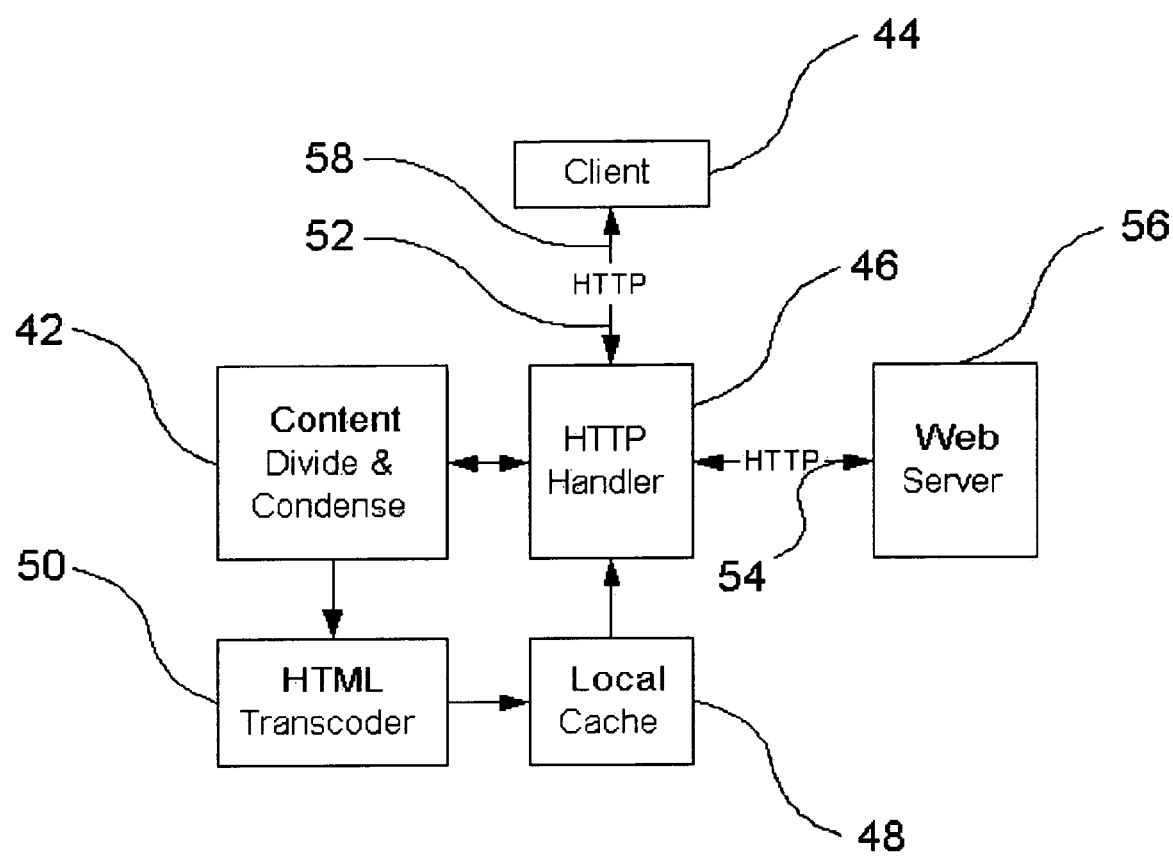
FIG. 3 is to show Content Divide & Condense working as part of a proxy server.
Figure 4:
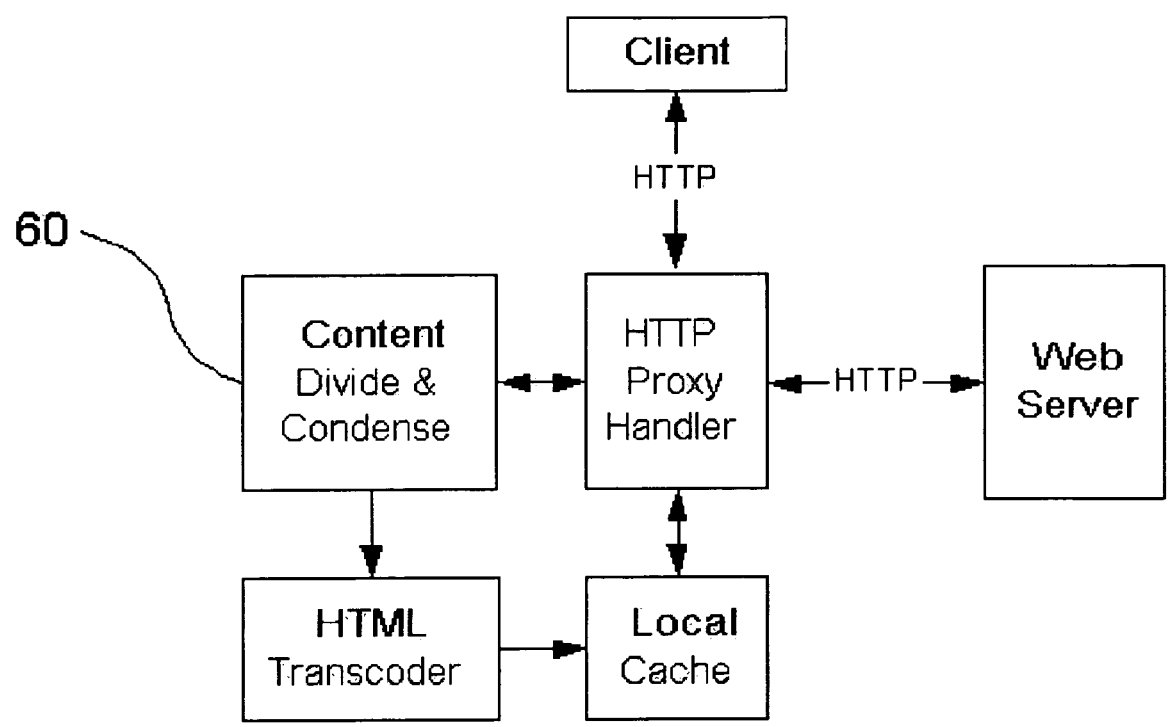
FIG. 4 is to show Content Divide & Condense working as part of a web server.
Figure 5:
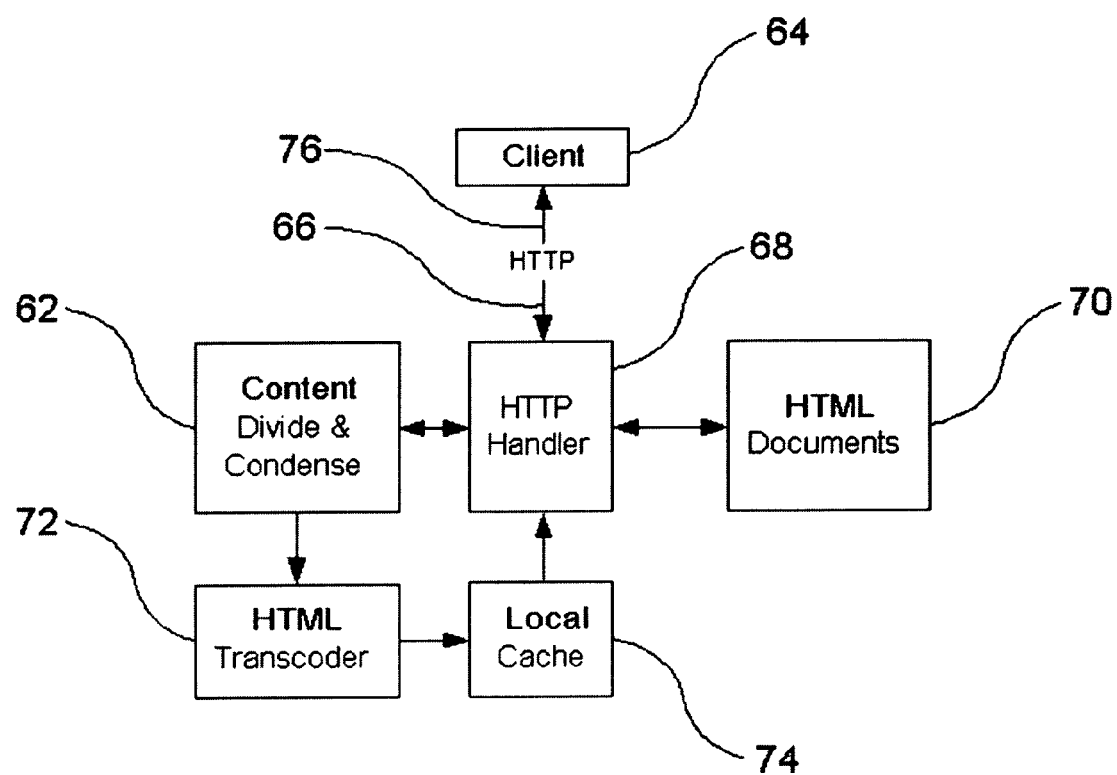
FIG. 5 is to show affects and steps of content reduction engine.

Systems with Content Divide & Condense working together with client device and other servers are shown in FIG. 3, FIG. 4, and FIG. 5, as examples. Referring to FIG. 3, a transcoding server consists of HTTP handler component 46, a local cache 48, HTML transcoder 50 and Content Divide & Condense 42. The client 44 sends an HTTP request 52 along with client agent id to the transcoding server with an URL referencing a web content from the Web Server 56. The HTTP Handler 46 then sends another HTTP request 54 to the Web Server 56 for the document identified by the URL from the client request 52. Web Server 56 returns the document to the HTTP Handler 46, which passes the document along with a client agent id through Content Divide & Condense 42, which generates a set of hyperlinked and simplified document partitions along with pre-fetched and properly scaled images. Each partition is then passed through an HTML Transcoder 50 to map HTML onto target ML language for the client and stored in the local cache 48 along with scaled images. The HTTP Handler 46 selects the first page from the local cache 48 and returns to the client 44 as part of HTTP response 58.

Referring to FIG. 4, Content Divide & Condense 60 works as part of an HTTP Proxy Server. It works similarly as in FIG. 3. The differences are source link updates and HTTP request/response cache. There is no need to resolve absolute source links when working as the HTTP Proxy Server. By default, HTTP request/response pairs are cached and cache hit is always checked before making remote fetch.

Referring to FIG. 5, Content Divide & Condense 62 works as part of an HTTP Server. The client 64 sends an HTTP request 66 along with the client agent id to the server. The HTTP Handler 68 fetches the target HTML document 70 from local storage. Based on the client agent id, the HTTP Handler 68 determines whether to send the document back directly or pass the client agent id and document to Content Divide & Condense 62. If transcoding is needed, Content Divide & Condense 62 generates a set of hyperlinked and simplified document partitions along with properly scaled images. Each partition is then passed through an HTML Transcoder 72 to map HTML onto target ML language for the client 64 and stored in the local cache 74 along with scaled images. HTTP Handler 68 selects the first transcoded page from the local cache 74 and returns to the client 64 as part of HTTP response 76.

Figure 6:
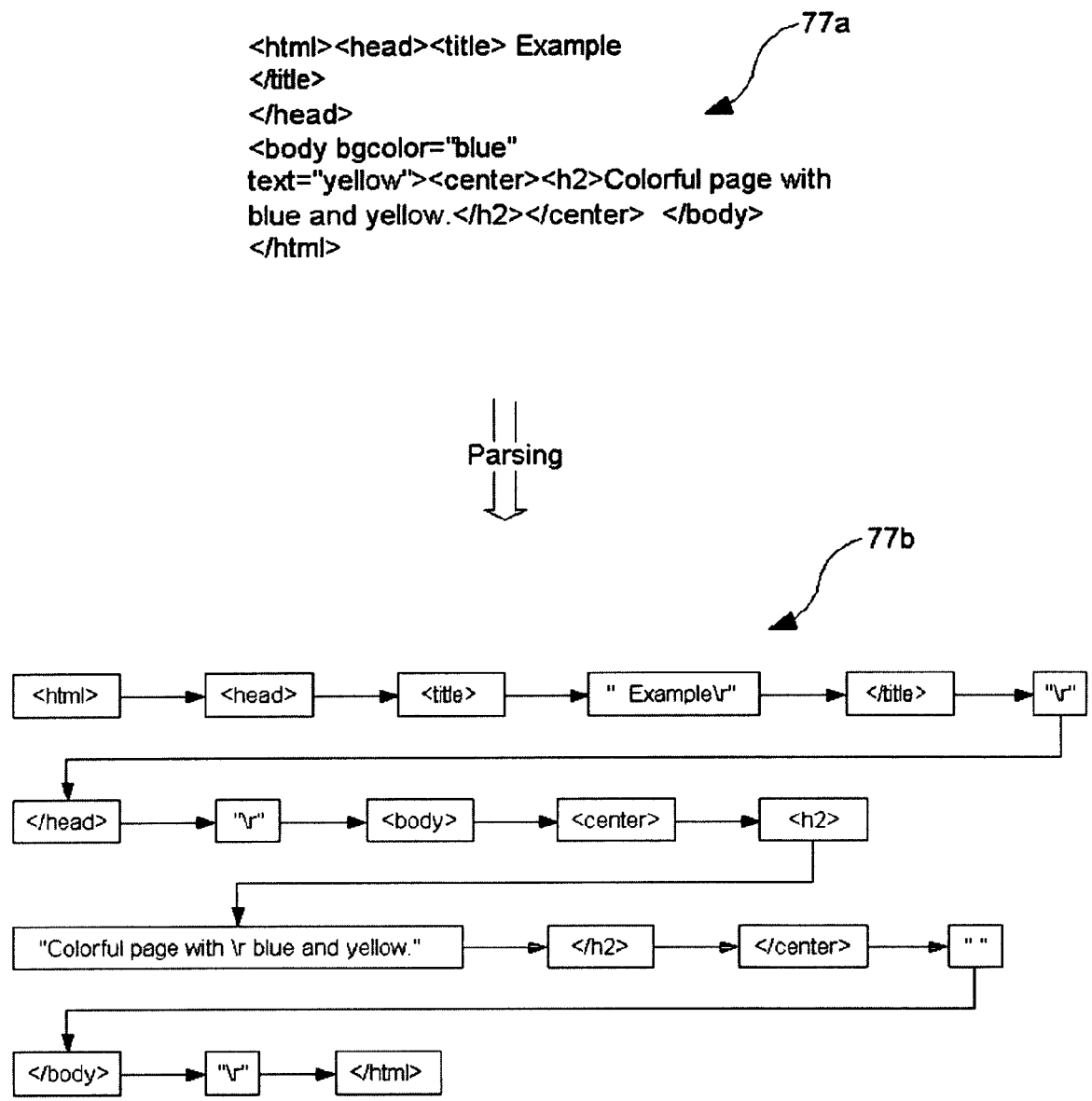
FIG. 6 is an example showing sample HTML code and the corresponding markup and data list.
Figure 7:
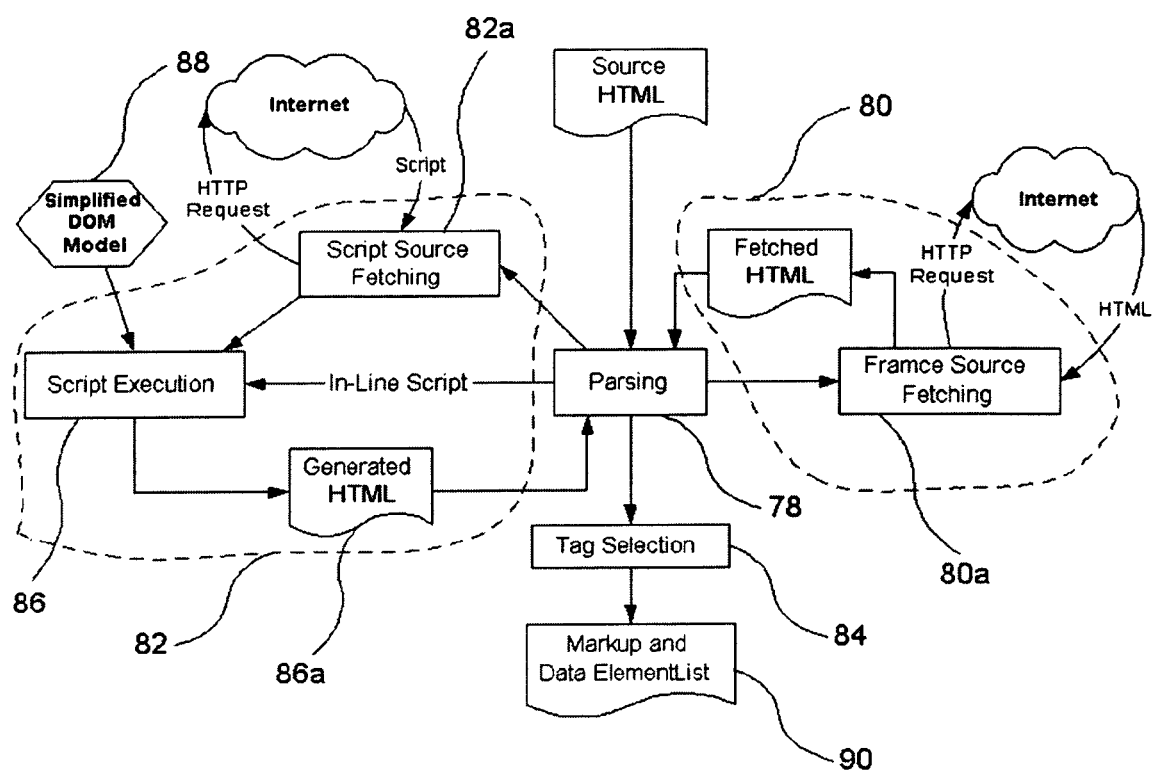
FIG. 7 is to show steps to parse source HTML document into markup and data element list.

The HTML parser translates input HTML document into a list of markup and tags similar to what common browsers do. Each element of the list is either a markup with its attributes or a block of raw data, such as text data or script codes. An example of HTML code sample 77a and its corresponding markup and data list 77b is shown in FIG. 6. The overall steps are shown in FIG. 7, including a syntactic parser 78, frame source handler 80, script source handler 82 and final tag list selector 84.

When the parser 78 encounters <FRAME> tag, source links inside the tag are resolved and corresponding document fetched 80a/parsed 78 on the fly. <FRAME> source is inserted into the original tag list right after the corresponding <FRAME> tag with an added </FRAME> tag at the end to enclose it. The process continues recursively as shown in FIG. 7.

When the parser 78 encounters <SCRIPT> tag, JavaScript source codes are executed by a JavaScript engine 86 with a simplified document object model 88. Source links are followed to fetch remote codes 82a, if there is any. The simplified document object model 88 supports both document.write and document.writeln functions and is capable of generating HTML content 86a on the fly. The in-line generated codes, if there is any, are parsed by the parser 78 and the resulting tag list is inserted right after the corresponding <SCRIPT> tag. This process runs recursively as shown in FIG. 7. The document object model could be expanded when needed by implementing additional objects and functions, including handling of specific client and/or user browser settings, cookies, etc.

After parser 78 exhausts all input sources, HTML tags requiring exclusive-or selection or filtering are handled before final list 90 is generated. They include <SCRIPT> vs. <NOSCRIPT>, <FRAME> vs. <NOFRAME>, and <EMBED> vs. <NOEMBED>, <LAYER> vs. <NOLAYER>. The parser tag selection 84 ignores <NOSCRIPT>, <NOFRAME>, and <EMBED> tags. These tags and all source markup data enclosed are left out from final tag list. Capability for the parser tag selection 84 to select an intended subset of tag list from the source document could readily be added. Depending on target client device context and document semantics, the parser might have an option to choose <NOFRAME> instead of <FRAME>, <NOSCRIPT> instead of <SCRIPT>, <EMBED> instead of <NOEMBED>, <LAYER> instead of <NOLAYER>, etc. Additional tags accepted as standards moving forward could also be supported in the similar manner.

The content tree builder constructs a tree out of the set of content markup elements based on the tag list generated by the parser. An HTML tag is considered content element if it designates directly an actual layout area when the content is rendered. The set of HTML tags considered content elements are listed in Table 1(a). These tags are different from those specifying mainly display styles, user interface context, or executable script codes such as those shown in Table 2(b). The set of content tags are focused first to simplify handling of many loosely composed HTML documents where style and context tags are not required to follow strict XML structures.

TABLE 1(a)

A Table of Content Tag List for HTML
Content Tag

| a | abbr | acronym | address | applet | area | base | blockquote |
|---|---|---|---|---|---|---|---|
| body | br | button | caption | col | colgroup | del | dfn |
| dd | dir | div | dl | dt | embed | fieldset | frame |
| frameset | h1 through h6 | head | html | hr | iframe | ilayer | img |
| input | ins | isindex | label | layer | legend | li | link |
| map | marquee | menu | meta | multicol | noembed | noframes | noscript |
| object | ol | optgroup | option | p | param | pre | samp |
| select | spacer | span | style | table | tbody | td | textarea |
| tfoot | th | thead | title | tr | ul | xmp | wbr |

TABLE 1(b)

A Table of Style/Context Tag List for HTML
Style and Context Tag

| b   | basefont | bdo | big   | blink  | center | cite   | code | em  | font | form | i |
| --- | -------- | --- | ----- | ------ | ------ | ------ | ---- | --- | ---- | ---- | - |
| kbd | q        | s   | small | strike | strong | sub    | sup  | tt  | u    | var  |   |

Figure 8:
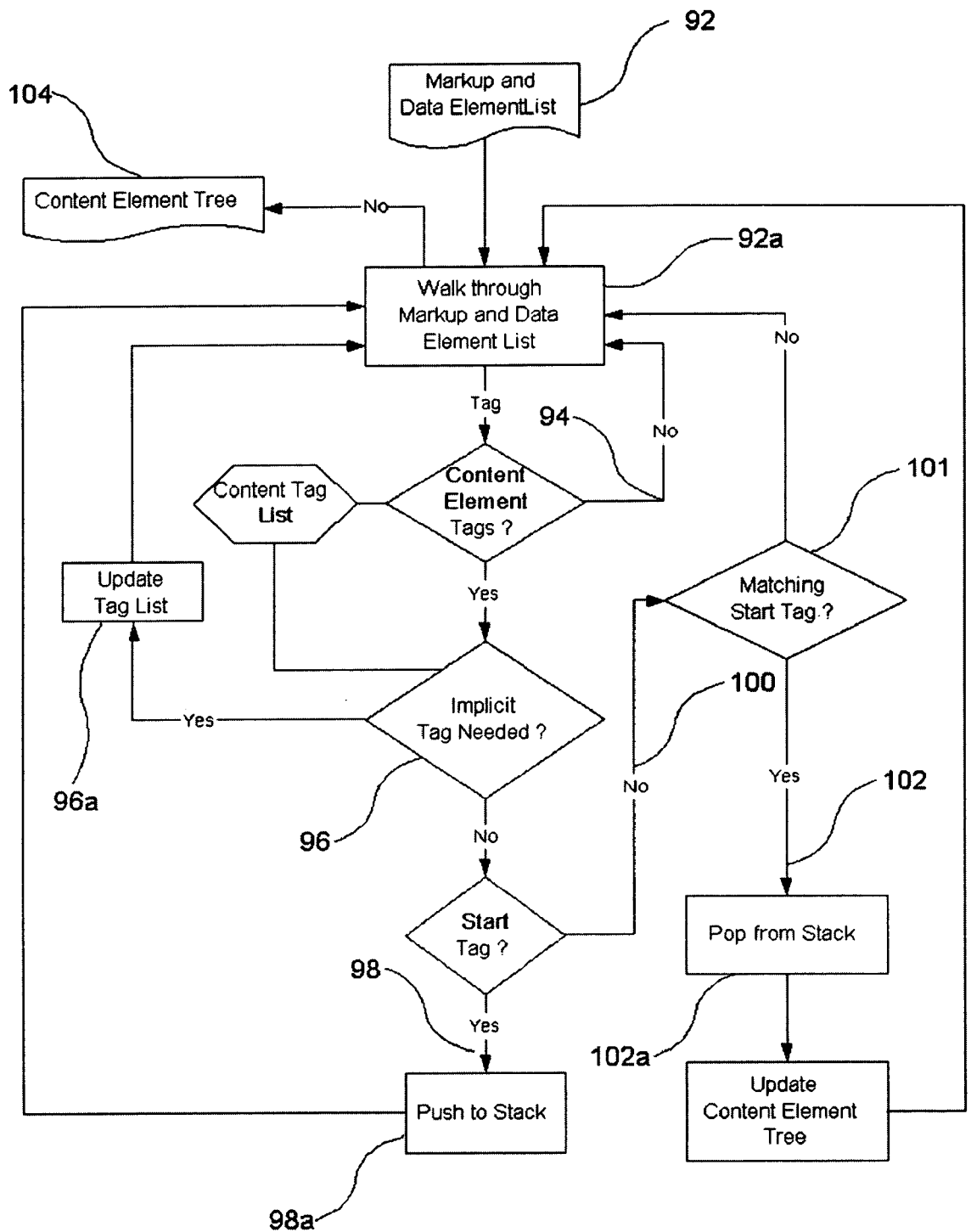
FIG. 8 is to show steps to build layout element tree from markup and data element list.

The steps to build content tree 104 is shown in FIG. 8. Each element of markup and data list 92 generated by the parser is visited in order 92*a*. Those not belonging to content tags, including data elements, are ignored 94. Conditions are then checked for the need to insert implicit tag 96 into the list to ensure consistency between layout semantics and document tree structure. After new tag is inserted 96*a*, the process returns back to the list 92*a* and repeats from the new one on. If the current tag is a start tag 98, it is pushed to the top of stack 98*a* while an end tag requires additional handling. Normally, the top of stack would match an end tag encountered. Otherwise 100, the whole stack is examined to see if there is matching one 101. If yes 102, the stack is popped 102*a* until the matching one is reached. An end tag without any matching tag in the stack is ignored.

Figure 9A:
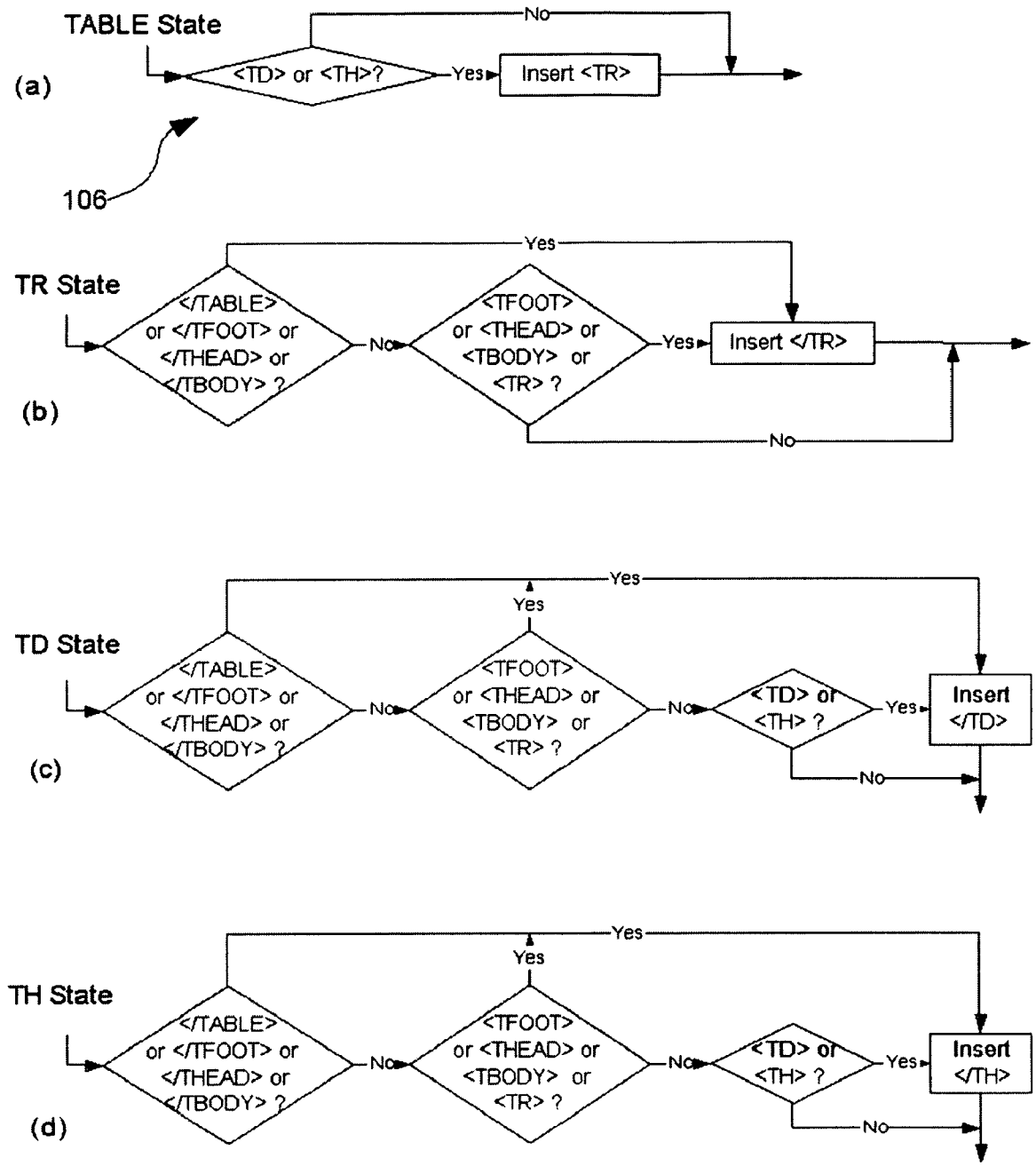
FIG. 9a and FIG. 9b are a set of handlers for inserting implicit tags.
Figure 9B:
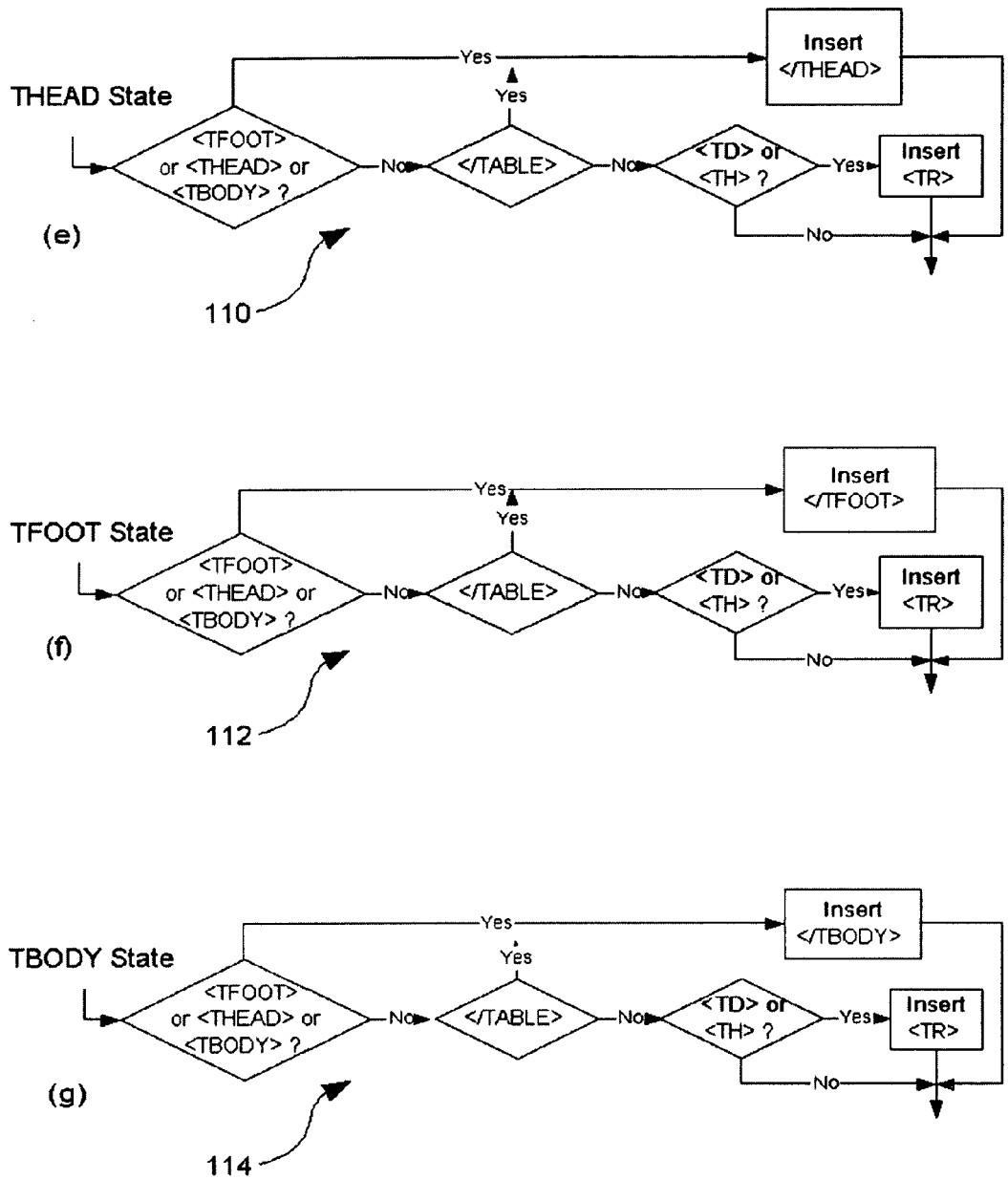
Figure 10:
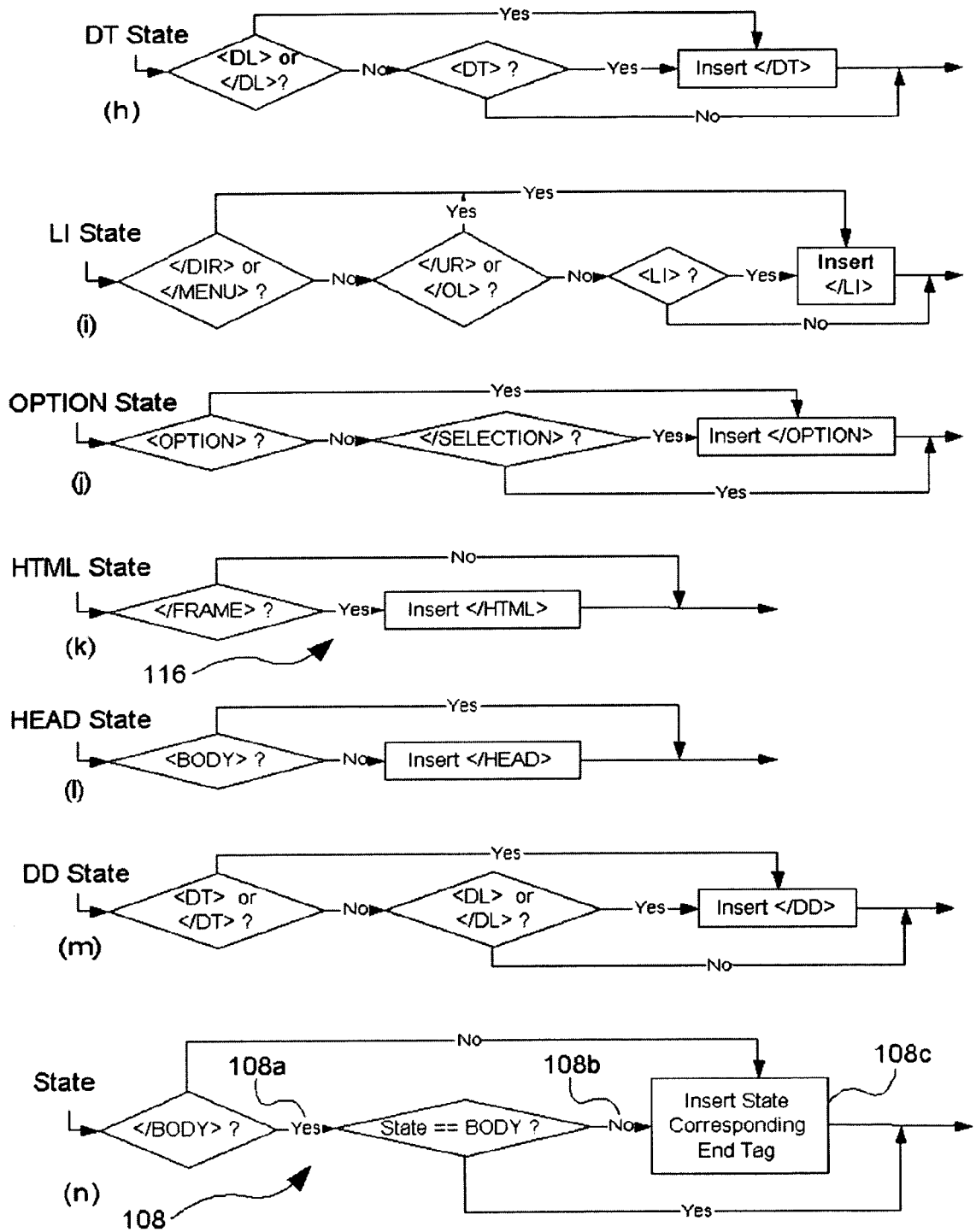
FIG. 10 is additional set of handlers for inserting implicit tags.

Implicit tags are generated on the fly as shown in FIG. 9*a*, FIG. 9*b* and FIG. 10. A state refers to the name of the tag at the top of the stack. All the rules from (a) 106 to (n) 108 specify conditions when implicit end tags are detected. Rules (a) 106, (e) 110, (f) 112, and (g) 114 describe how <TR> tag is implied as well. Rule (k) 116 is needed because the parser fetches frame source and inserted the tag list after the associated <FRAME> tag followed by an added </FRMAE> one. The last rule (n) 108 states that if </BODY> tag is encountered 108*a* without a matching state 108*b*, the end tag of the current state, if needed, is added automatically 108*c*. The list of HTML tags without end tags are <AREA>, <BASE>, <BR>, <COL>, <COLGROUP>, <FRAME>, <HR>, <IMG>, <INPUT>, <ISINDEX>, <LINK>, <PARAM>, and <BASEFONT>. These rules essentially implement what specified by HTML standard.

Figure 11:
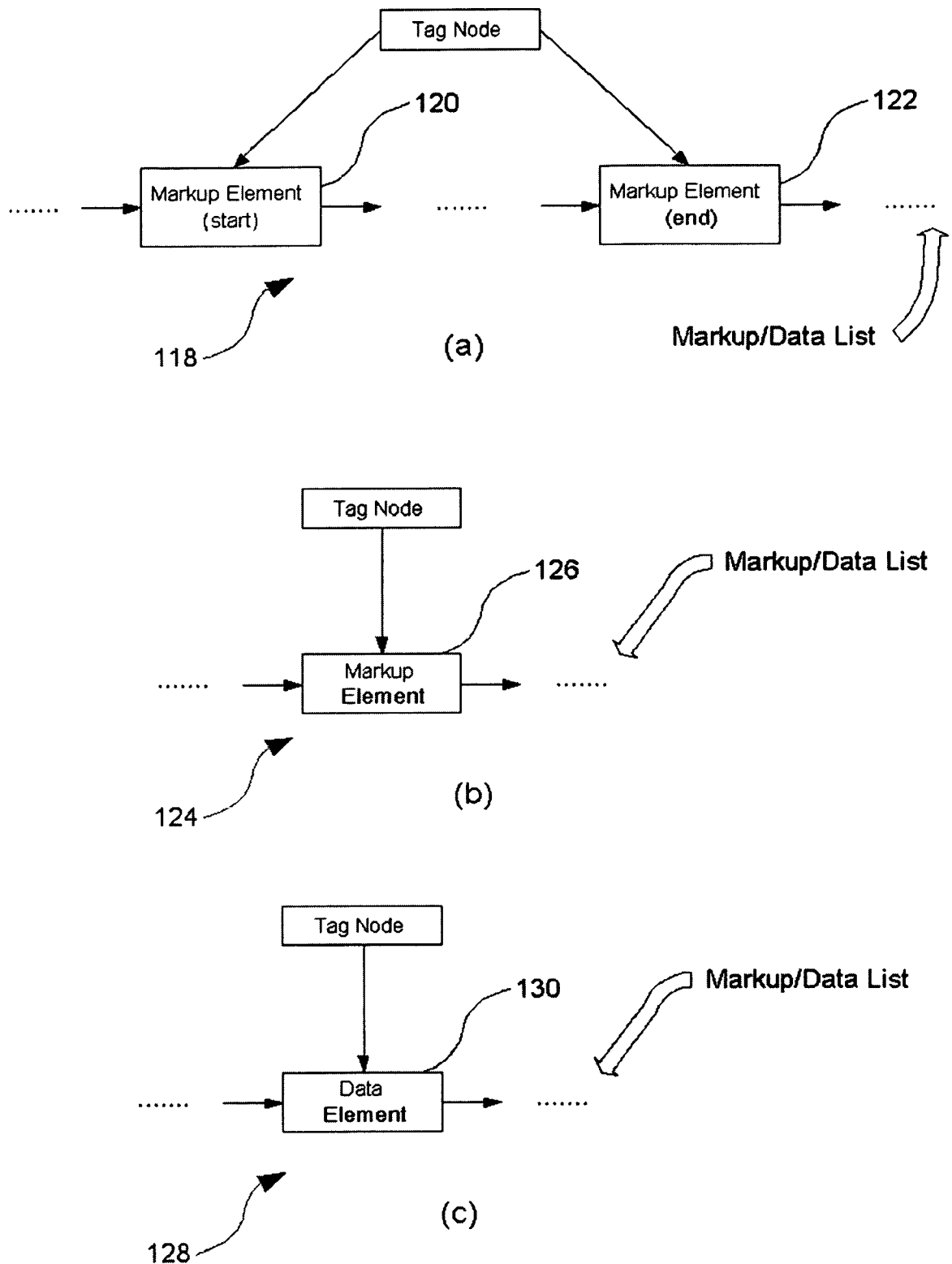
FIG. 11 is to show three types of relationships between tag node and associated markup or data element.
Figure 12:
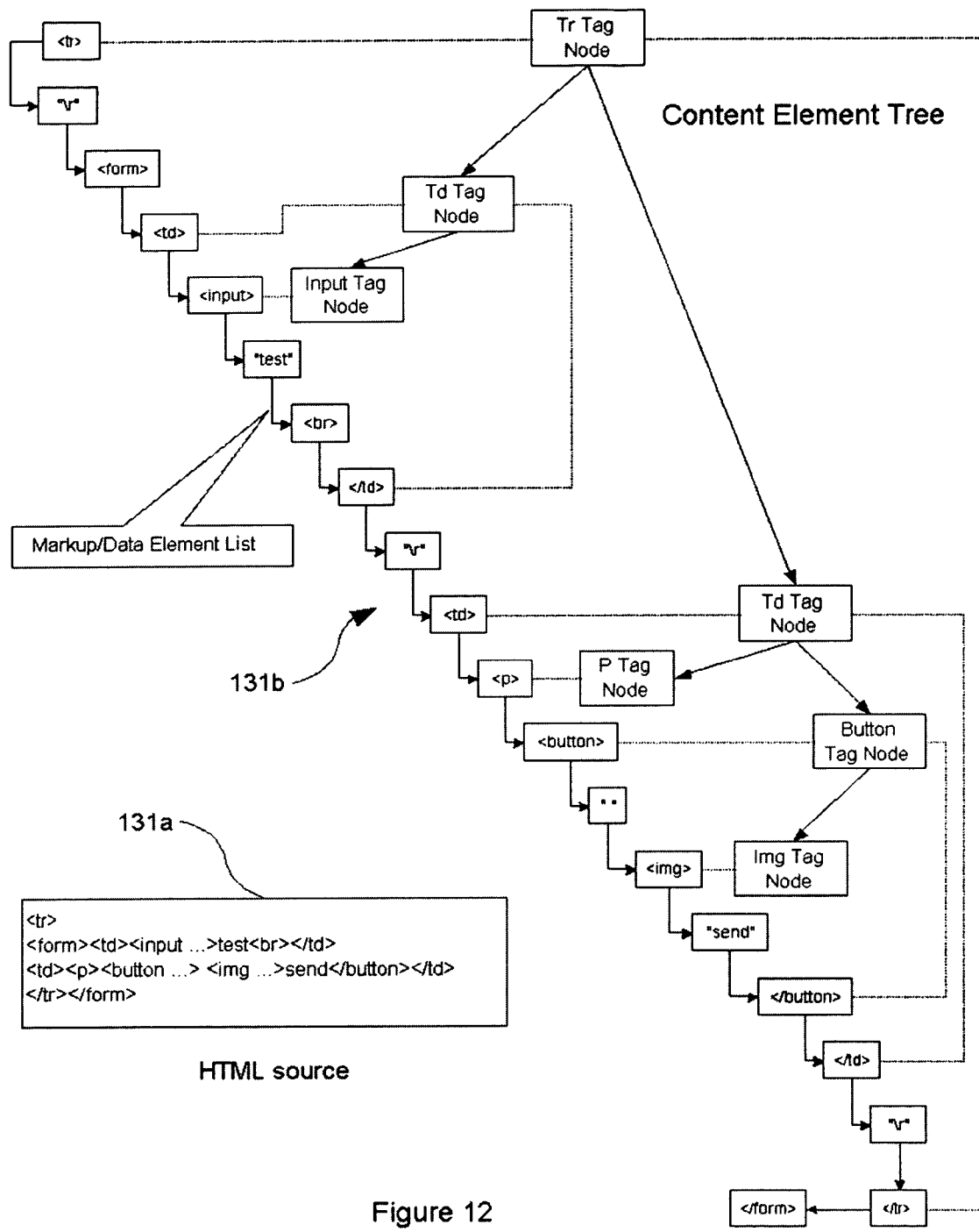
FIG. 12 is an example of HTML source code and its corresponding content element tree.

The document tree is built during popping tags from the stack. A tree node is defined after the top element is popped from the stack. There are three possible kinds of nodes, as shown in FIG. 11, depending on the relationships between a tag node and its associated markup elements. The most common one is formed by a paired start 120 and end 122 elements as in (a) 118. A degenerated one could be like (b) 124 where a node is formed by a single element 126 or (c) 128 where a data node represents the data element 130 in between two adjacent markup elements from the input list. An example of sample HTML code 131*a* and its corresponding content tree 131*b* is shown in FIG. 12.

The set of tags considered content elements and the set of rules for determining existence of implicit tags are expected to be updated and evolve. As this design is to support legendary web content, it needs to be as lenient to document not following exactly HTML specs as common browsers are. Evolution of browser markup languages would also force new updates, hence new changes in rules and setting as discussed here.

Figure 13:
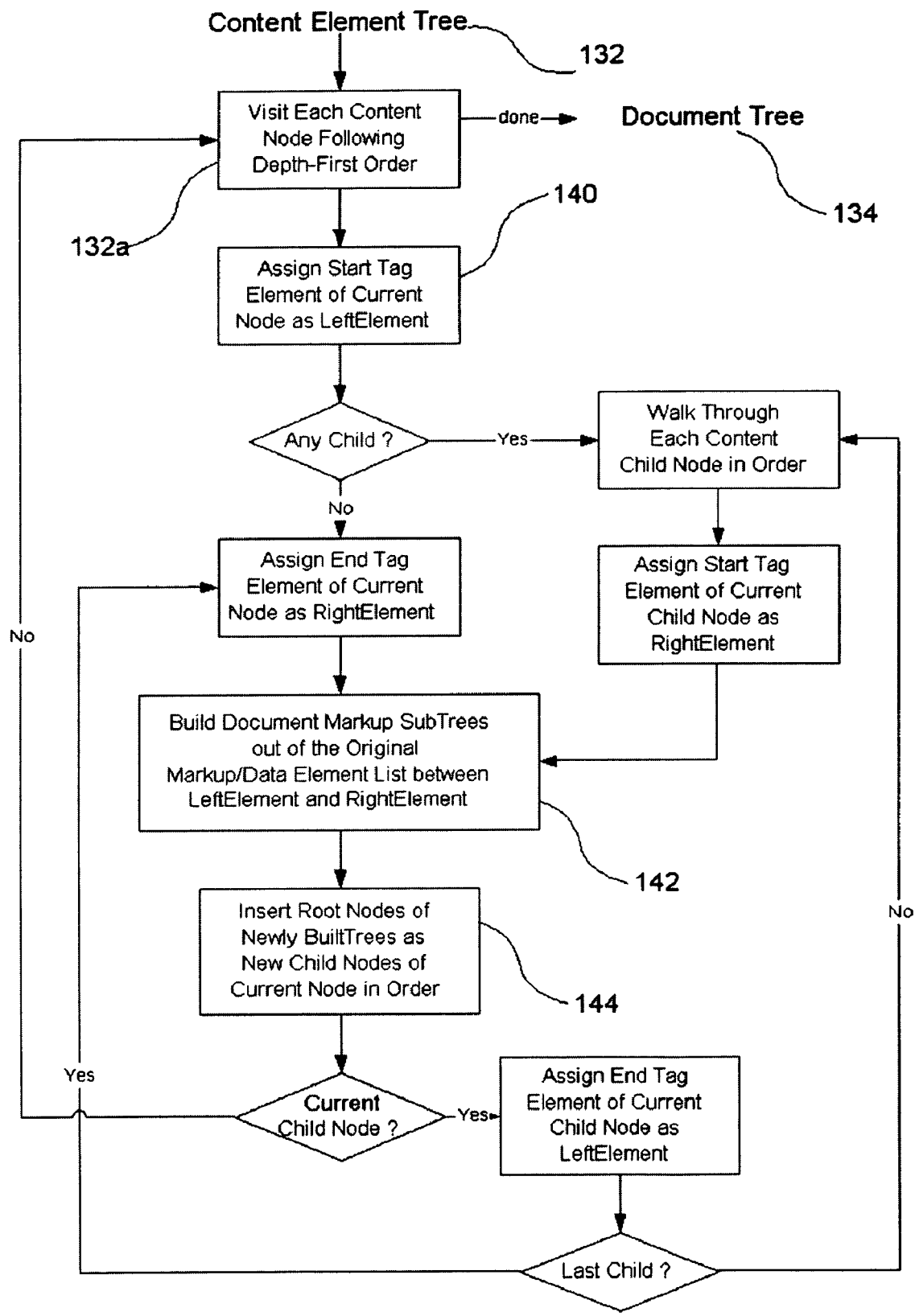
FIG. 13 is to show steps to build a document tree from the corresponding content element tree.

Based on content element tree 132, the remaining non-content markup and data tags are handled to complete the document tree 134. Firstly, these tags are visited following the steps shown in FIG. 13 together with FIG. 14 to complete a preliminary document tree 136. Then, a set of adjustments are applied to special set of non content tags according to the underlying HTML semantics to the final document tree 138 to be compliant with XML structure as shown in FIG. 15.

Based on the content element tree 132, each node is visited following a depth first order 132*a* and sub document trees, based on non-content tags, are built 142 and inserted 144 onto the content element tree 132 to form a preliminary document tree 134. The steps shown in FIG. 13 build sub document trees 142 based on segments of tag lists partitioned by content tags in the content element tree 132. A list of non-content tags is defined between the first child node and parent node, two neighboring sibling nodes, the last child node and parent node, or simply a single terminal node. A set of sub document trees 142 are constructed out of each such segment of tags and inserted as new child nodes 144 of the defining parent node in order.

Figure 14:
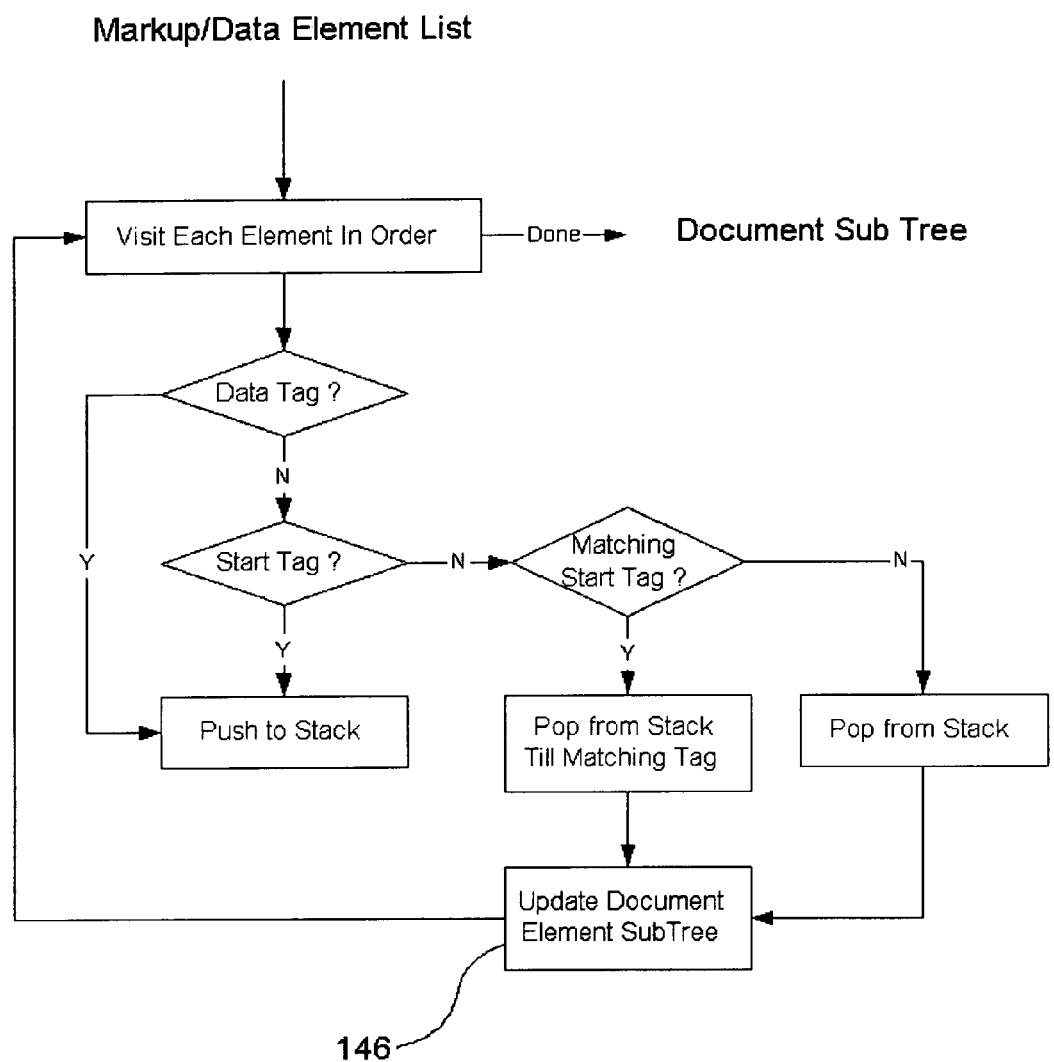
FIG. 14 is to show steps to build document sub-tree from markup and data element list between content nodes.
Figure 18:
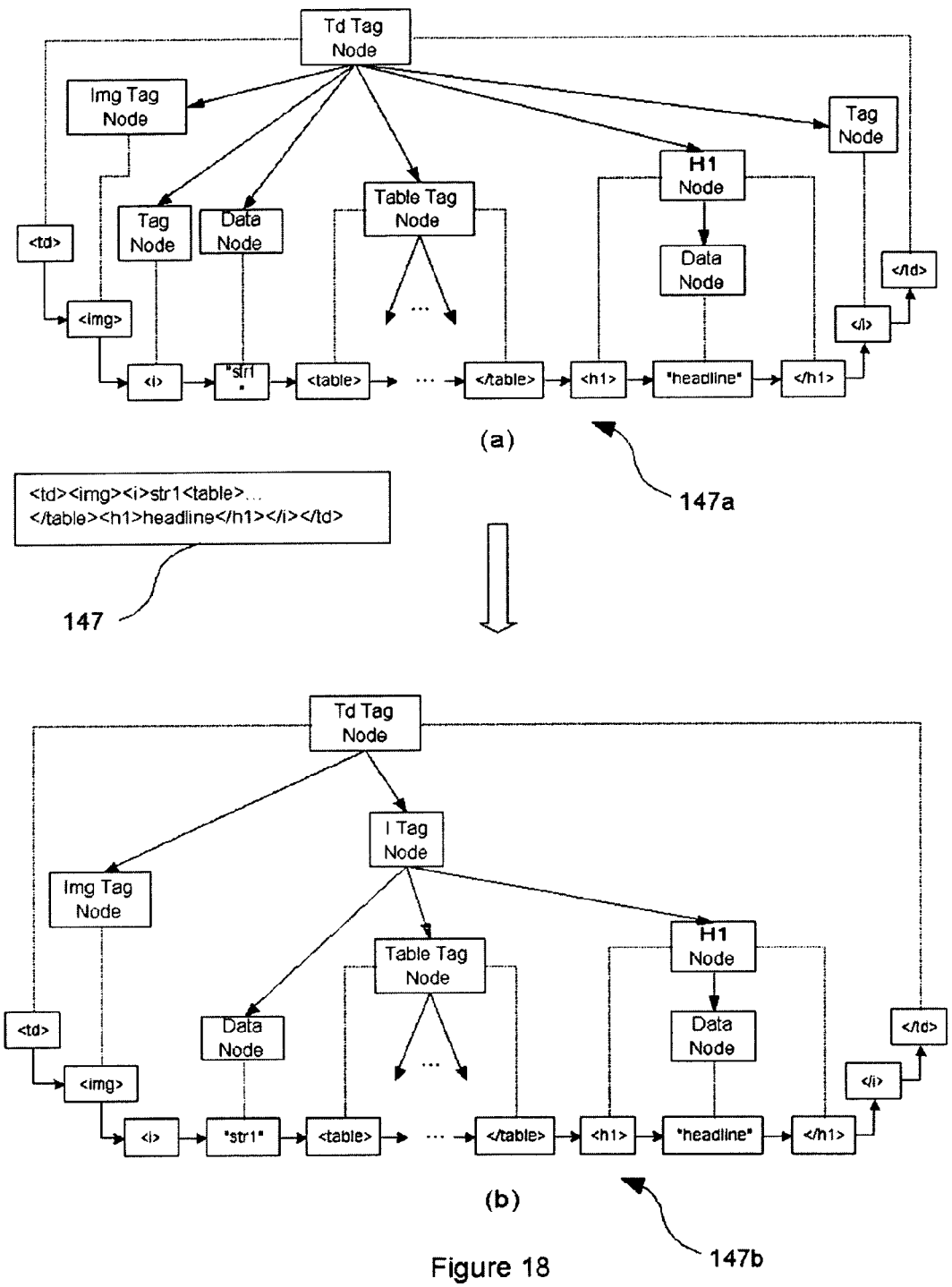
FIG. 18 is a sample of HTML code, its corresponding preliminary document tree and XML compliant document tree.

The tree building steps are shown in FIG. 14, similar to FIGS. 9*a* and 9*b* but a bit simplified. The main difference lies in the handling of end tag without matching start tag in the stack. A tree node with this single end tag is created instead of being removed. This happens often because HTML does not require strict XML structure on style and context tags and pairing start/end tags might belong to two different segments of tag lists partitioned by content element tree nodes. This process on each segment of tag list results in an ordered list of sub trees 146 to be inserted back to the content element tree 132. A sample HTML code 147, its corresponding preliminary document tree 147*a* and XML compliant document tree 147*b* are shown in FIG. 18.

Figure 15:
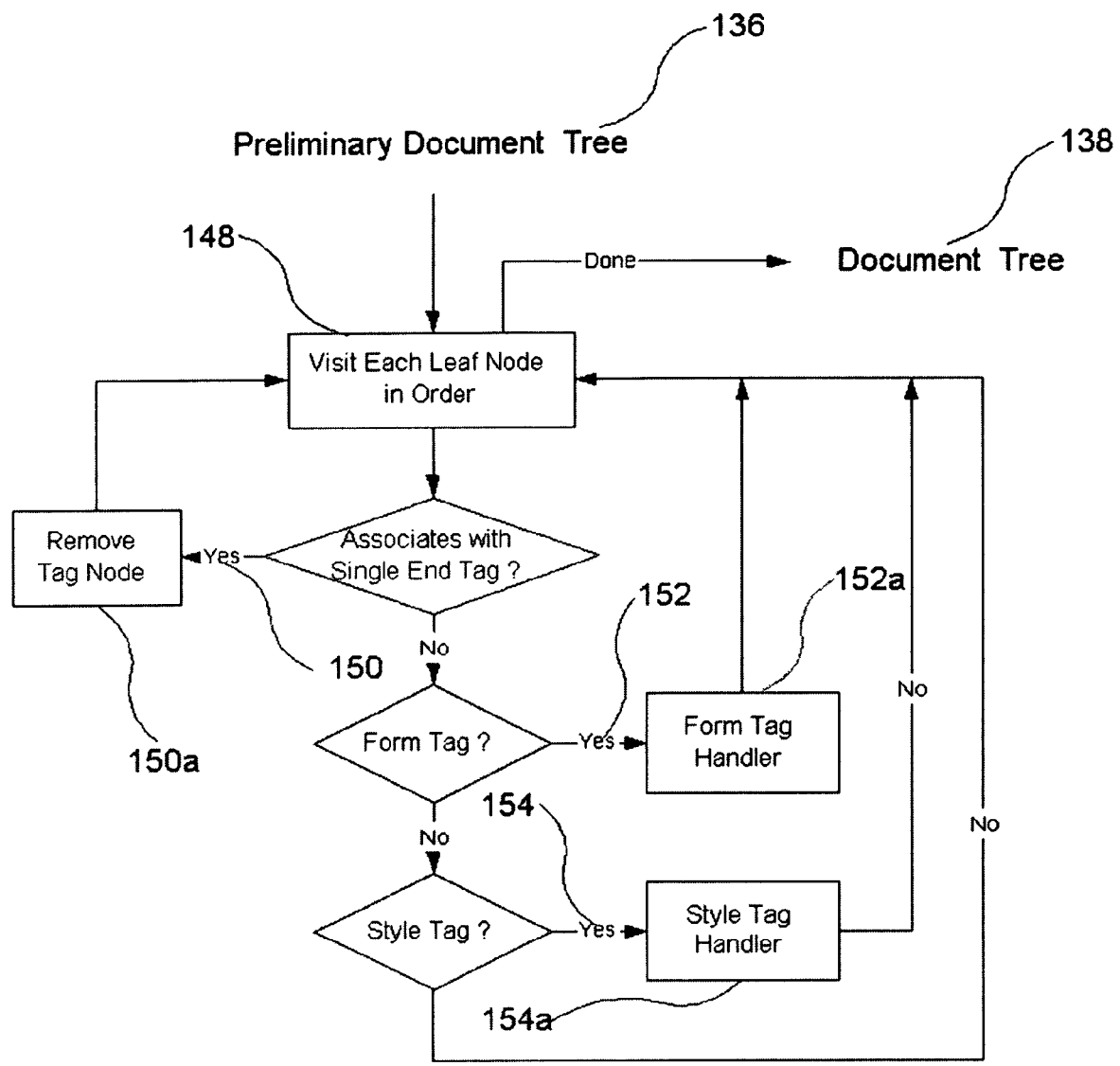
FIG. 15 is to show steps to rectify an HTML document tree to an XML compliant one.

Steps to rectify preliminary document tree 136 to be XML compliant are shown in FIG. 15. It iterates through the list of leaf nodes (node without any children) in order 148 and calls proper handlers for different types of nodes. Three handlers are considered here. If the leaf node is associated with an end tag 150, it is regarded as extra end tag and removed from the document tree 150*a*. If the leaf node is associated with a form tag 152, a form tag handler 152*a* is called. Otherwise, if it is a text style tag 154, a style tag handler 154*a* is called.

Figure 17A:
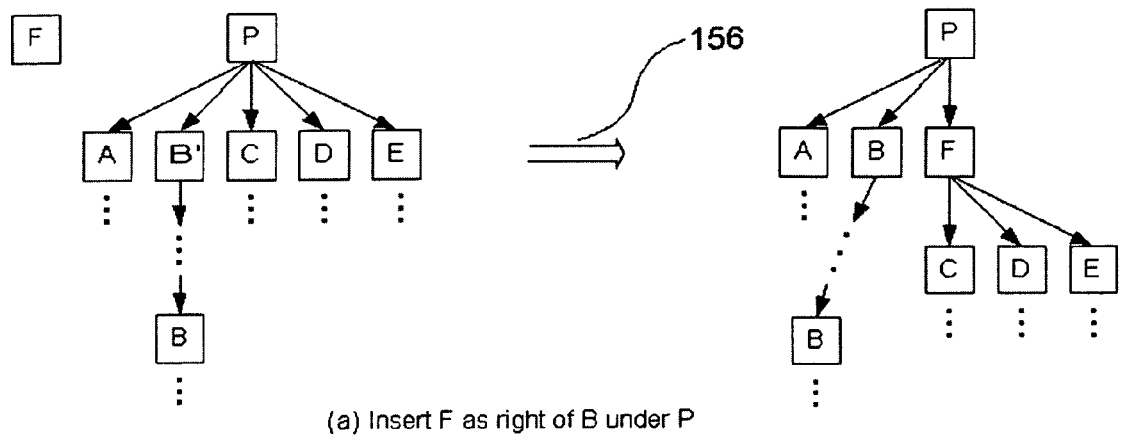
FIG. 17a and FIG. 17b are to demonstrate node insertion operations.
Figure 17A:
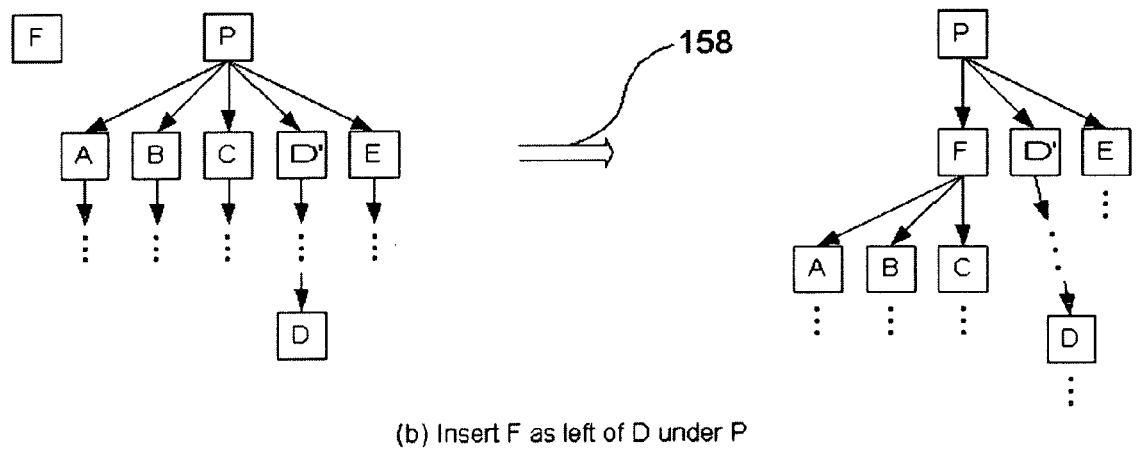
Figure 17B:
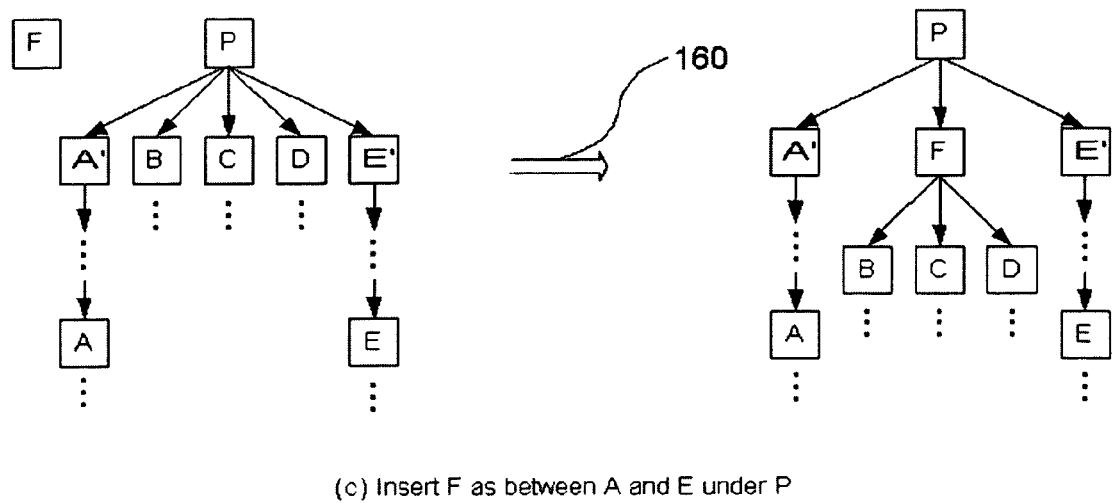
Figure 17B:
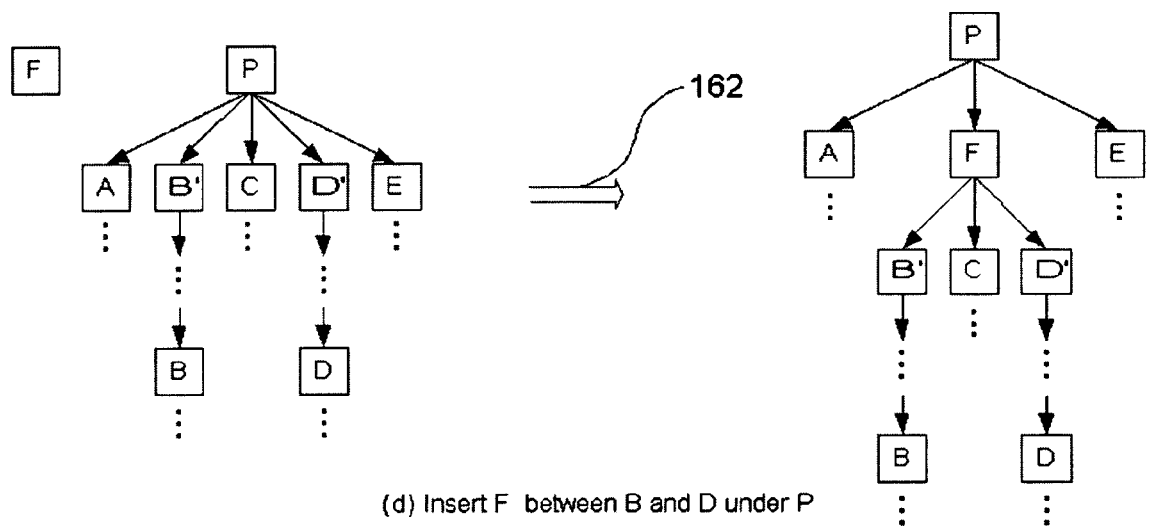

There are four tree insertion operations employed in the handler as shown in FIG. 17*a* and FIG. 17*b*. The insertion adds a new child node to a parent node but reset a set of original child nodes from the parent node to itself. Assuming a new node F, and a parent node P, FIG. 17*a* (a) shows the operation of inserting F as the right of B under P 156, where P is an ancestor node of B. FIG. 17*a* (b) shows the operation of inserting F as the left of D under P 158, where P is an ancestor node of D. FIG. 17*b* (c) shows the operation of inserting F as between A and E under P 160, where P is ancestor node of both A and E. And FIG. 17*b* (d) shows the operation of inserting F between B and D under P 162, where F becomes ancestor node of both B and D as a child of P.

Figure 16:
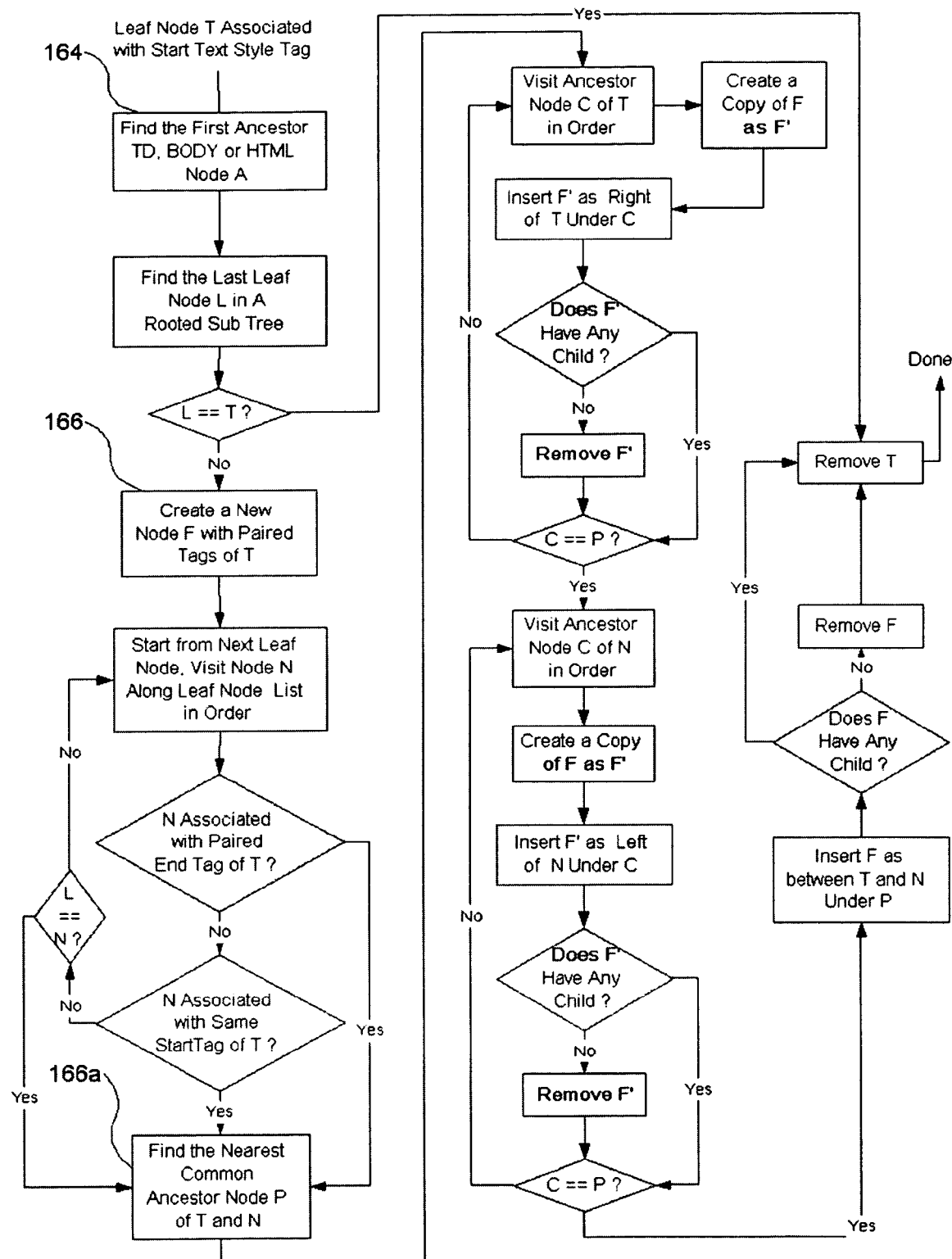
FIG. 16 is to show steps to handle non-xml-compliant style tags.

Detailed steps of text style tag handler are shown in FIG. 16. It follows the rule that style specification does not pass <TD>, <BODY>, or <HTML>. In this implementation, multiple <BODY> or <HTML> nodes are possible because of pre fetched frames. An attempt is made to locate the matching leaf node among the rest of leaf nodes following this range rule first 164. If none is found, the style effect is assumed to cover the rest of document element under the first ancestor <TD>, <BODY>, or <HTML> node 166. Existence of leaf node of the same non-ending style tag is also considered an implicit matching end tag. Once matching node pairs are identified, the closest common parent node is located 166a and the new style nodes are inserted accordingly to cover all elements enclosed by these two nodes under this common ancestor node.

Figure 19:
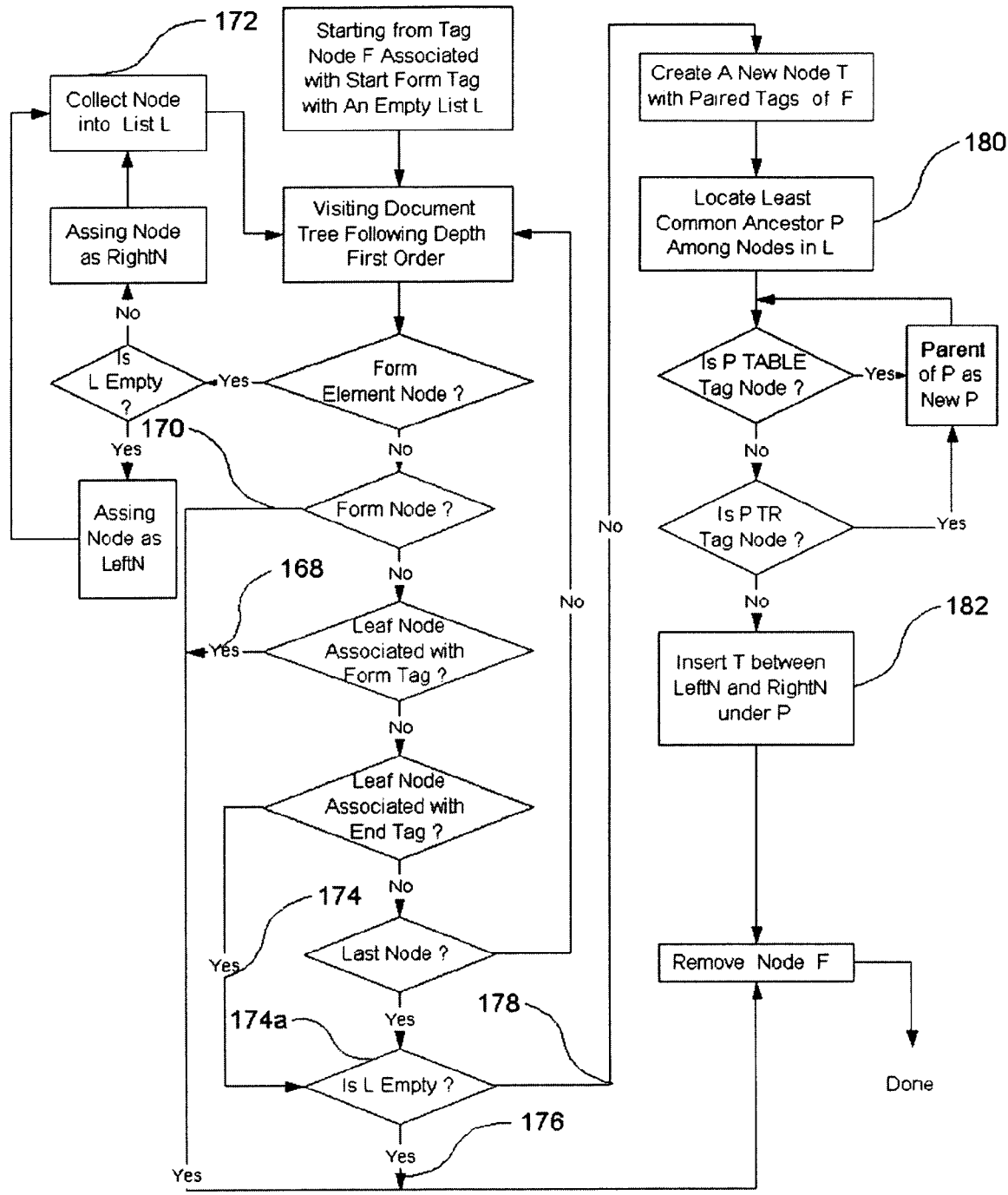
FIG. 19 is an example to show handling of non-XML compliant style tags.

The form handler follows the steps shown in FIG. 19. When a leaf FORM tag node is encountered 168, it tries to search for all form element nodes belonging to this form. Form element nodes are those with tags such as <INPUT>, <SELECT>, <FIELDSET>, <OPTION>, <OPTGROUOP>, and <TEXTAREA> which are expected to be enclosed by a matching pair of <FORM> tags in the source document. These nodes are content elements and have already been built into the document tree. Depth first order search following the leaf <FORM> node is required to collect them. The search ends either normally or with an error. If another <FORM> node is encountered 170 before a matching end <FORM> node is found, it is considered document error. Otherwise, the search continues and collects a list of <FORM> element nodes 172 until the matching end <FORM> leaf node is found 174. If the search exhausts the tree, it is assumed an implicit end <FORM> tag is intended right before </BODY> tag. When the search ends without error, it checks to see if the list of <FORM> element nodes is empty 174a. If so, no <FORM> node is needed 176. Otherwise, a new <FORM> node is created based on matching pair of <FORM> tags of the leaf <FORM> node 178. The least common ancestor node 180, which is neither <TABLE> nor <TR> nodes, among the collected list of <FORM> element nodes is then found. The new <FORM> node is then inserted between the first and last nodes of the collected node list under this least common ancestor found 182 as depicted in FIG. 17b (d) 162.

Figure 20:
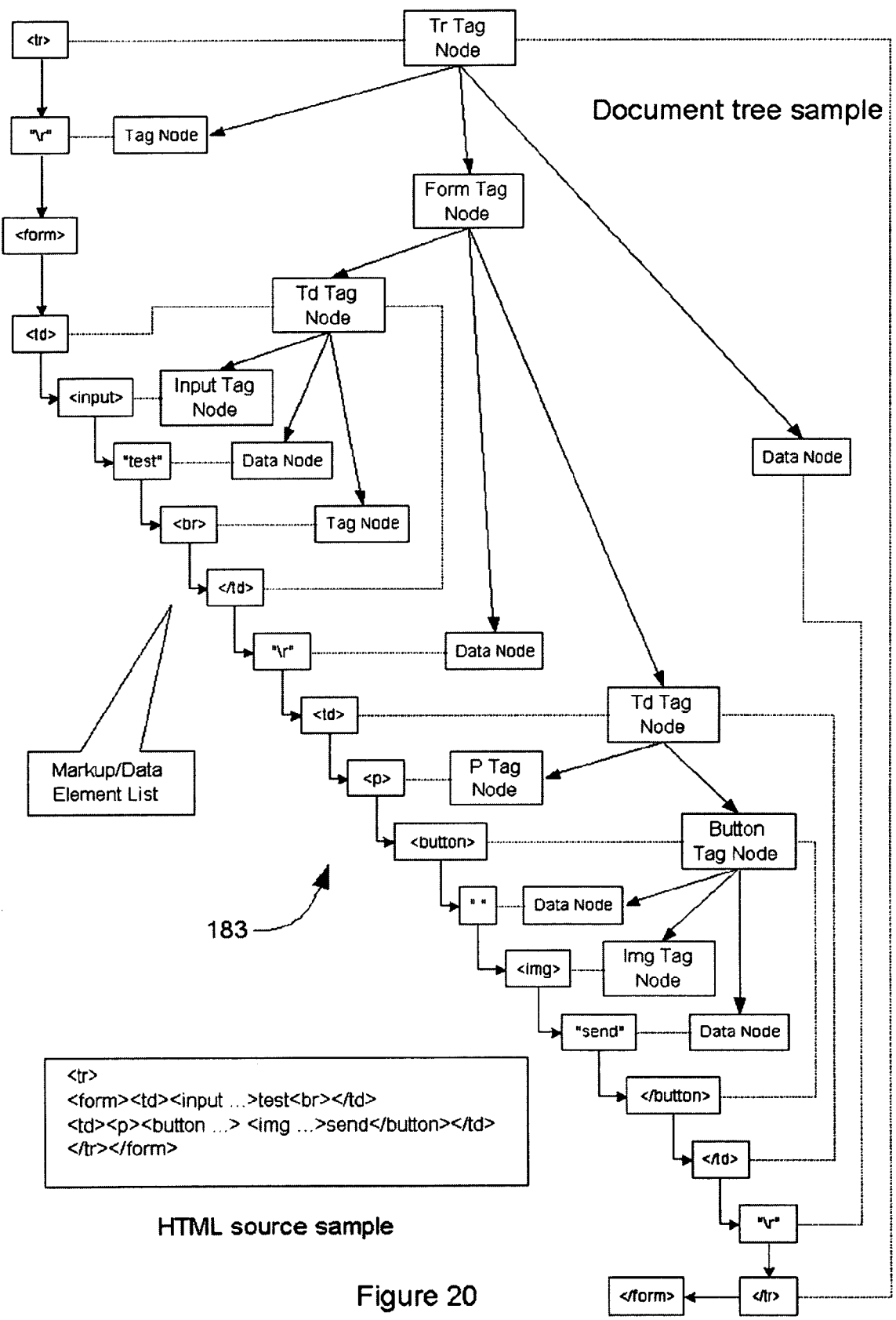
FIG. 20 is to show steps to handle non-XML compliant form tags.

A sample document tree 183 built by the above stated steps from sample content element tree 131b in FIG. 12 is shown in FIG. 20. The handlers are provided for correcting loosely structured HTML document. Heuristic assumptions are made in these handlers with respect to when erroneous documents are encountered. More handlers could be added for other conditions not discussed above. In addition, assumptions on how browsers behave might also evolve as new versions and/or new kinds of browsers continue to be adopted in the market.

The simplifier transforms the document tree onto an intermediate one defined by a subset of XHTML tags and attributes through filtering and mapping operations on tree node. A document tree is condensed and simplified based on a subset of XHTML 1.0 markup tag list specified in Table 2. The main objective of this design is to render the content in terms of document tree while preserving as much as possible the intended content, style, hyperlinks and form interactions. Markup tag associated with original document tree node could belong to HTML, XHTML, or even generic XML. The simplification process goes through each node and performs transformation or filtering against a node or a sub tree. Semantics of HTML and XHTML tags are embodied in these transformation rules.

TABLE 2 A

Table of Simplified HTML Tags

| Name | Attributes | Description |
| --- | --- | --- |
| A | href = URL<br>name = CDATA<br>rel = Link Type<br>rev = Link Type<br>type = Content Type | anchor |
| ABBR | | abbreviation (e.g. WDVL) |
| ACRONYM | | |
| ADDRESS | | information on author |
| B | | bold text style |
| BASEFONT | size = CDATA<br>color = Color Number<br>face = CDATA | base font size |
| BIG | | large text style |
| BLOCKQUOTE | CITE = URL | long quotation |
| BODY | alink = Color Number<br>background = URL<br>bgcolor = Color Number<br>link = Color Number<br>text = Color Number<br>vlink = Color Number | document body |
| BR | | forced line break |
| BUTTON | disabled<br>name = CDATA<br>type = button | submit | reset<br>value = CDATA | push button |
| CAPTION | align = calign | table caption |
| CENTER | | shorthand for DIV align = center |
| CITE | | citation |
| CODE | | computer code fragment |
| DD | | definition description |
| DFN | | instance definition |
| DIR | compact | directory list |
| DIV | align = left | center | right | justify | generic language/style container |
| DL | compact | definition list |
| DT | | definition term |
| EM | | emphasis |
| FIELDSET | | form control group |
| FONT | color = Color Number<br>face = CDATA<br>size = CDATA | local change to font |
| FORM | action = URL<br>accept-charset = Charset<br>enctype = Content Type<br>method = get | post | interactive form |
| H1,H2,H3,H4,H5,H6 | align = left | center | right | justify | heading |
| HEAD | profile = URL | document head, contains BASE, LINK, META, SCRIPT, STYLE, TITLE. |
| HR | noshade | Horizontal rule |
| HTML | version = CDATA<br>lang = Language Code | document root element |
| I | | italic text style |
| IMG | alt = Text<br>src = URL<br>height = Length<br>longdesc = URL<br>width = Length<br>align = top | bottom | middle | left | right | Embedded image |
| INPUT | accept = ContentText<br>alt = CDATA<br>checked<br>disabled<br>maxlength = Number<br>name = CDATA<br>readonly<br>size = CDATA | form control |

TABLE 2 A-continued

Table of Simplified HTML Tags

| Name | Attributes | Description |
| --- | --- | --- |
|  | type = Input Type |  |
|  | value = CDATA |  |
| KDB |  | text to be entered by the user |
| LABEL |  | form field label text |
| LEGEND | align = lalign | fieldset legend |
| LI | type = li style | list item |
|  | value = number |  |
| MENU | compact | menu list |
| META | content = CDATA | generic meta information |
|  | http-equiv = Name |  |
|  | scheme = CDATA |  |
| OBJECT |  | generic embedded object |
| OL | compact | ordered list |
|  | start = Number |  |
|  | type = ol Type |  |
| OPTGROUP | label = Text | option group |
|  | disabled |  |
| OPTION | diabled | Selectable choice |
|  | label = Text |  |
|  | selected |  |
|  | value = CDATA |  |
| P |  | Paragraph |
| PRE |  | preformatted text |
| Q | cite = URL | short inline quotation |
| S |  | strike-through text style |
| SAMP |  | sample program output, scripts, etc. |
| SELECT | disabled | option selector |
|  | multiple |  |
|  | name = CDATA |  |
|  | size = Number |  |
| SMALL |  | small text style |
| SPACER |  | generic language/style container |
| SPAN |  | generic language/style container |
| STRIKE |  | strike-through text |
| STRONG |  | strong emphasis |
| SUB |  | subscript |
| SUP |  | superscript |
| TABLE | bgcolor = Color Number |  |
|  | border = Pixels |  |
|  | frame = Tframe |  |
|  | summary = Text |  |
| TD | abbr = Text | table data cell |
|  | sxis = CDATA |  |
|  | bgcolor = Color Number |  |
|  | colspan = Number |  |
|  | rowspan = Number |  |
| TEXTAREA | cols = Number | multi-line text field |
|  | rows = Number |  |
|  | disabled |  |
|  | name = CDATA |  |
|  | readonly |  |
| TH | abbr = Text | table header cell |
|  | axis = CDATA |  |
|  | bgcolor = Color Number |  |
|  | colspan = Number |  |
|  | rowspan = Number |  |
| TITLE |  | Document title |
| TR |  | table row |
| TT |  | teletype or monospaced text style |
| U |  | underlined text style |
| UL | compact type = Ul Style | Unordered list |
| VAR |  | instance of a variable or program argument |

Figure 21:
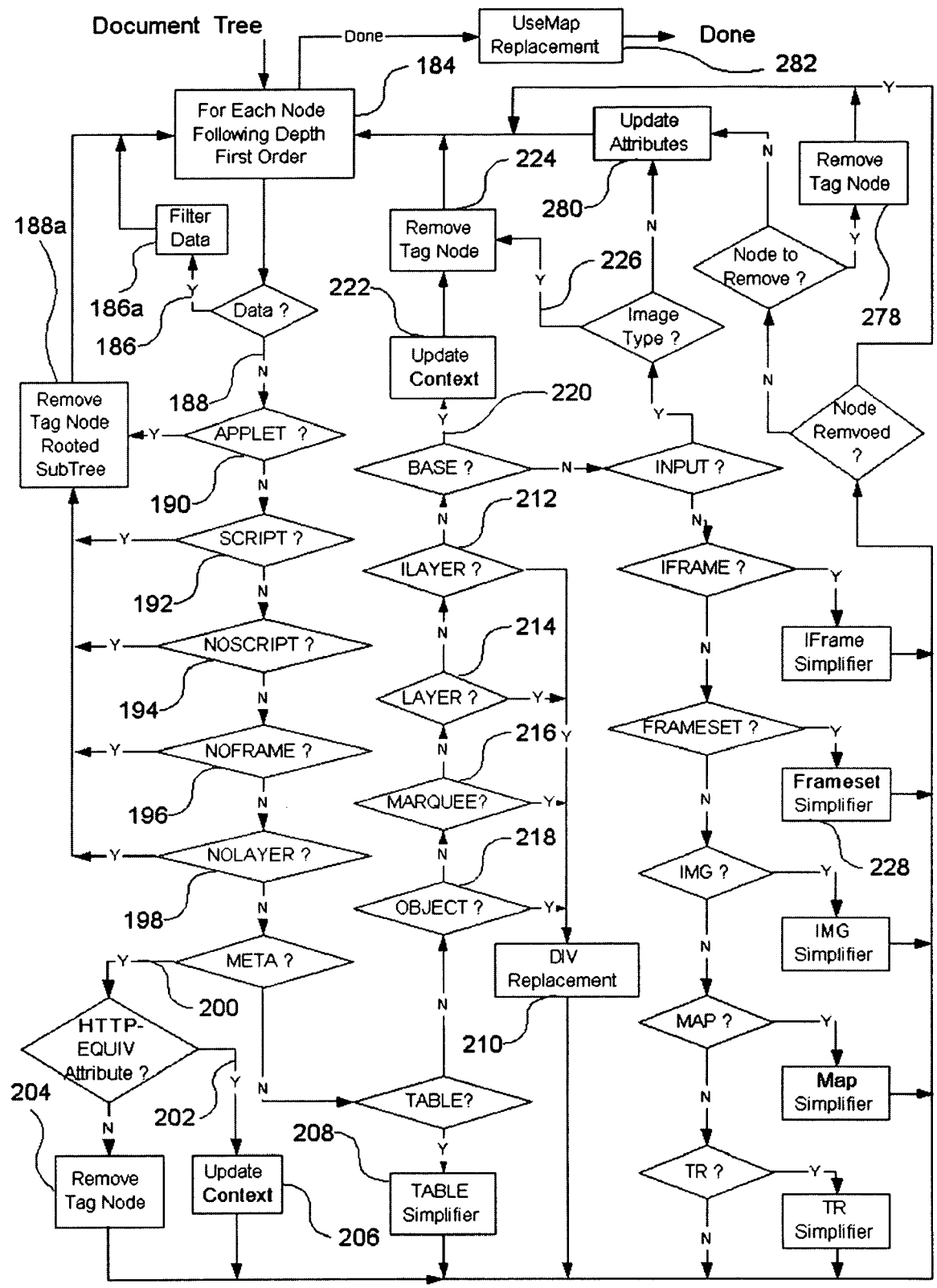
FIG. 21 is an example of source HTML code and the corresponding document tree after form and style tag handling.

The simplification steps are shown in FIG. 21. It walks through the document tree following depth first order starting from the root node 184. If it is a data node 186, a simple filtering process is applied to remove consecutive space, carriage returns or line feeds 186 a. Otherwise 188, the rooted sub tree is removed 188a if the associated tag belongs to the set of five types, <APPLET> 190, <SCRIPT> 192, <NOSCRIPT> 194, <NOFRAME> 196, or <NOLAYER> 198. They are ignored because of 1. Java support as activating specific client application is not covered; 2. Script codes have either been executed to get dynamic client content or not yet supported; 3. <NOSCRIPT>, <NOFRAME>, or <NOLAYER> do not usually contain useful information, but simply advisory or warning messages.

For <META> tags 200, only those with the presence of HTTP-EQUIV attribute are retained 202. Other Meta tags used for naming, keywords or other purposes are removed 204, as they do not have significance either on content or how content is fetched. Response information is extracted from the HTTP attribute value pair denoted by the values of HTTP-EQUIV and CONTENT attributes, and stored as part of document context information 206, such as document encoding and language set specification.

Figure 22A:
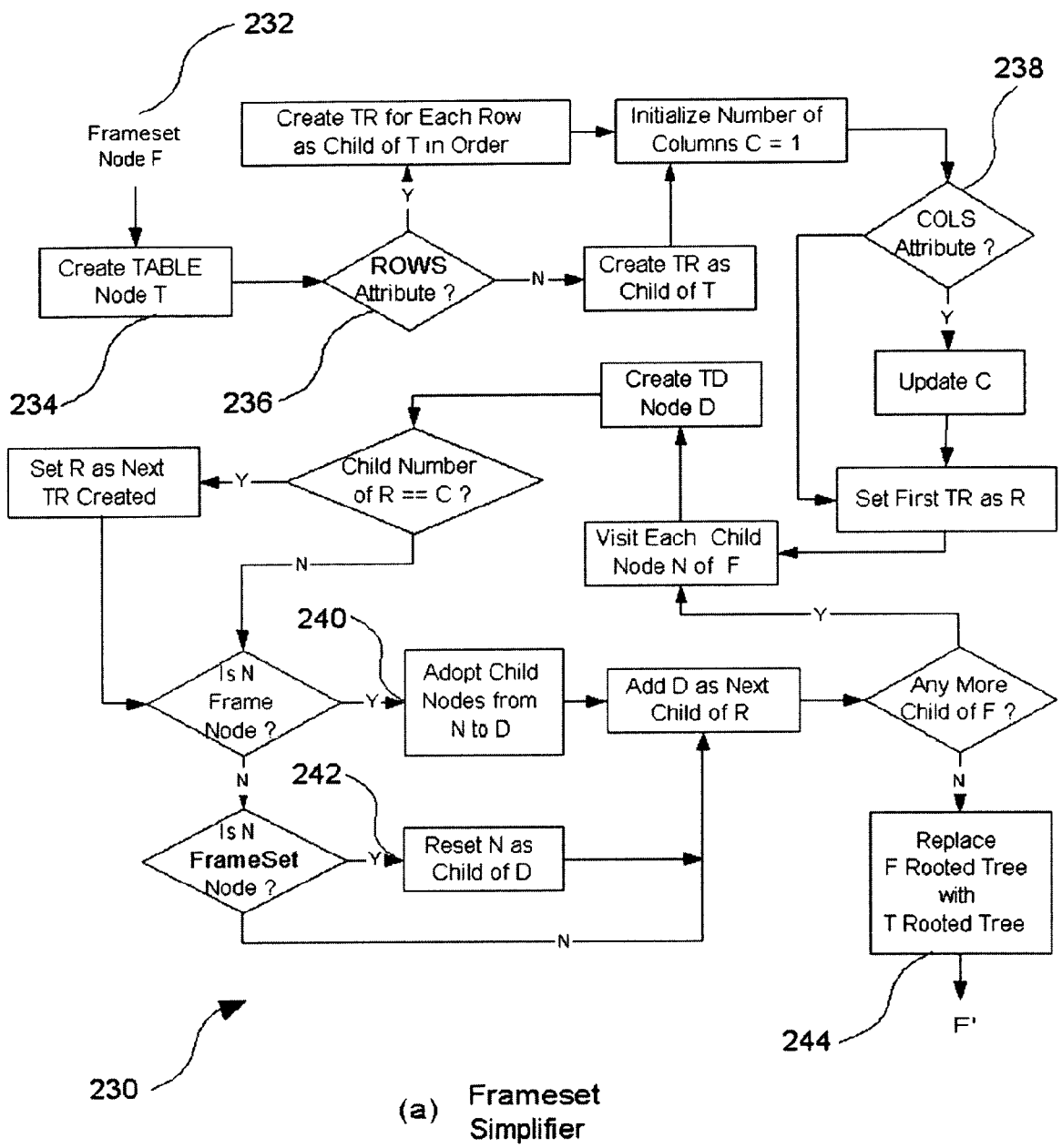
FIG. 22a and FIG. 22b show steps to map document tree onto a simplified one based on a subset of XHTML tags.
Figure 22B:
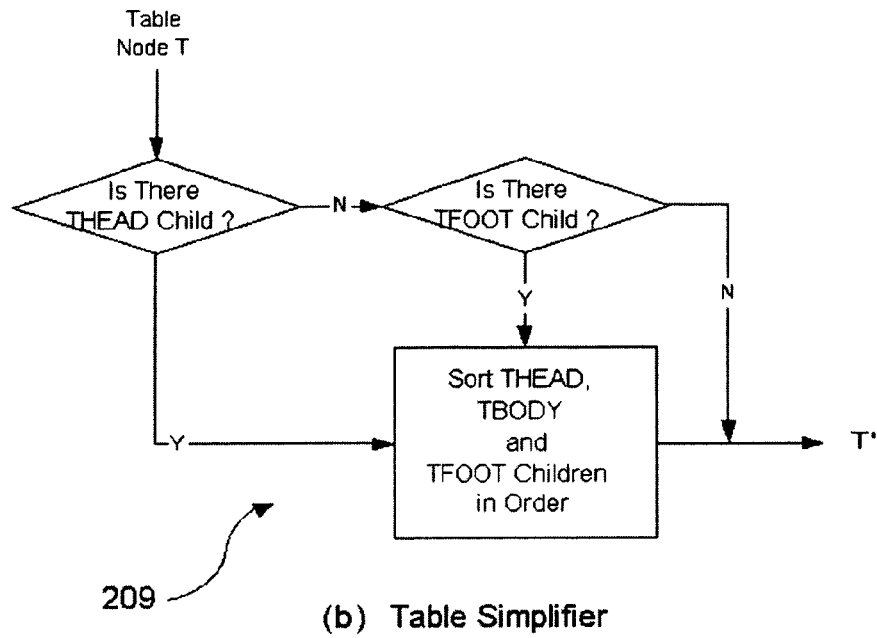
Figure 22B:
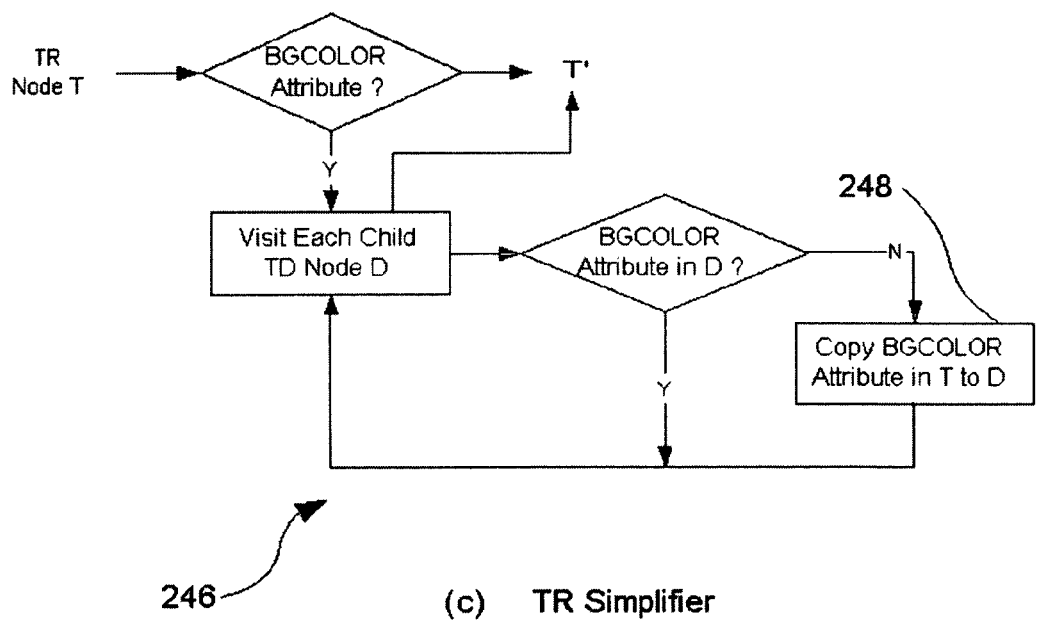

Table simplifier 208 is applied for <TABLE> nodes as described in FIG. 22b (b) 209. It goes through its direct child nodes and ensures that: 1. <THEAD> is placed before <TR>, <TBODY>, and <TFOOT>; 2. <TFOOT> node is placed after <THEAD>, <TR>, and <TBODY> nodes; 3. order of <TR> nodes are kept the same, if there are <THEAD>, <TBODY>, or <TFOOT> nodes.

A node belonging to four types of tags are replaced by <DIV> node 210 to keep the structure in place while retaining the enclosed data. <ILAYER> 212 and <LAYER> 214 are used for positioning a block of content. This will not be proper after splitting and scaling the content. <MARQUEE> 216 is used for animating a block of content, not supported by most browsers. <OBJECT> 218 is to activate embedded client application and not handled by the simplification process. Alternate text enclosed by the <OBJECT> tags is preserved. The simplification process ignores presentation and functional controls intended by these tags and keeps only the content data as a division block.

When <BASE> node is encountered 220, the document context is updated 222 on the originating source URL. This node is removed afterwards 224, as the resulting content would be sent from servers of different URL.

An <INPUT> node with type attribute value FILE or IMAGE is removed 226. Image based input button might require client side image mapping capability which would be distorted during scaling.

Figure 25:
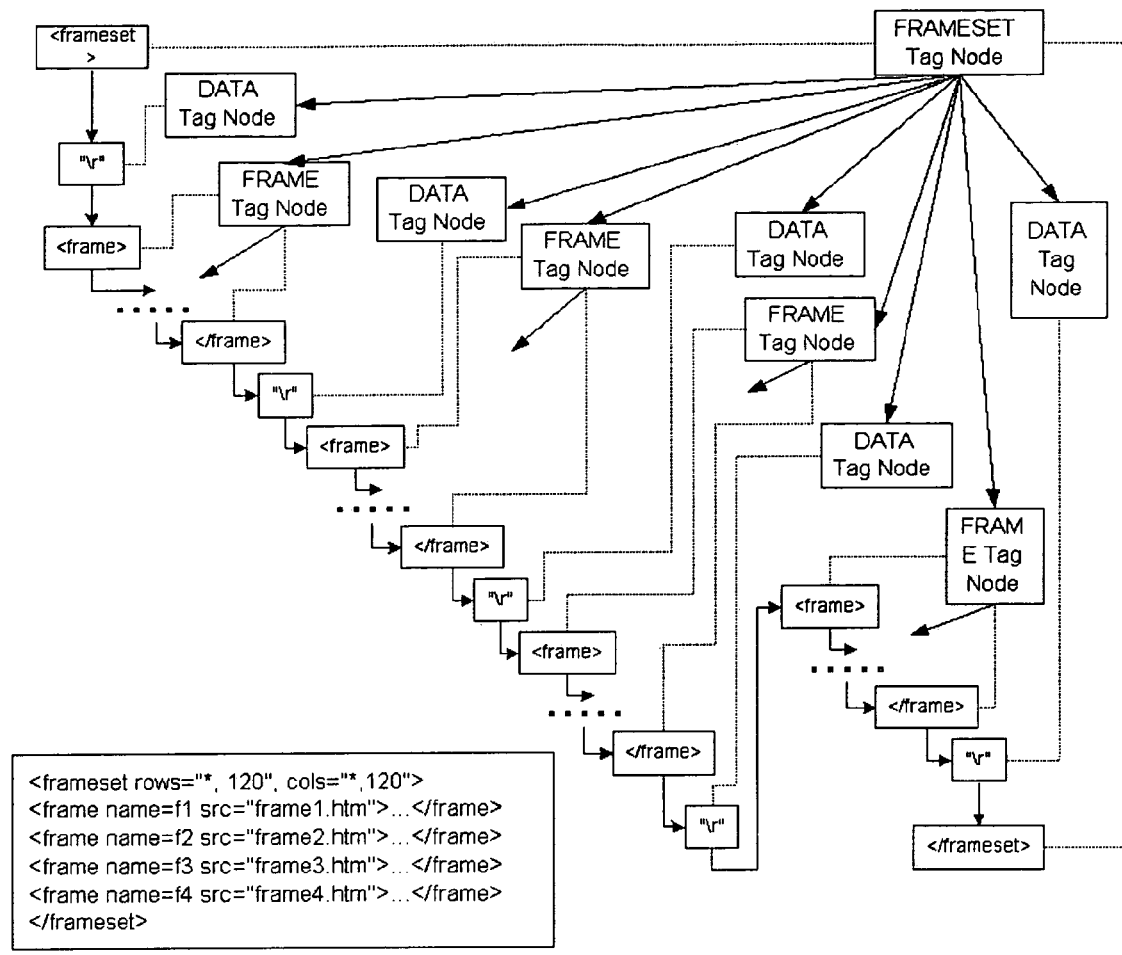
FIG. 25 is a frameset HTML code sample and its corresponding document tree.
Figure 26:
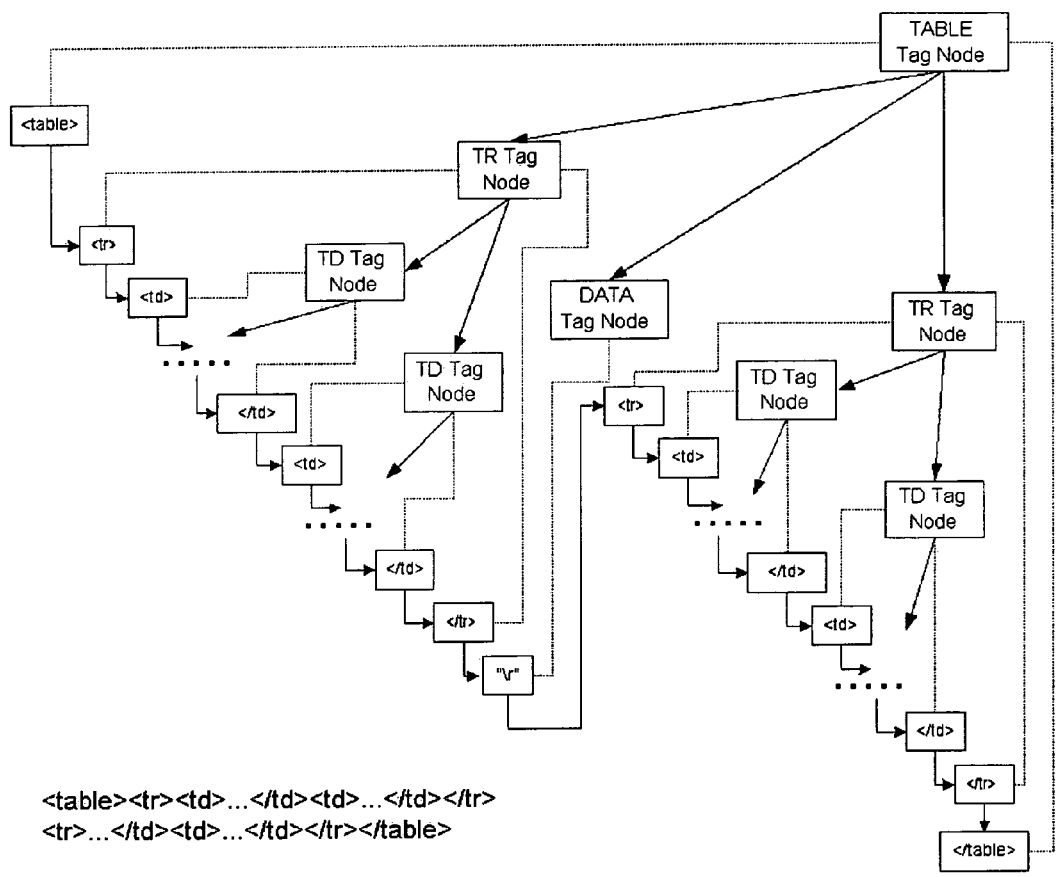
FIG. 26 is a sample of document tree and its corresponding HTML code from frameset simplification.

<FRAMESET> node is handled by Frameset simplifier 228 as shown in FIG. 22a (a) 230. Contents enclosed by frameset and frame tags intended for separate client display windows are replaced by table structure preserving similar layout constraint. In essence, it removes interactions between frame windows on the client device while ensuring the original frame set content is properly displayed. A table node is created 234 for a <FRAMESET> node 232. Depending on ROWS attribute specification 236, one or multiple <TR> nodes are added to this table node. Single row table is assumed without the presence of ROWS attribute. Similarly, depending on COLS attribute specification 238, one or multiple <TD> nodes are added to each <TR> node. Again, one column row is assumed without COLS specification. Frame source content as children nodes of original <FRAME> node are reattached to the corresponding <TD> node as their parent node 240. However, when the child of <FRAMESET> node is also another <FRAMESET> node 242, it is reattached to the corresponding <TD> node as its child node. The resulting <TABLE> node rooted tree is connected to the document tree in place of the <FRAMESET> node 244. An example of mapping from <FRAMESET> node tree to <TABLE> node tree is demonstrated in FIG. 25 and FIG. 26.

<TR> node is handled by TR simplifier as shown in FIG. 22b (c) 246. If there is background color specified for the whole row, this attribute BGCOLOR is duplicated to each <TD> node 248 under this <TR> node, when no BGCOLOR is specified for the <TD> node. As table structure could be split and changed, this attribute will be honored at <TD> node but not <TR> node.

Figure 23A:
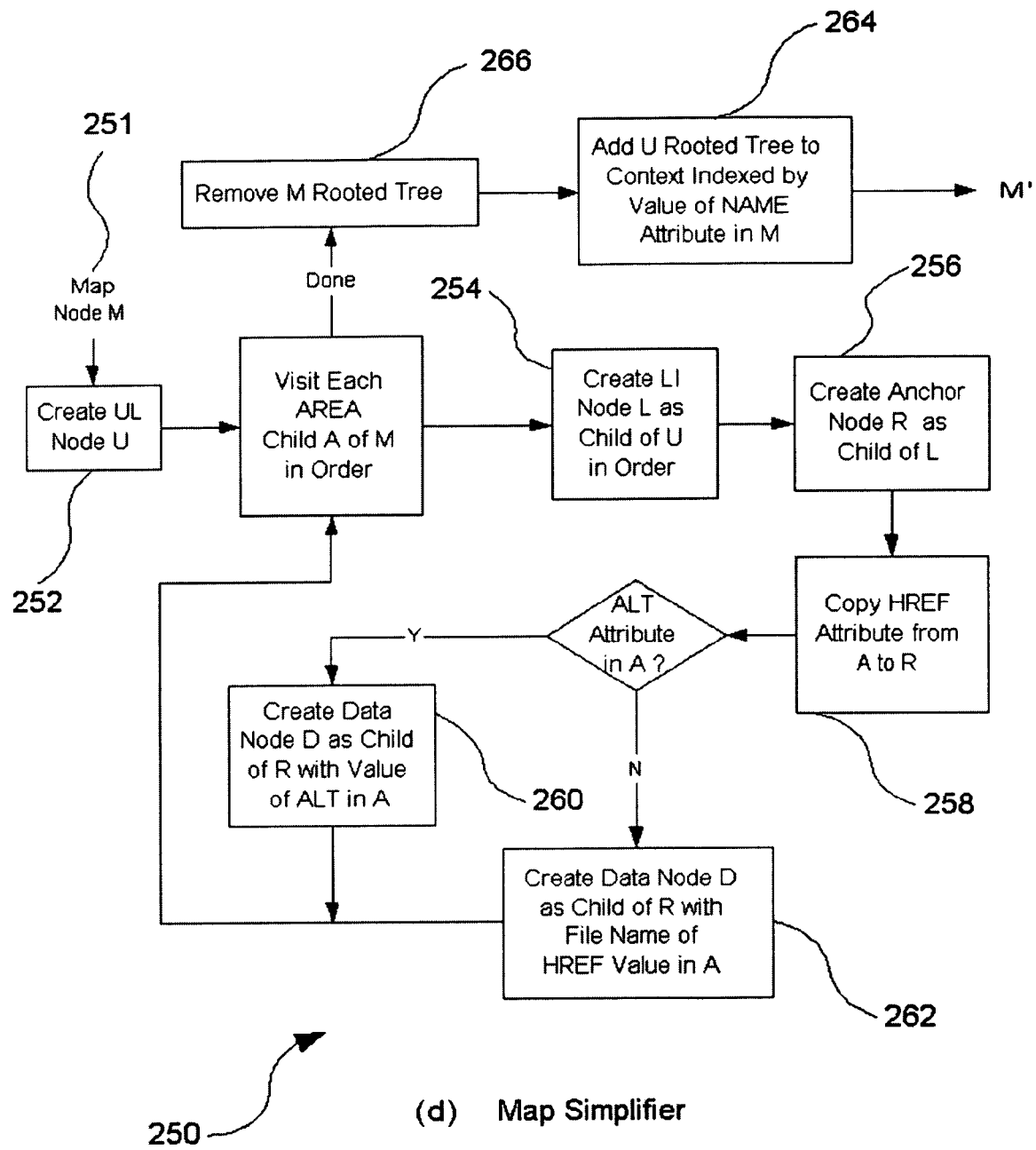
FIG. 23a and FIG. 23b show continuous steps to map document tree onto a simplified one based on a subset of XHTML tags according to FIG. 22a and FIG. 22b.
Figure 24:
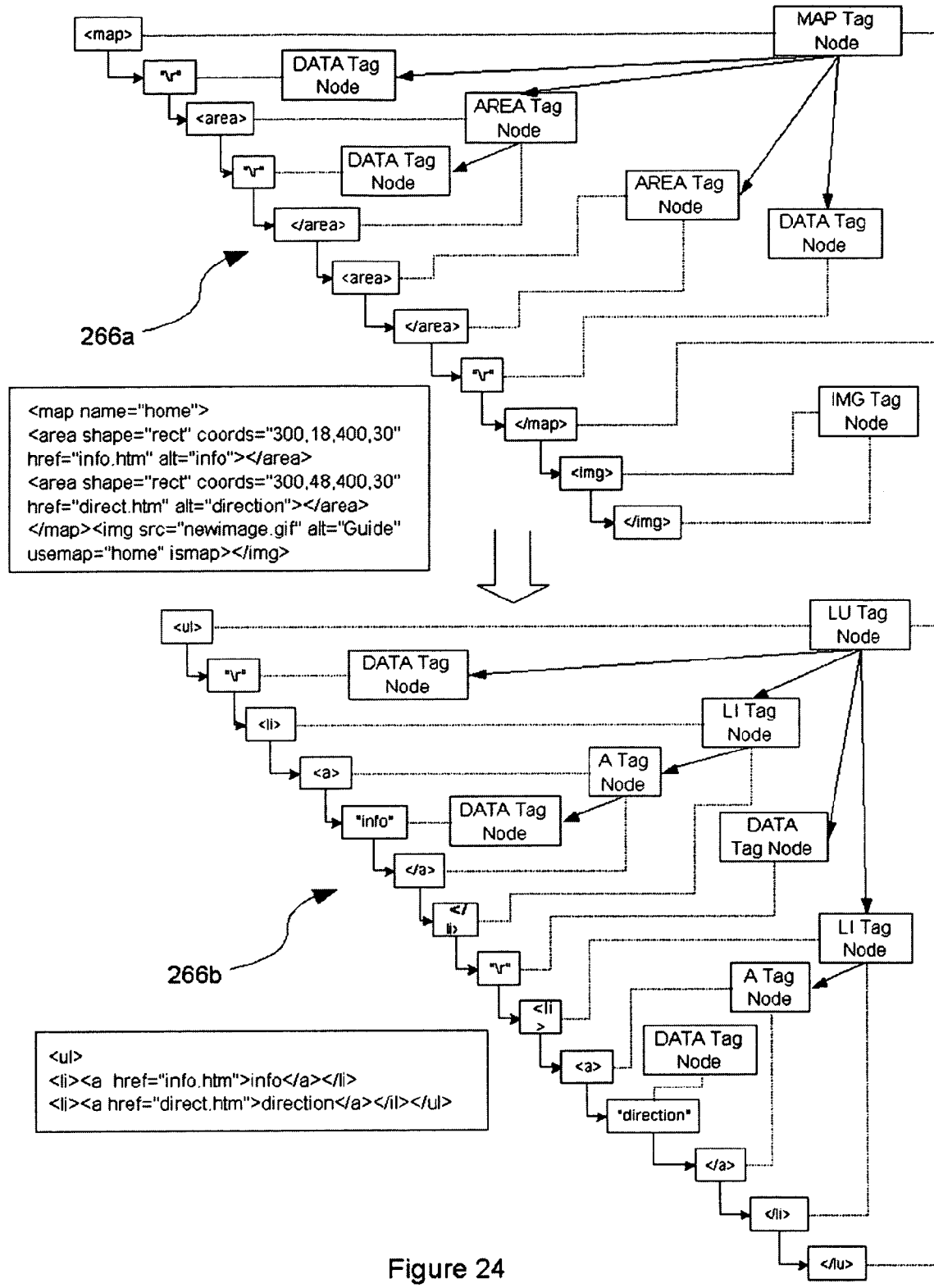
FIG. 24 is an example to demonstrate simplification of map tags onto list tags.

<MAP> node is handled by the map simplifier as shown in FIG. 23a (d) 250. The navigation links embedded inside a map are replaced by a newly created list of hyperlinks. In essence, a <MAP> node 251 is replaced by a <UL> node 252 and each <AREA> node under <MAP> node is replaced by a list <LI> node 254 with an anchor <A> node 256 presenting the reference specified in HREF attribute 258 inside <AREA> tag. Hyperlinked text for each <AREA> node is determined by its ATL attribute 260, if present. Otherwise, the file name of the URL specified by HREF attribute is used 262 instead. The resulting <UL> rooted document tree is then stored in the context 264 indexed by the name of <MAP> node through NAME attribute. <MAP> node rooted tree is then removed from the document 266. This is demonstrated in FIG. 24 with an example <MAP> rooted tree 266a and its corresponding <UL> rooted tree 266b.

Figure 23B:
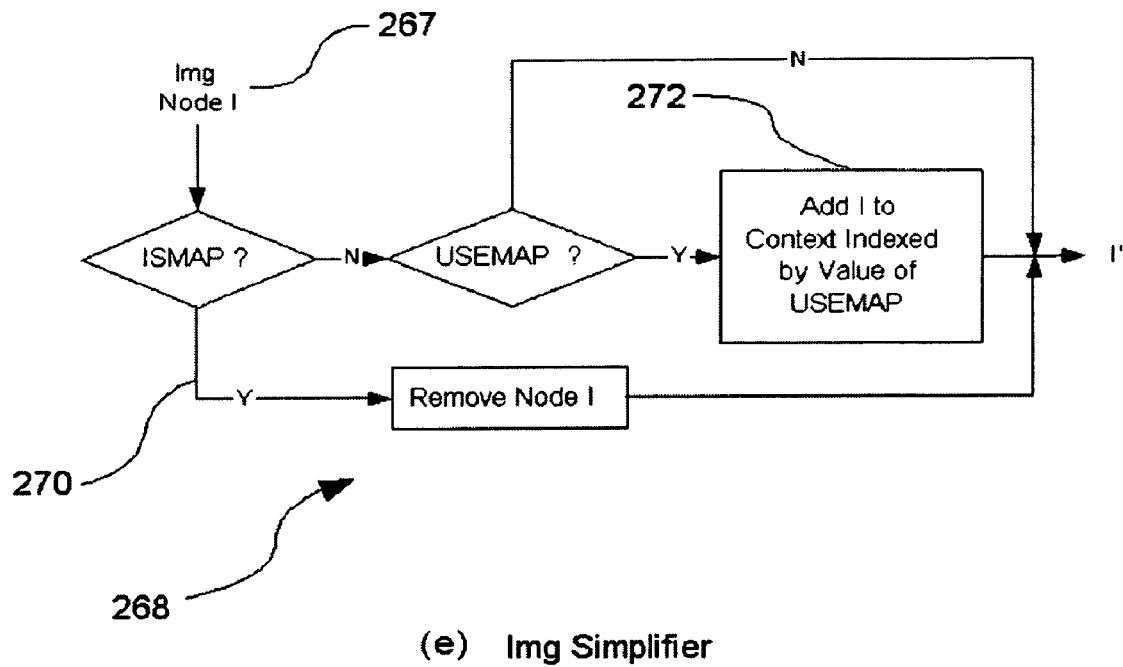
Figure 23B:
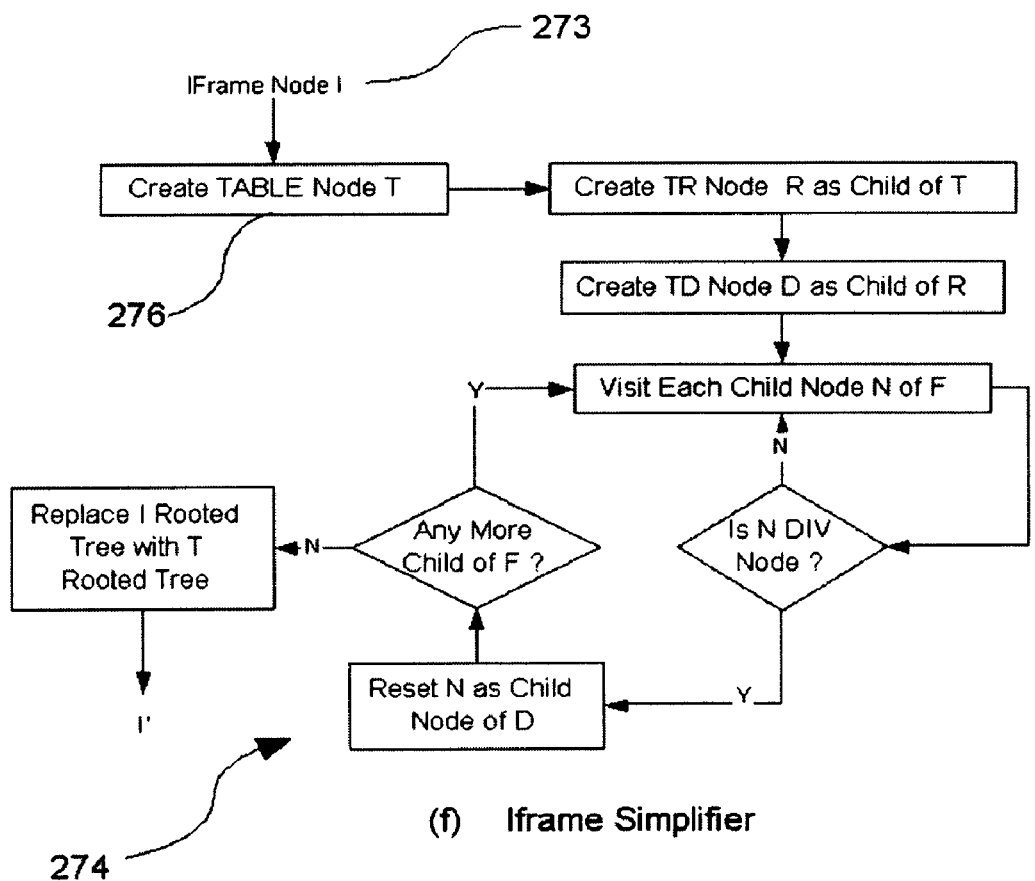

<IMG> node 267 is handled by the img simplifier as shown in FIG. 23b (e) 268. If it is a server side image map, as specified by ISMAP attribute, this node is removed 270. Because of possible scaling, image map is not supported. If the node is a client side image map, this node is indexed in the content 272 for possible replacement later with corresponding <MAP> tree.

<IFRAME> node 273 is handled by IFrame simplifier as shown in FIG. 23b (f) 274. A newly created single cell table replaces the original <IFRAME> tag 276. To distinguish alternate text enclosed by <IFRAME> tags, the fetched frame source content is enclosed by the parser with <DIV> tags. The figure describes detailed steps on how the table tree and the frame source content are connected and inserted into the document tree while <IFRAME> and alternate text is removed.

If a node does not match any of tags considered above, it is checked against the list in Table 2. Those with tag names not preset in this table are removed from the document tree 278. Then its attributes are updated 280 as shown in FIG. 21. Those attributes not listed in Table 2 are removed. All relative URL as in HREF or ACTION attributes are resolved according to document context with its absolute path. Actual font size has to be used for SIZE attribute associated with FONT node as well. Because of the presence of <BASEFONT>, relative font size can be resolved with the help of document context.

After walking through the whole document tree nodes, each <IMG> node with USEMAP attribute indexed by a map name, is further condensed 282 as shown in FIG. 21. The <IMG> node rooted tree in the document is replaced by the corresponding <UL> rooted tree created from original <MAP> node, if there is any, or removed if there is none. This is the last step to complete the simplification process.

Changes in the target tag and attribute list as well as how different types of document nodes are handled would result in variations of document tree reduction. For example, the data filter could employ a scheme to retain only content for hyperlinks or form interface but removing all others. Another example is the support of <STYLE> tags for getting more precise information and better control on how document would be rendered at client devices. Yet another example is support for international language attributes inside markup tags in addition to those from HTTP headers. As standards of markup language evolve, changes are expected to accommodate new developments.

Spatial layout constraints are heuristically estimated and calculated for test and image content embedded inside the document tree according to the semantics of HTML tags. Layout constraints include size, area, placement order, and column/row relationships. Display size and client capacity requirements are estimated for the simplified document through virtual layout on the underlying document tree. These parameters are used to determine how the document should be partitioned and scaled to accommodate a target client device. The process of virtual layout includes assigning placement constraints and calculating layout sizing information for each content node based on the constraints and a set of layout parameter settings.

Given a document tree, virtual layout determines the set of content children for each content node and assigns it placement constraint among these children nodes. A set of nodes $C_1, C_2, \ldots C_n$ form content children set S of a node N if 1. N is ancestor node of each node $C_i$ in S and 2. each node $C_i$ in S is either content node or data node and 3. for all leaf nodes under N rooted tree, there exists one and only one node in S as its ancestor node. By default, the content children set of a content node is defined as the collection of highest-level offspring content/data nodes. Virtual layout assigns placement constraint to document tree nodes such that 1. every leaf node of the document tree belongs to one and only one content children set and 2. each content node belongs to at most one content children set.

Figure 27:
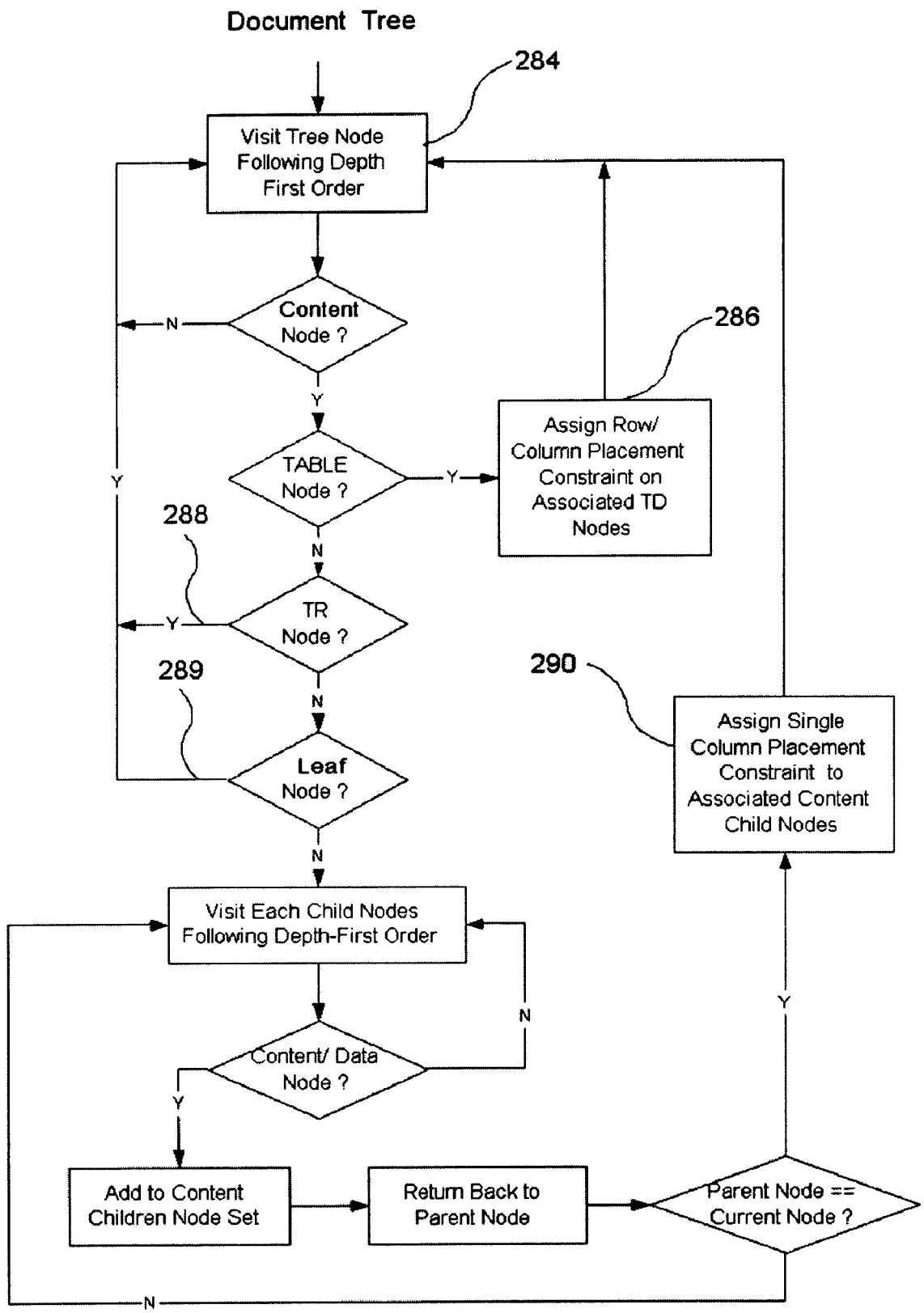
FIG. 27 shows steps to apply layout and style constraints.

To estimate the minimum display width needed for content rendering, placement constraint is designated to content nodes. Placement constraints adapted here are either table with rows/columns or simply a single column. Steps to assign placement constraint are illustrated in FIG. 27. It visits each node following depth first order 284 and adds row/column constraint to <TABLE> node on the associated <TD> node 286 accordingly, including row and column span. <TR> node is ignored 288 as its layout semantic has been considered when assigning row/column constraint for its parent <TABLE> node. All other content nodes, except for leaf ones 289, are assigned single column placement constraint 290 on its content children set.

Four sizing parameters could be derived from the document tree with placement constraints assigned and display font sizes selected for the target client device. They are scalable width (W) in pixel, minimum width (M) in pixel, image area (A) in square pixel, and total number of characters (N). W represents size required for scalable layout components such as <IMG> and <TEXTAREA>, for example. M characterizes the minimum fixed layout component needed. It is typically the width of the longest word in the document text. A is the total area of all images in the document. N is the number of all display characters inside the document, symbolizing the amount of text information carried. The minimum display width D required for rendering a document rooted at a node with W and M will be W+M.

Font size and language settings are needed to calculate layout sizing information. Character and word boundaries are determined by language encoding for the content text data. Average width of character is dependent on the specified font family and font size. To simplify the layout process, a single font family with minimum and default font size is indexed by the client agent and language code. For example, English content from IPAQ IE browser would use Times Roman font with minimum font size 2 and default font size 3. Selection of these parameters is to be as realistic as possible and depends on the settings of specific user agent.

A layout context is referenced and updated when visiting each node. Included in this context are current font size, layout sizing constraint (Nmax, MWmax, Amax), NoFlow flag, and Atomic flag, etc. Nmax is the maximum value of N allowed for the whole document. MWmax is the maximum (W+M) value for the whole document. Amax is the maximum image area allowed, NoFlow flag is used when text characters would be laid out in one line. And Atomic flag means no partition is allowed. Style nodes such as <FONT> node affect the font size. <FORM> node enables Atomic flag, meaning elements of <FORM> tags should belong to the same document. <SELECT> node enables NoFlow flag to indicate text in a data node, mainly under <OPTION> node, should be shown in one single line.

Figure 28:
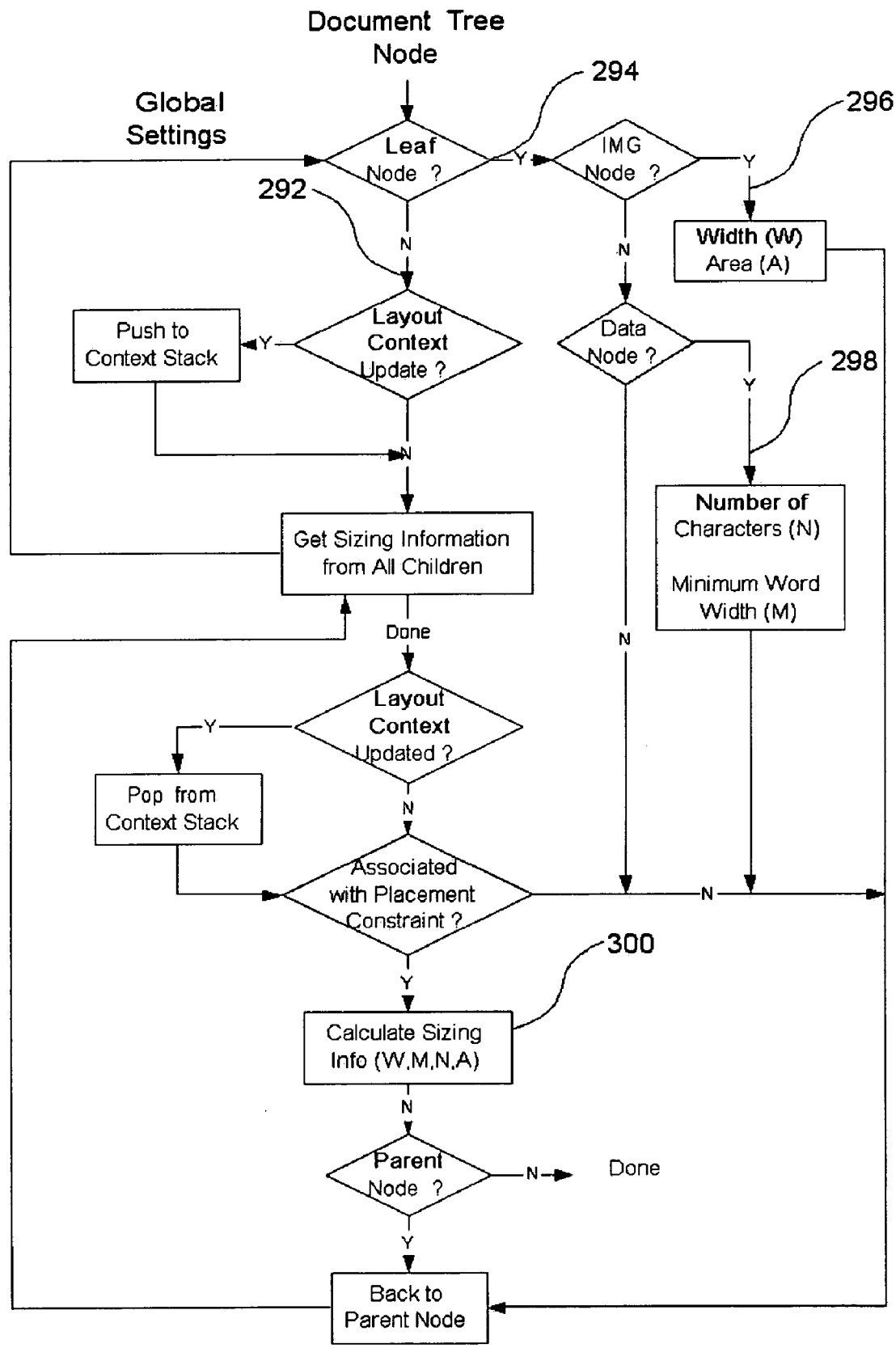
FIG. 28 shows virtual layout steps to assign sizing information to document node.

Steps to calculate sizing parameter values for a document node associated with placement constraint are shown in FIG. 28. Initial values of W, A, N, and M are set to zero for all nodes. A bottom up process is employed to propagate layout sizing information from leaf nodes to the root through these constraints. Starting from the root, it walks down the tree in a depth first order to size each node. For non-leaf node 292, it is checked if layout context, including font size, and character flow control, needs to be updated. A leaf node 294, which is either data node, containing only character text, or image node, linking an image source, provides the basic layout dimension data. An <IMG> node 296 with width w and height h would have size W=w, A=w*h, N=0, and M=0. A data node 298 without NoFlow flag on text layout context total number of characters t and the longest word in terms of characters 1 would have size N=t, M=1*F, W=0, and A=0, where F is the average character width under the current font setting in the text layout context. If NoFlow flag is set for text layout context, as in the case under <SELECT> node rooted tree, M is assigned as t*F instead of 1*F. More precise calculation is possible when equipped with detailed display size information for each character instead of using average with.

Figure 29:
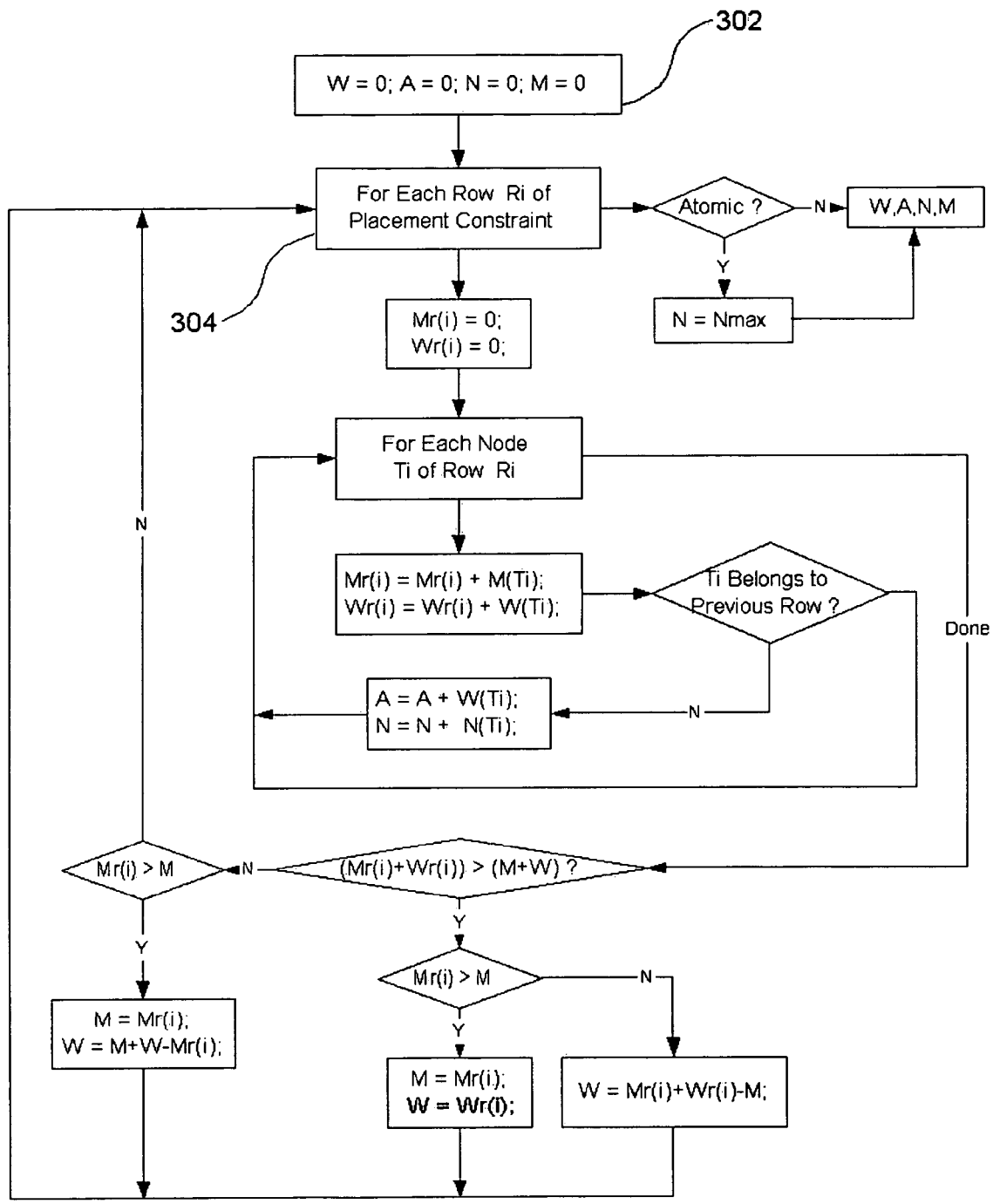
FIG. 29 shows steps to calculate layout sizing parameter through placement constraint.

After all children of a content node have been sized, the associated placement constraint is applied to obtain sizing information 300 for this node. Generic steps to calculate these parameter values according to the constraint are shown in FIG. 29. A slight variation is applied for <SELECT> node. (W, A, N, M) is initially set to (0,0,0,0) 302 during the calculation. Each row is iterated through 304 to update these four values. The number of nodes in a row could be smaller than the number of columns in the constraint because of column span consideration. Area A and total number of characters N are additive but considered only once when spanning multiple rows. M and W are assigned such that both (M+W) and M should both be maximum among all rows.

Propagation function could be node specific. For <SELECT> node, the minimum of all M values among all its <OPTION> child nodes is assigned as <SELECT> node's M value. Based on a simplified document tree, the virtual layout engine derives document layout parameters without conducting actual document rendering. Final result depends on the set of sizing parameter used, placement constraints applied to each node, constraint propagation functions adopted, text layout style context employed, and the global display size setting including language encoding and user agent font families. Variation of these parameters is expected as additional aspects of document layout are considered.

Based on the display size and rendering/network capacity constraints, the document tree is partitioned into a set of sub document trees with added hyperlinks according to the layout order and content structure. Based on the sizing estimation from virtual layout, a document is partitioned and/or split according to user agent size constraints. Partitioning applies to a document and creates new documents while split operates on a document node, generating new nodes but not additional document. Partitioning and split operations are applied in accordance with the document tree to preserve the original content structure as much as possible.

Figure 30:
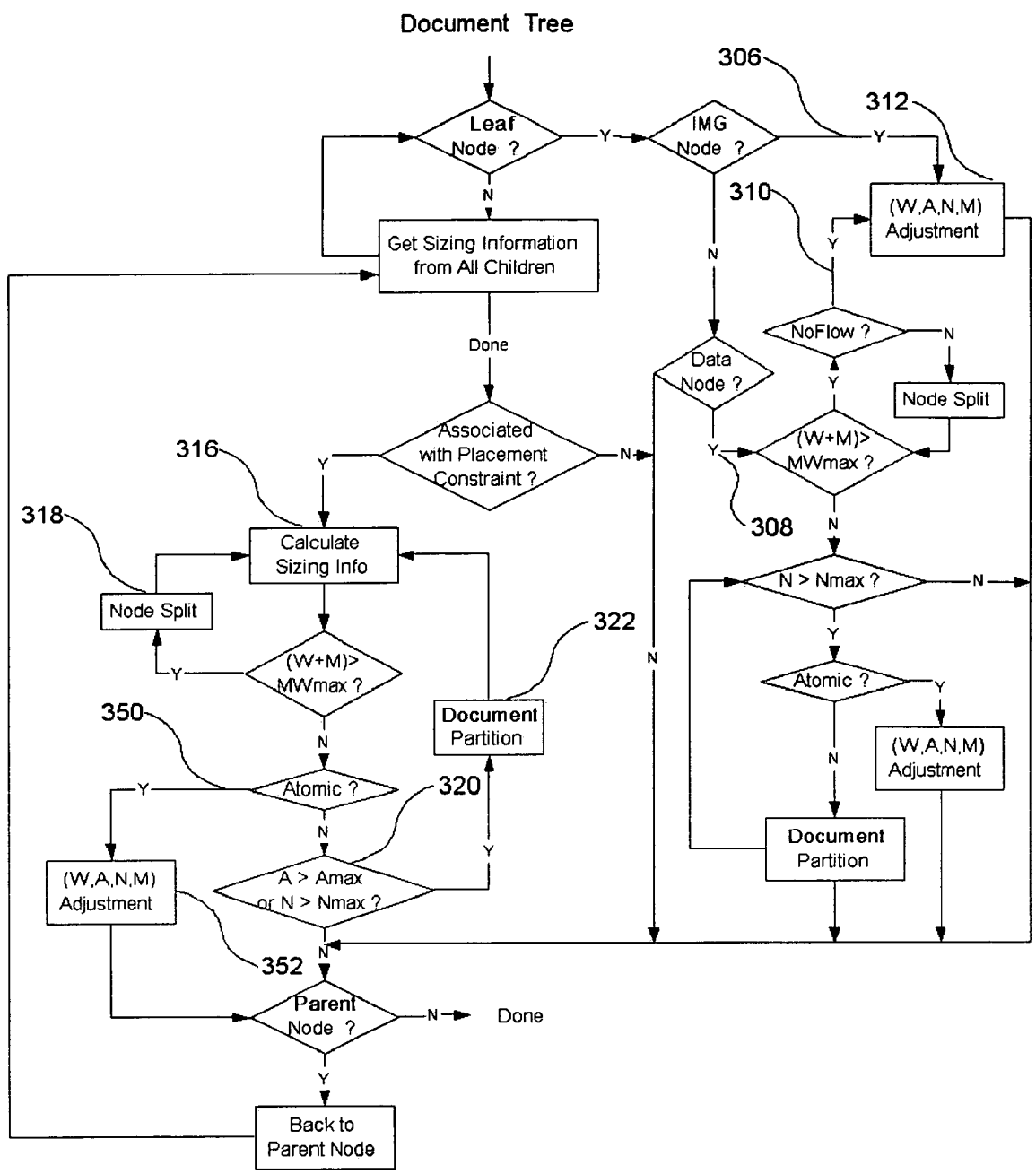
FIG. 30 shows steps to split and partition document tree based on estimated layout width and content size.

Virtual layout and document partitioning are interweaved together in a bottom up process from leaf tree nodes to arrive at a set of documents where each one satisfies the user agent constraint. The steps of this process are shown in FIG. 30. Starting with the root node, it traverses down the tree in a depth first order and accumulates document elements, calculating layout sizing information, and performing partitioning or splitting to ensure sizing constraints are satisfied for each document node collected. Sizing parameters (Wt, At, Mt, Nt) for each node T shall be partitioned or split such that 1. (Wt+Mt)<MWmax; 2. At<Amax; 3. Nt<Nmax.

Leaf node considered for sizing is either an <IMG> node 306 or a data node 308. <IMG> node 306 cannot be split or partitioned but a scaling factor could always be found to satisfy the sizing constraint. With NoFlow flag on in the associated layout context 310, a data node 308 cannot be split nor partitioned. Its sizing parameters are adjusted artificially 312 to satisfy the layout constraint with an assumption that the user agent would be able to make proper adjustment on the client side.

(W,N,M,A) adjustment makes updates directly on the sizing parameter values without changing the document tree. If an <IMG> node with original sizing data as (W,A,0,0) where W>MWmax or A>Amax, the sizing parameters are adjusted through a scaling factor r=min(W/MWmax, sqrt(A/Amax)). The adjusted set of sizing parameters would be (r*W, r*r*A, 0, 0). A data node under NoFlow flag with original sizing parameter (0, 0, M, N) exceeding sizing constraints would be adjusted to be (0,0, min(M, MWmax), min(N, Nmax)).

Once sizing parameters (W,A,M,N) of a node is obtained 316, the constraint MWmax is checked and split operation 318 applied if (W+M)>MWmax until the constraint is satisfied, then both Amax and Nmax constraint are checked 320 and partition operation applied if (N>Nmax) or (A>Amax) until both are satisfied. Document partition 322 is based on node split but creating a new document tree.

To split a data node, an attempt is made to insert breaks in the longest word to bring the width requirement under the MWmax constraint. This is an update of the node without adding new ones. In the case no such break is possible, M value is artificially adjusted to MWmax with an intent for user client to handle and leave the node unchanged.

Figure 33:
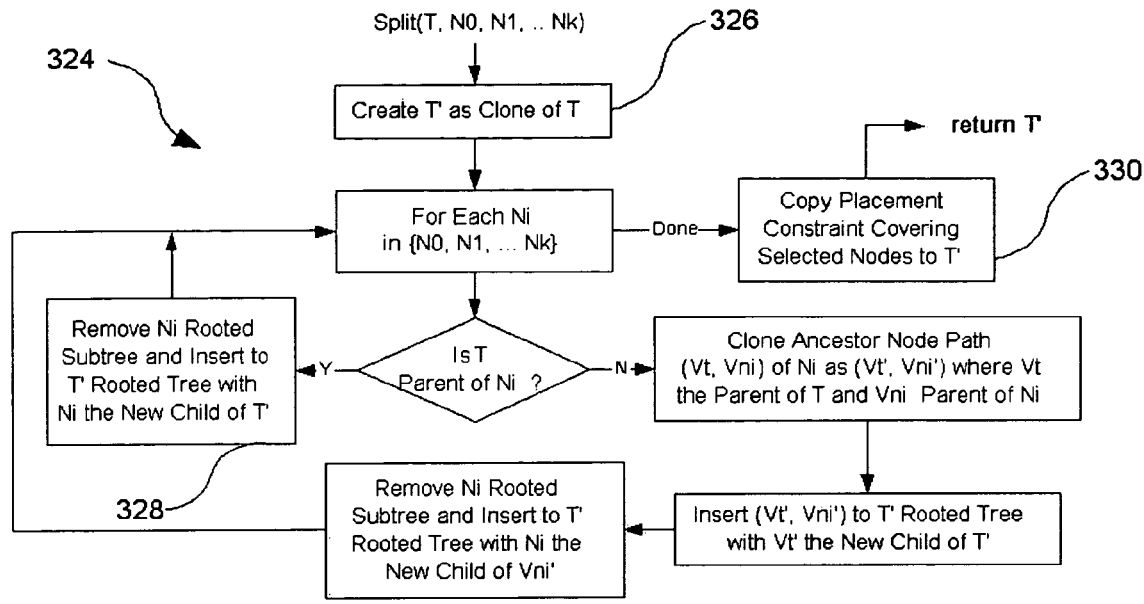
FIG. 33 shows steps to split a node and an example.
Figure 33:
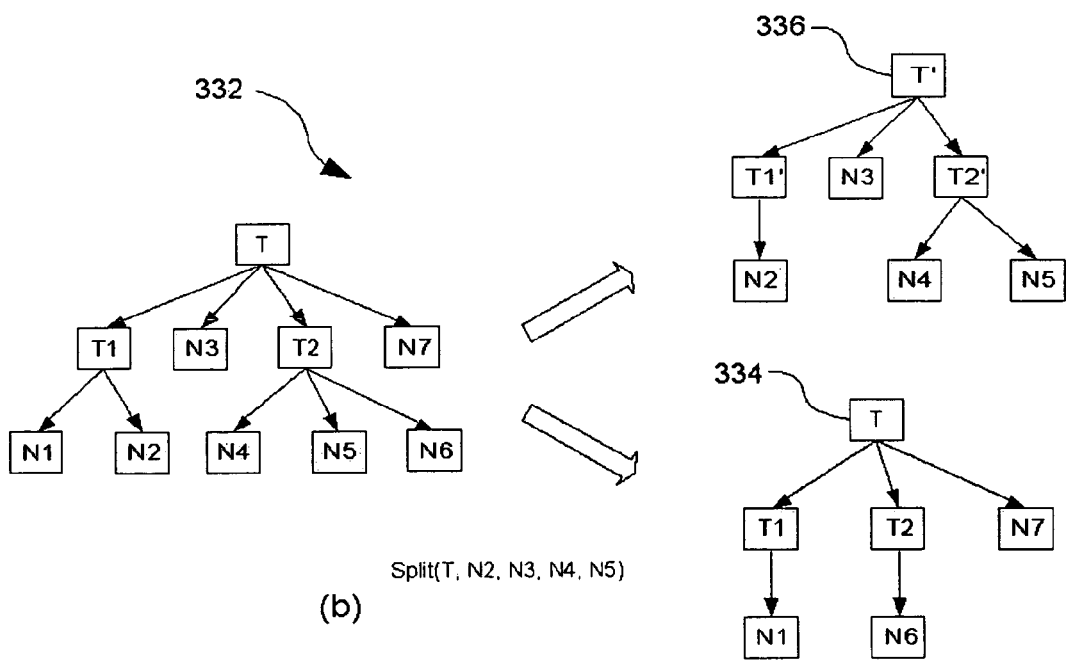

Split of non-data node T separates the original T rooted sub tree into two separate ones. This operation, denoted as split (T, N0, N1, . . . Nk), requires the target node T and a set of descendant content nodes, N0, N1, . . . , Nk, from its associated placement constraint. The steps are shown in FIG. 33 (a) 324. A clone of T is created as T' 326 to be the root node of the new spin out sub tree. All paths between Ni and T are cloned in the T' rooted sub tree. Each Ni rooted sub tree is removed from the original document and inserted to T' rooted one under the same path copied 328. A copy of placement constraint associated with T is attached to T' governing the node set N0, N1, . . . Nk. A sample of split operation is shown in FIG. 33 (b) 332, where split (T, N2, N3, N4, N5) results into two trees rooted by T 334 and T' 336 respectively. Note that clones of T, T1, T2 are created as T', T1' and T2' in this case.

Figure 31:
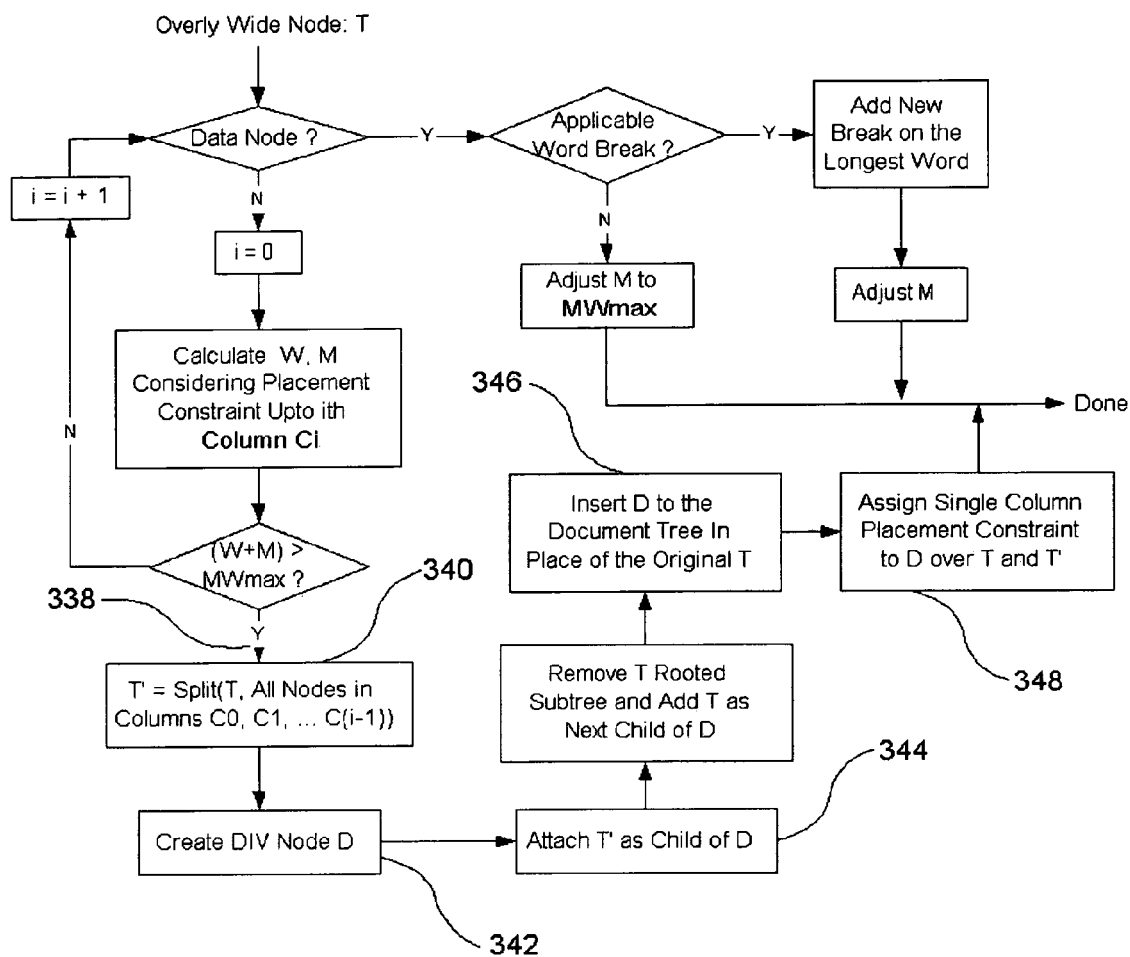
FIG. 31 shows steps to split a document node with oversized layout width.
Figure 35:
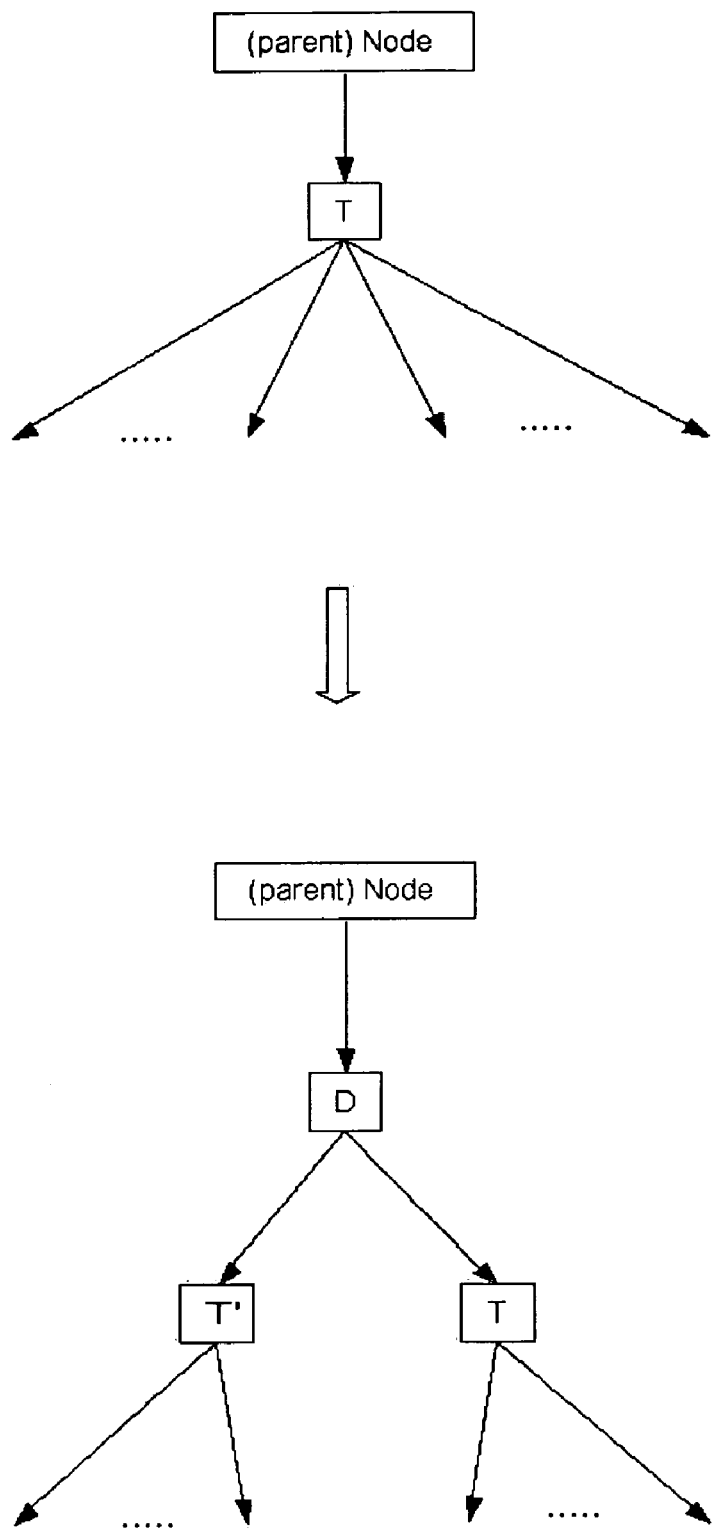
FIG. 35 is an example to show document tree change before and after node split without document partitioning.

A non-data node T with (W+M)>MWmax needs to be split based on columns in the associated placement constraint, as shown in FIG. 31. It is not possible for a node with placement constraint with single column to be with (M+W) >MWmax. Every one of the descendant content node of a column will have (W+M)<=MWmax before the current node is considered. A column C (i-1) is selected 338 such that MWmax constraint is satisfied considering the partial placement constraints including all nodes belonging to columns from the first one up to C (i-1), but not when adding nodes from the next one column Ci. A new T' rooted sub tree is created 340 by node split based on nodes from maximum consecutive columns C0 up to C(i-1). In addition, a dummy <DIV> node D is also created 342 with the T rooted tree removed from the document tree. T' and T are attached to D 344 as its children with T as the next sibling of T'. D is then added back to the document tree 346 in the original place of T. Default single column placement constraint on T' and T is assigned to D 348. A sample of this split operation is shown in FIG. 35.

After MWmax constraint is handled, Amax and Nmax are considered as shown in FIG. 30. If Atomic layout context flag is on 350, such as the case for <FORM> related nodes, no document partition is allowed, and the process proceeds by updating N and A values 352 such that N<=Nmax and A<=Amax without performing any partition operation. Otherwise document is partitioned on the current node.

Figure 32:
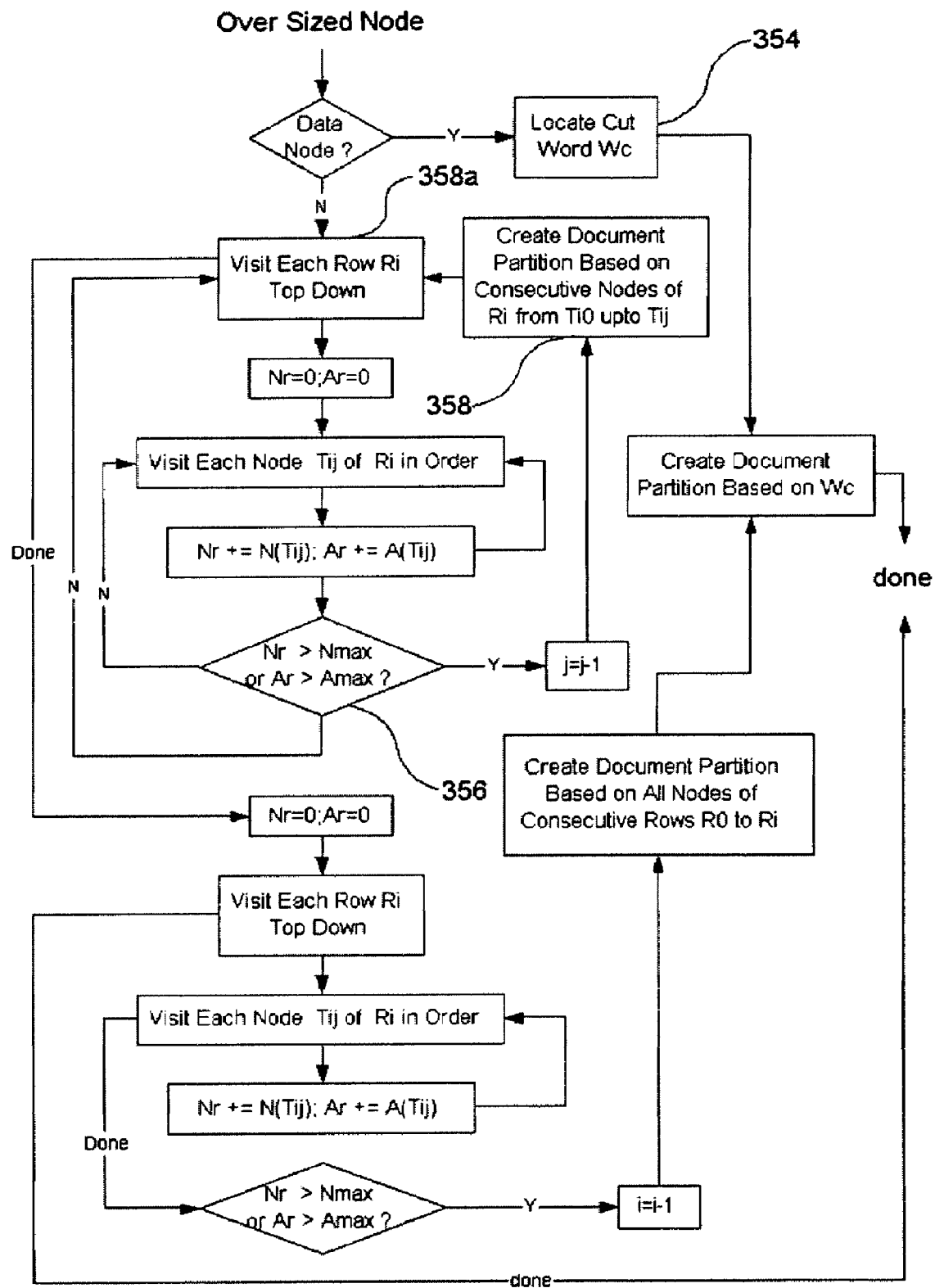
FIG. 32 shows steps to partition document against an oversized document node on sizing parameters A and N.

Steps to partition a document is shown in FIG. 32. For a data node, a cut word is located 354 from the associated data such that number of characters before and including the cut word constitute the maximum number of consecutive words that would satisfy Nmax constraint. For a non-data node, a set of descendant content nodes is selected from rows of its placement constraint to spin off a document partition. Selecting which nodes for partition follows rows and column/row span specifications in the placement constraints. If N or A of any row is oversized 356, a set of consecutive nodes from this row are selected to be partitioned 358. Afterwards, it continues to examine row by row from top down 358a and finds the maximum number of consecutive rows to spin off.

Figure 34:
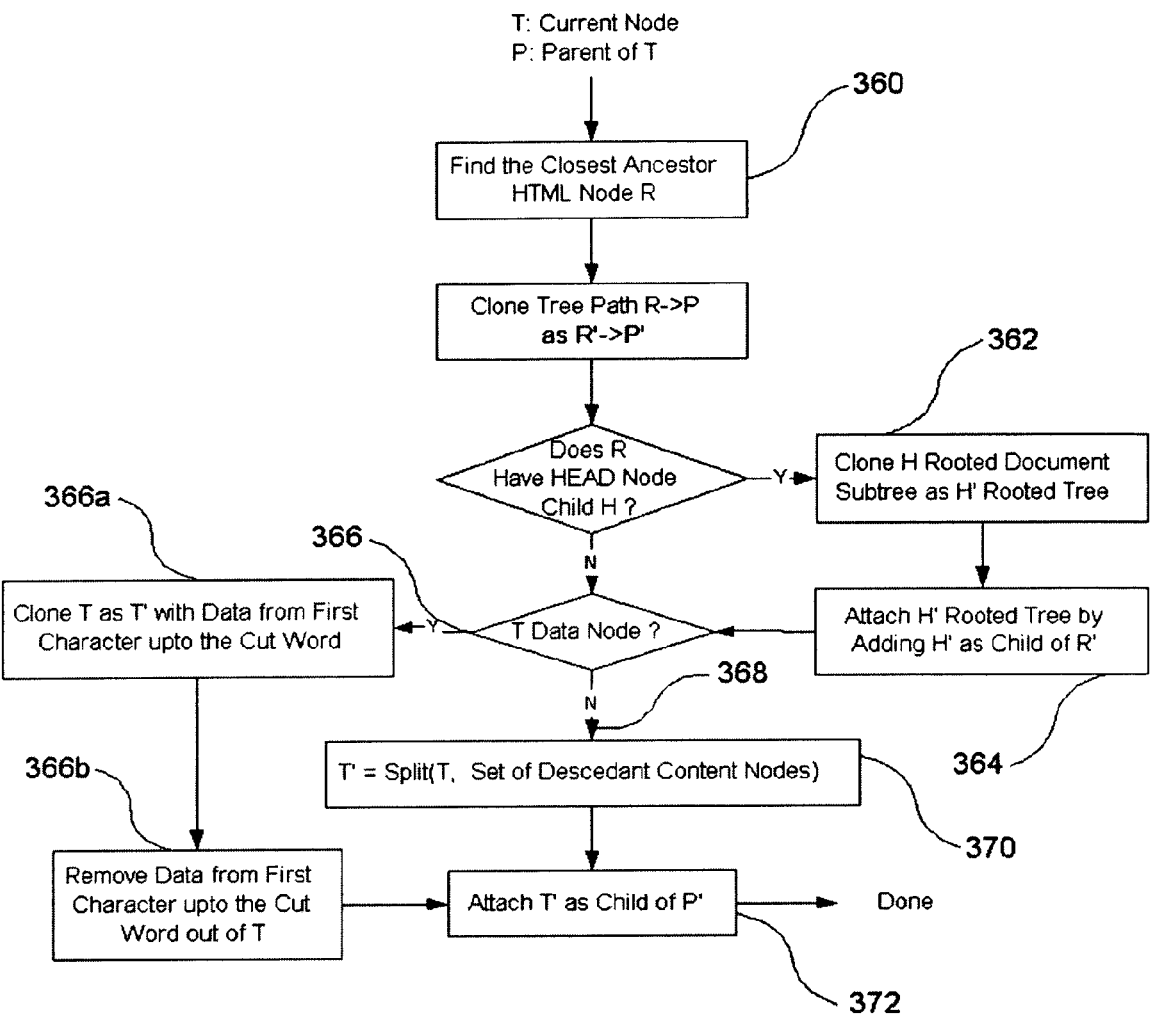
FIG. 34 shows steps to create document partition based on a set of descendant content nodes from placement constraint.

A document partition on a node is accomplished by cloning its ancestor nodes and a node split on itself, as shown in FIG. 34. The ancestor tree path includes the closest ancestor <HTML> node 360 to its parent node. It is possible for a document node to have multiple <HTML> ancestor nodes because of expanded frame sources. If the selected <HTML> node has child <HEAD> node, the <HEAD> node rooted sub tree is also cloned 362 and attached to the new <HTML> node as descendants 364.

Figure 36:
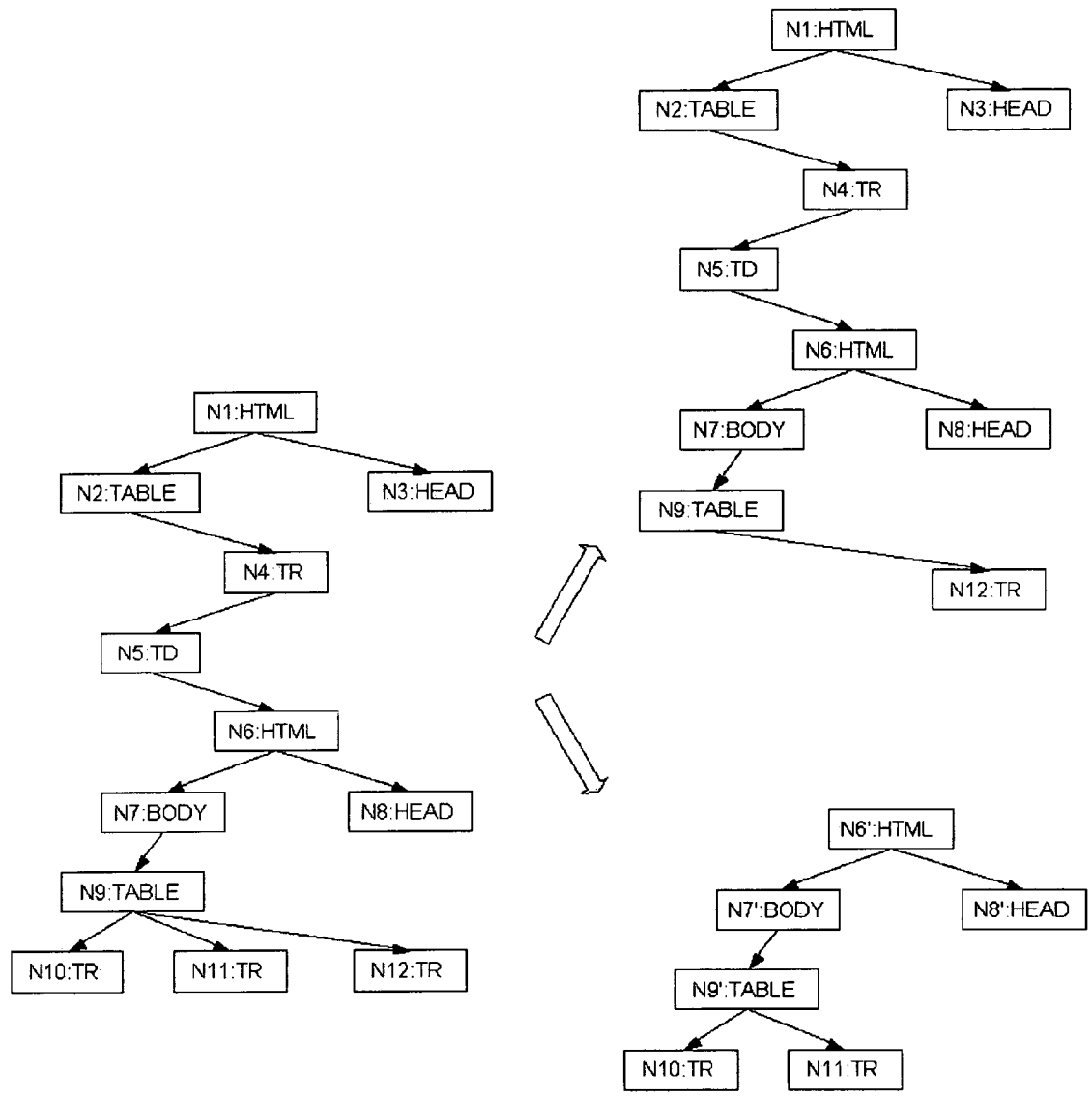
FIG. 36 is a document partition example.
Figure 37:
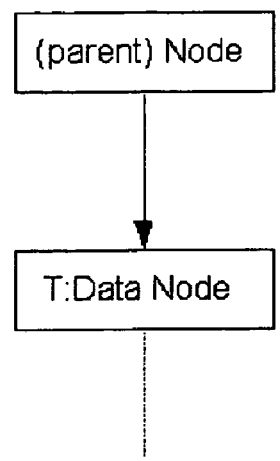
FIG. 37 is an example of document data node partition.
Figure 37:
Figure 37:
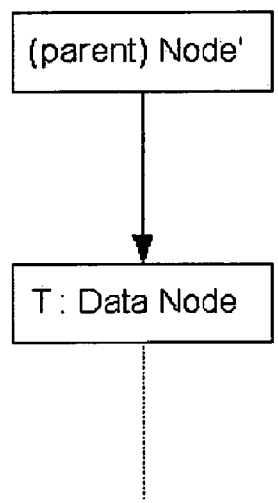
Figure 37:
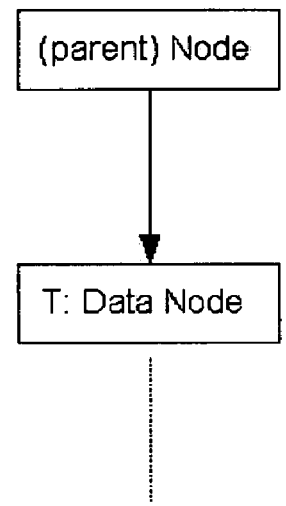

Data node and non-data node are handled differently. For a data node 366, its clone T' is created 366a and the set of data from first characters up to the cut word identified is moved from the original node to the cloned one 366b. An example is shown in FIG. 37. For a non-data node 368, a sub tree rooted by T' is created 370 by node split based on the selected descendant content nodes. T' is then attached to the cloned tree 372 path to form a document partition, rooted by an <HTML> node R'. Document changes based on tree operations according to layout sizing constraints depend on what constraints to use, how they are used and which operations to apply. Variations are possible for different considerations. For example, a new constraint Nmin and Amin could be introduced to ensure each document partition would have N and A satisfying N>Nmin or A>Amin with split and partition decisions updated accordingly. Partition could be applied accordingly with slightly different results. FIG. 36 is a document partition example.

Based on target device display size constraint, each sub document tree is scaled individually by adjusting height and width attributes through the scalar. Source image references are modified, if needed, to assure server side image transcoding capabilities, including, for example, image format change, color depth adjustment, and width/height scaling, are leveraged. Scaling process is applied to each partitioned document as well as the updated original one to change tag attributes and perform tree optimization at the same time. Scaling factor is calculated according to estimated document node layout sizing information and the target client display width available.

Figure 38:
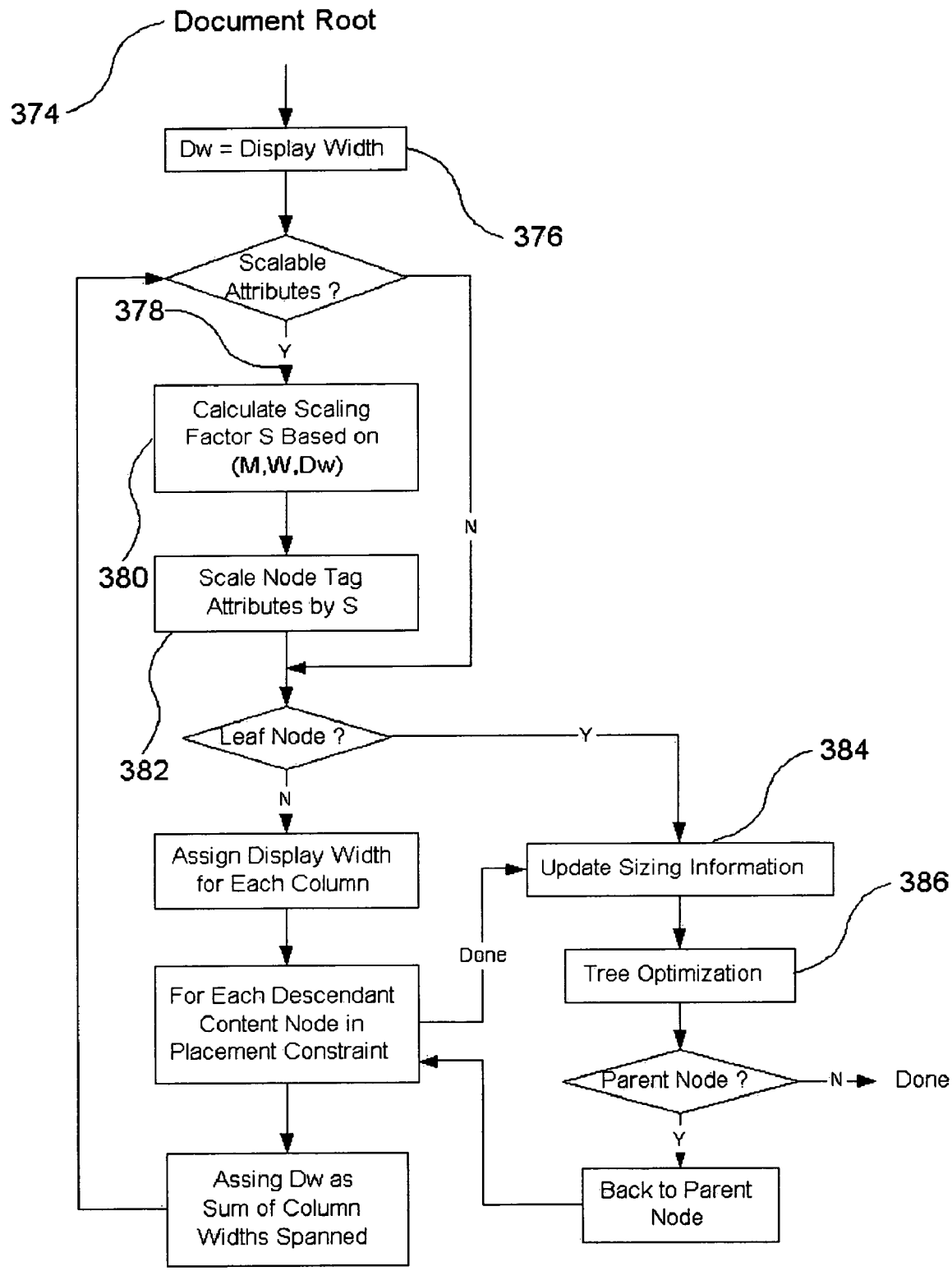
FIG. 38 shows steps to scale document partition.

Overall steps for scaling are shown in FIG. 38. Starting from the document root 374, it assigns maximum display width available for each document node. Initially, maximum width available for the root node is assigned as the display width 376 of target client device. If scalable attributes are present 378, scaling factor is calculated 380 and applied 382. Scalable attributes are also applicable for text related nodes, in addition to image ones, such as WIDTH, HEIGHT, and SIZE for <INPUT> tag and COLS for <TEXTAREA> tag. SRC attribute for scaled <IMG> tags should be updated to embed scaling information with redirecting path for special image processing server when needed.

Given M, W, and Dw, scaling factor S is calculated as (Dw−M)/W if (Dw>(W+M)) and (W>0). Otherwise, S is set to 1, i.e. the content fits the screen without the need for scaling. As M represents non-scalable sizing information such as minimum word length, only W, usually minimum image width, could be scaled.

Sizing information for a document node is updated 384 and optimized 386 after scaling operations have been performed on all descendant content child nodes according to its placement constraint. The optimization removes content nodes with empty A and N. Non-content nodes without any content offspring nodes are also deleted. Placement constraint is also simplified by removing rows and columns without any descendant content nodes. Column and row span values are updated accordingly. Whether to allow ALIGN right or left for a child <IMG> node, when present, can be determined by the available display width for the current node and the minimum width needed for the rest of child nodes. Additional constraint could be employed to eliminate document nodes that don't satisfy minimum height, width or maximum scaling factor values, for example.

Figure 39:
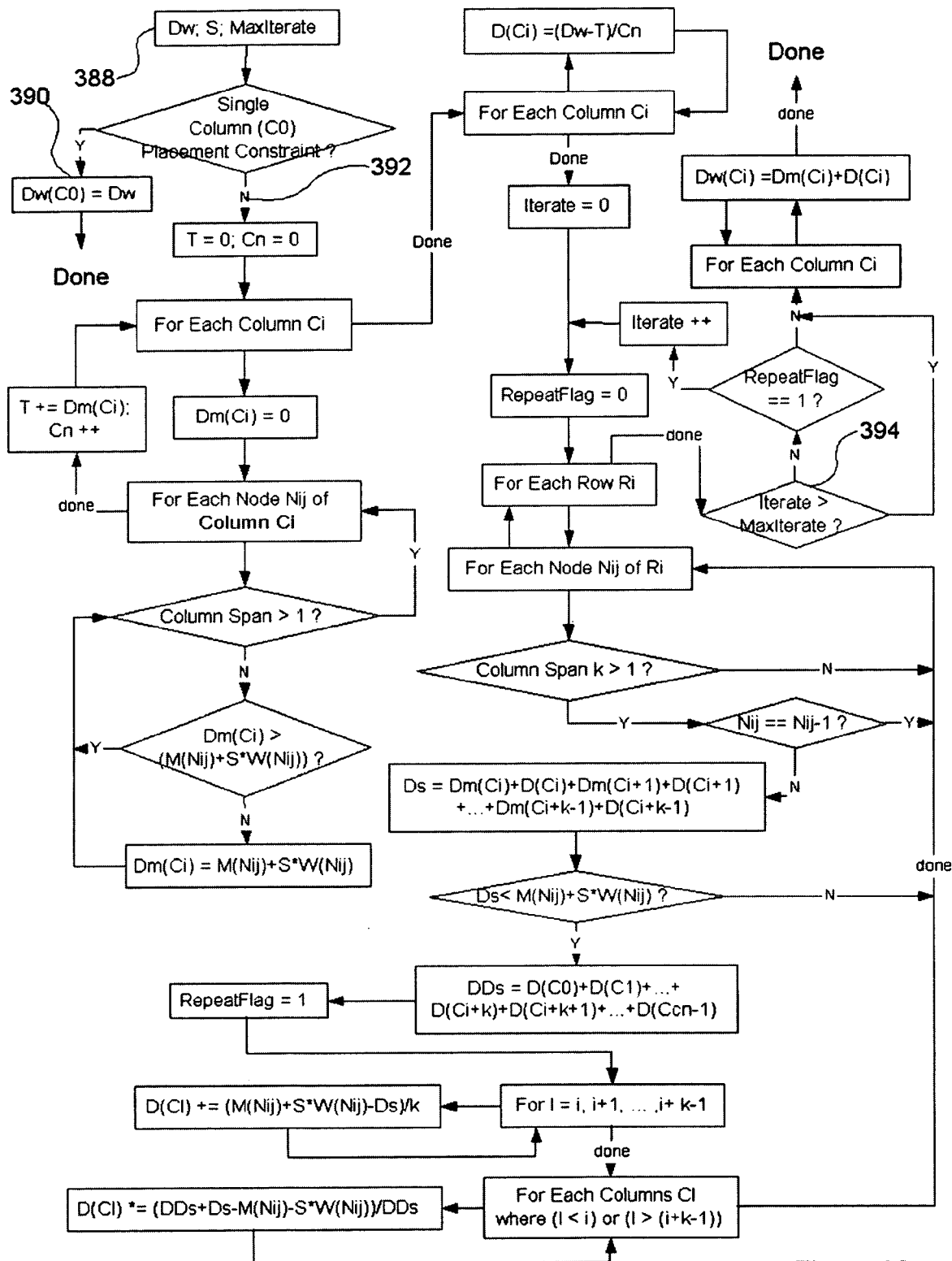
FIG. 39 shows steps to calculate minimum width required for a column of document node.

Steps to assign Dw to each descendant content child node of a placement constraint are shown in FIG. 39. The display width available for the current node, Dw 388, its scaling factor calculated, S 388, and a parameter to control the maximum number of iterations employed inside the steps, Maxiterate 388, are required to proceed. For a single column placement constraint, each node of the column is assigned the same width 390 as Dw. Otherwise, an algorithm is used 392 to distribute Dw to each column, hence each node.

The objective of this algorithm is to find a set of values for all column width such that each node in the placement constraint can be accommodated and the sum of all column width equals Dw. Because of the way Dw is calculated, there always exists such a set of values. This algorithm considers first the subset of nodes with single column span. It establishes minimum column width Dm(Ci) for each column Ci. Cw, by definition, is no less than sum of these minimum widths. The difference, if there is, is distributed among each column Ci as D(Ci).

Then it iterates through all other nodes with multiple column span and makes adjustment of column width accordingly for the new node constraint while maintaining the original minimum column width assigned. Because of convergence nature of this assignment, it is expected to settle down to a solution after certain steps. However, maximum number of iteration cycles along the nodes is set 394 to arrive at an acceptable solution without much cost.

Several additional notations used in FIG. 39 warrant explanations. T is the minimum total column width based on nodes with single column span. Cn stores then number of columns. RepeatFlag indicates whether a satisfactory set of column width values have been assigned after a loop considering all nodes with multiple column span. Iterate counts the number of iterations. Ci stands for ith column and Ri for ith row. Nij is the node on ith row and jth column. With multiple column and row spans, Nij and Ni'j' could stand for the same node although i !=i' and/or j !=j'. Ds represents the cumulative column width allocated defined by column span of a node. DDs is the sum of all width in addition to the minimum one for each column not covered by the column span of a node.

After a node is scaled, optimization rules are applied 386 to either remove the node or the whole rooted tree. A content document node which doesn't have any content size, i.e. A=0 and N=0, would be removed together with its rooted tree. In addition, <HTML> node which is not document root, created because of <FRAMESET> handling, is removed along with its child <HEAD> node rooted tree.

Content scalar as in FIG. 38 describes a method to determine how sizing specification in content elements should be updated so the resulting content would fit the display screen properly. This method considers available display window width, content sizing information estimated, and the placement constraint embedded with an algorithm to calculate the minimum width and a method to scale the applicable sizing attributes. Variations are possible for the set of content attributes to size, how new sizes are calculated, handling of boundary conditions such as when an element becomes too small to be significant, and how the algorithm is designed to arrive at a solution.

Based on the set of partitioned and scaled document trees, corresponding markup files are generated according to the subset of XHTML specs defined in Table 2, along with navigational relationship among each other. Document partition operation defines a hyperlinked relationship between the document tree with the split node and the one partitioned out. Additional ordering relationships are established for accessing one document from another in a linear manner based on the original document source text order.

Figure 40:
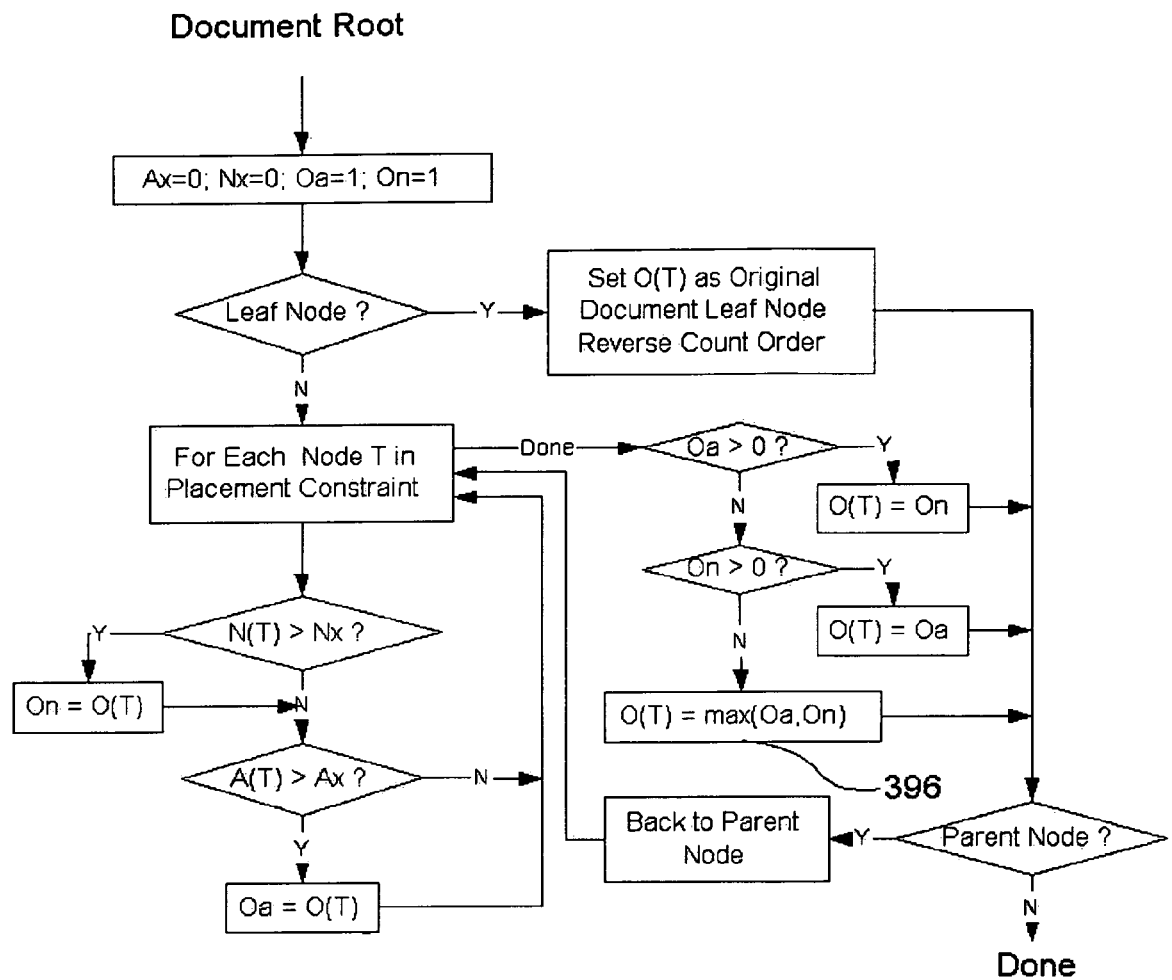
FIG. 40 shows steps to obtain navigation order of a document tree.

Steps to calculate order for each document are shown in FIG. 40. The order of a node T, denoted as O(T), is obtained by the sequence count of content leaf nodes appearing in the original document tree in reverse. For example, the first content leaf node is designated with order 0, the next one −1, etc. The order is propagated bottom up from leaf nodes of a document tree. The order of a node is determined by two descendant content nodes, if different, with the maximum A and maximum N sizing 396. If these two nodes are different, the one with the larger order is selected during propagation. Many other approaches could be adopted to create hierarchical links and linear order among document trees. They could be randomized, based solely on particular type of content nodes, or using the first, last, etc. leaf node order for navigational relationship.

Figure 41:
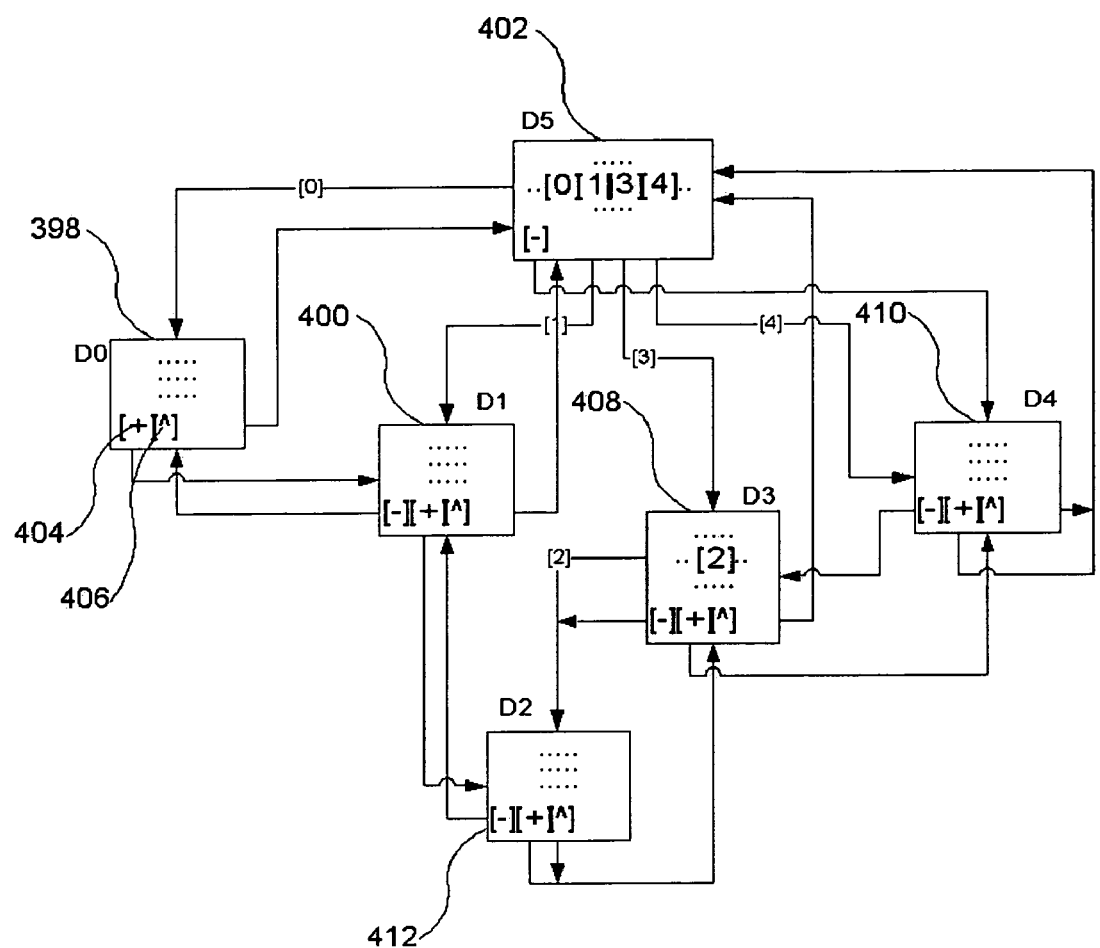
FIG. 41 shows a sample of hyperlinks and navigation order among document partitions.

Sample hyperlinks and navigation order so constructed are illustrated in FIG. 41. Six document partitions are ordered D0 398, D1400, . . . , D5 402. Hyperlink [−] points to the previous document, [+] to the next, and [0̂] to its parent. If the first page selected to send back to the client is based on navigation order only, the client receives document D0 398. The user could either click on [+] 404 from D0 398 to go to the next page, D1400, or back to its hierarchical parent page, D5 402, through [0̂] 406. From page D5 402, the root page, four partitions D0 398, D1400, D3 408, and D4 410 are directly linked as its child document pages. Although D2 412 follows D1400 in order, it is also linked under D3 408 hierarchically. Such hierarchy has been built during document partitions reflecting the original document layout semantics.

The first page returning to the client after partitioning varies depending on the need. It could be the first one based on navigation order, the root page along the partition hierarchy, or a separate page built from these partitions for special purpose. One such example is a catalog page with simple summary information on bandwidth requirement and navigation as well as hierarchy relationships among the pages, connected with hyperlinks. This will give user an overview of the target document without costing too much bandwidth resource before proceeding further.

As to a further discussion of the manner of usage and operation of the present invention, the same should be apparent from the above description. Accordingly, no further discussion relating to the manner of usage and operation will be provided.

With respect to the above description then, it is to be realized that variations and extensions of the embodiment are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method for structured document transcoding comprising:
    generating, in response to receiving a structured document including a first ordered list of document elements in a markup language, a source document based on a document element of the first ordered list of document elements, the source document including a second ordered list of document elements in the markup language;
    replacing the document element with the second ordered list of document elements to insert the source document into the first ordered list of document elements to update the structured document;
    building a document tree including a plurality of tree nodes associated with document elements of the updated structured document;
    generating a plurality of new document trees according to the document tree such that the plurality of new document trees are ordered and hierarchically linked, the new document trees being associated with new document elements;

determining sizing parameters for one or more new tree nodes of at least one of the new document trees; and producing, from at least one of the new document trees, one structured data such that it is suitable for a browser to render in a browser device, wherein the one or more new tree nodes including one root node and one or more leaf nodes, the determined sizing parameters of the root node satisfying constraints associated with a display area and processing capacity for the browser, each of the one or more new tree nodes except the root node having a single parent node belonging to the one or more new tree nodes and each of the one or more new tree nodes except the one or more leaf nodes having at least one child node belonging to one or more new tree nodes, and wherein each leaf node is associated with no more than one of the plurality of new document trees.

2. The method of claim 1 wherein the sizing parameters include minimum display width.

3. The method of claim 1 wherein the generating the source document comprises executing executable codes included in the document element to provide dynamic document elements in the source document.

4. The method of claim 3, wherein the executable codes include script codes.

5. The method of claim 4, wherein the executing is based on a document object model according to the structured document.

6. The method of claim 1, wherein the generating the source document comprises retrieving the source document based on a link data included in the document element.

7. The method of claim 6 wherein the retrieving comprises sending an HTTP request according to the link data and receiving an HTTP response.

8. The method of claim 6 wherein the retrieving comprises sending an HTTPS request according to the link data and receiving an HTTPS response.

9. The method of claim 6 wherein the document element is associated with a FRAME element or an IFRAME element.

10. The method of claim 1, further comprising:
assigning a target browser display width to the root node of the at least one new document tree as a maximum width allowed for the root node;
deciding a maximum width allowed for at least one new tree node of the at least one new document tree given a maximum width allowed for its single parent node such that a minimum width sizing parameter assigned to the single parent node has a value no greater than the given maximum width;
determining a scaling factor for the at least one new tree node; and
applying the scaling factor to sizing attributes of new document elements associated with the at least one new tree node.

11. The method of claim 1 wherein the generating a plurality of new document trees comprises converting at least one tree nodes to at least one new tree nodes associated with one or more new document elements, the one or more new document elements being associated with a second markup language.

12. The method of claim 11 wherein the second markup language is HTML, CHTML, XHTML, XML, WML or HDML.

13. The method of claim 12 wherein the converting converts the one or more tree nodes associated with FRAMESET elements into the one or more new tree nodes associated with TABLE elements.

14. The method of claim 12 wherein the converting converts the one or more tree nodes associated with FRAME elements into the one or more new tree nodes associated with TD elements.

15. The method of claim 1 wherein the markup language is HTML.

16. The method of claim 1 wherein the generating a plurality of new document trees comprises composing a catalog document tree, containing tree nodes linked to the new document trees, to provide a summary sizing information for at least one new document tree and the hierarchical linking relationship amongst the new document trees.

17. The method of claim 1 wherein the structured data is a structured document in a second markup language.

18. The method of claim 1 wherein the browser device is palmtops, PDAs or data enabled cell phones wirelessly connected with a small display areas and processing capacities.

19. The method of claim 1, wherein the updated structured document includes a third ordered list of document elements having an order according to the first ordered list of document elements and the second ordered list of document elements, wherein the new document trees are ordered based on the order.

20. The method of claim 19, wherein the new document trees include a first new document tree and a second new document tree, the first new document tree having a first new document tree node associated with first new document elements converted from first document elements of the updated structured document, the second new document tree having a second new document tree node associated with second new document elements converted from second document elements of the updated structured document, and wherein the first new document tree and the second new document tree are ordered in the new document tree according to the first document elements and the second document elements based on the order.

21. The method of claim 20, wherein the first new document tree includes a new tree node associated with a hyperlink element linking the second new document tree.

22. The method of claim 21, wherein the hyperlink element includes an order indicator indicating an order of the second new document tree within the ordered new document trees.

23. The method of claim 21, wherein the hyperlink element includes a hierarchical indicator indicating a relative level of hierarchy between the first new document tree and the second new document tree within the hierarchically linked new document trees.

24. A method of transcoding a source structured document in a markup language for a browser to render while satisfying constraints from a display area and processing capacity of a browser device, the constraints including a plurality of layout constraints, the method comprises:
building a document tree from the source structured document;
assigning one or more layout constraints and sizing parameters to a plurality of tree nodes of the document tree;
splitting or partitioning an oversized tree node of the plurality of tree nodes into one or more new tree nodes of new document trees that a satisfy one of the plurality of layout constraints wherein the new document trees are hierarchically linked; and ordering the new document trees in an order consistent with a two-dimensional navigation sequence of a display page for the source structured document, wherein at least one new tree node of the new document trees including sizing attributes scalable to satisfy the constraints for at least one of the new document trees to produce one structured data such that it is suitable for input to the browser, wherein the at least one new document tree comprises one or more new tree nodes including one root node and one or more leaf nodes, each new tree node except the root node having a single parent node in the one or more new tree nodes, each of the one or more new tree nodes except the one or more leaf nodes having at least one child node in the one or more new tree nodes, and each leaf node belonging to no more than one of the new document trees.

25. The method of claim 24 wherein the two-dimensional navigation sequence is top-to-down coupled with either left-to-right or right-to-left.

26. The method of claim 24 wherein the partitioning comprises selecting a set of descendant nodes of the second oversized tree node such that at least one selected descendant node is associated with at least one of the one or more layout constraints assigned to the second oversized tree node;

establishing a partition tree by copying or relocating corresponding tree nodes from the document tree to the partition tree such that
(i) at least one sub tree rooted at one of the selected set of descendant nodes gets removed from the document tree;
(ii) an ancestor tree node of the one of the selected set of descendant nodes has more than one child nodes copied from the document tree; and
(iii) ordering relationships among tree nodes of the partition tree is the same as that of the corresponding tree nodes in the document tree; and inserting cross linking nodes to the partition tree and the document tree to create a corresponding hierarchical linking relationship.

27. The method of claim 24 wherein the ordering comprises inserting cross-linking nodes to the new document trees to cause at least one of the new document trees resulting from the partitioning to have references to its neighboring new document trees according to the order.

28. The method of claim 24 wherein the one or more layout constraints assigned to the plurality of tree nodes include a vertical column or a horizontal row over a set of descendant nodes of one of the plurality of tree nodes.

29. The method of claim 28 wherein a value of one of the sizing parameters is determined as a cumulative summation, over a set of the one or more layout constraints assigned to the one of the plurality of tree nodes, of maximum corresponding value of the same sizing parameter within the set of descendant nodes associated with the set of the one or more layout constraints.

30. The method of claim 28 wherein one of the sizing parameters assigned to the one of the plurality of tree nodes has a value is no less than at least one corresponding value of the same sizing parameter of the set of descendant nodes associated with the vertical column constraint.

31. The method of claim 28 wherein one of the sizing parameters assigned to the one or the plurality of tree nodes has a value no less than a cumulative summation of at least one corresponding value of the same sizing parameter of the set of descendant nodes associated with the horizontal row constraint.

32. The method of claim 28 wherein the splitting or partitioning modifies the horizontal row layout constraint assigned to the oversized tree node.

33. The method of claim 24 wherein the sizing parameters comprises a scalable width, a minimum width, an image area and a character number.

34. The method of claim 33 wherein the minimum width sizing parameter of the oversized tree node has a value exceeding a width threshold value associated with the one of the plurality of layout constraints.

35. The method of claim 24 wherein one of the sizing parameters assigned to one of the plurality of tree nodes is a cumulative summation of corresponding values of the same sizing parameter of one or more of its child nodes.

36. A computer readable medium encoded with a plurality of computer-executable instructions which, when executed by a processing system causes the processing system to perform a method for structured document transcoding, the method comprising:

generating, in response to receiving a structured document including a first ordered list of document elements in a markup language, a source document based on a document element of the first ordered list of document elements, the source document including a second ordered list of document elements in the markup language;

replacing the document element with the second ordered list of document elements to insert the source document into the first ordered list of document elements to update the structured document;

building a document tree including a plurality of tree nodes associated with document elements of the updated structured document;

generating a plurality of new document trees according to the document tree such that the plurality of new document trees are ordered and hierarchically linked;

determining sizing parameters for one or more new tree nodes of at least one of the new document trees; and producing, from the at least one new document trees, one structured data such that it is suitable for a browser to render in a browser device, wherein the one or more new tree nodes including one root node and one or more leaf nodes, the determined sizing parameters of the root node satisfying constraints associated with a display area and processing capacity for the browser, each of the one or more new tree nodes except the root node having a single parent node belonging to the one or more new tree nodes and each of the one or more new tree nodes except the one or more leaf nodes having at least one child node belonging to one or more new tree nodes, and wherein each leaf node is associated with no more than one of the plurality of new document trees.

37. The computer readable medium of claim 36 wherein the sizing parameters include minimum display width.

38. The computer readable medium of claim 37 further comprising:

assigning a target browser display width to the root node of at least one the new document tree as a maximum width allowed for the root node;

deciding a maximum width allowed for at least one new tree node of the at least one new document tree given a maximum width allowed for its single parent node such that a minimum width sizing parameter assigned to the single parent node has a value no greater than the given maximum width;

determining a scaling factor for the at least one new tree node; and applying the scaling factor to sizing attributes of new document elements associated with the at least one new tree node.

39. The computer readable medium of claim 36, wherein the generating the source document comprises executing executable codes included in the document element to provide dynamic document elements in the source document.

40. The computer readable medium of claim 36, wherein the generating the source document comprises retrieving the source document based on a link data included in the document element.

41. The computer readable medium of claim 36 wherein the generating a plurality of new document trees comprises converting at least one tree nodes to at least one new tree nodes associated with one or more new document elements, the one or more new document elements being associated with a second markup language.

42. The computer readable medium of claim 41 wherein the second markup language is HTML, CHTML, XHTML, XML, WML or HDML.

43. The computer readable medium of claim 36 wherein the markup language is HTML.

44. The computer readable medium of claim 36 wherein the generating a plurality of new document trees comprises composing a catalog document tree, containing tree nodes linked to the new document trees, to provide a summary sizing information for at least one new document tree and the hierarchical linking relationship amongst the new document trees.

45. The computer readable medium of claim 36 wherein the structured data is a structured document in a second markup language.

46. The computer readable medium of claim 36 wherein the browser device is palmtops, PDAs or data-enabled cell phones wirelessly connected with a small display areas and processing capacities.

47. The computer readable medium of claim 36, wherein the undated structured document includes a third ordered list of document elements having an order according to the first ordered list of document elements and the second ordered list of document elements, wherein the new document trees are ordered based on the order.

48. The computer readable medium of claim 47, wherein the new document trees include a first new document tree and a second new document tree, the first new document tree having a first new document tree node associated with first new document elements converted from first document elements of the updated structured document, the second new document tree having a second new document tree node associated with second new document elements converted from second document elements of the updated structured document, and wherein the first new document tree and the second new document tree are ordered in the new document tree according to the first document elements and the second document elements based on the order.

49. The computer readable medium of claim 48, wherein the first new document tree includes a new tree node associated with a hyperlink element linking the second new document tree.

50. The computer readable medium of claim 49, wherein the hyperlink element includes an order indicator indicating an order of the second new document tree within the ordered new document trees.

51. The computer readable medium of claim 49, wherein the hyperlink element includes a hierarchical indicator indicating a relative level of hierarchy between the first new document tree and the second new document tree within the hierarchically linked new document trees.

52. A computer readable medium encoded with a plurality of computer-executable instructions which, when executed by a processing system, causes a data processing system to perform a method for transcoding a source structured document in a markup language for a browser to render a display page while satisfying constraints from a display area and processing capacity of a browser device, the constraints including a plurality of layout constraints, the method comprising:

building a document tree from the source structured document;

assigning one or more layout constraints and sizing parameters to a plurality of tree nodes of the document tree;

splitting or partitioning an oversized tree node of the plurality of tree nodes into one or more new tree nodes of new document trees that of tree nodes satisfy one of the plurality of layout constraints, wherein the new document trees are hierarchically linked; and ordering the new document trees in an order consistent with a two-dimensional navigation sequence of a display page for the source structured document, wherein at least one new tree node of the new document trees including sizing attributes scalable to satisfy the constraints for at least one of the new document trees to produce one structured data such that it is suitable for input to the browser, wherein the at least one new document tree comprises one or more tree nodes including one root node and more leaf nodes, each new tree node except the root node having a single parent node in the one or more new tree nodes, each of the one or more new tree nodes except the one or more leaf nodes having at least one child node in the one or more new tree nodes, and each leaf node belonging to no more than one of the new document trees.

53. The computer readable medium of claim 52 wherein the partitioning comprises selecting a set of descendant nodes of the second oversized tree node such that at least one selected descendant node is associated with at least one of the one or more layout constraints assigned to the second oversized tree node;

establishing a partition tree by copying or relocating corresponding tree nodes from the document tree to the partition tree such that (i) at least one sub tree rooted at one of the selected set of descendant nodes gets removed from the document tree;

(ii) an ancestor tree node of the one of the selected set of descendant nodes has more than one child nodes copied from the document tree; and (iii) ordering relationships among tree nodes of the partition tree is the same as that of the corresponding tree nodes in the document tree; and inserting cross linking nodes to the partition tree and the document tree to create a corresponding hierarchical linking relationship.

54. The computer readable medium of claim 52 wherein the one or more layout constraints assigned to the plurality of tree nodes include a vertical column or a horizontal row over a set of descendant nodes of one of the plurality of tree nodes.

55. The computer readable medium of claim 54 wherein a value of the one of the sizing parameters is determined as a cumulative summation, over a set of the one or more layout constraints assigned to the one of the plurality of tree nodes, of maximum corresponding value of the same sizing parameter within the set of descendant nodes associated with the set of the one or more layout constraints.

56. The computer readable medium of claim 54 wherein one of the sizing parameters assigned to the one of the plurality of tree nodes has a value no less than at least one corresponding value of the same sizing parameter of the set of descendant nodes associated with the vertical column constraint said.

57. The computer readable medium of claim 54 wherein one of the sizing parameters assigned to the one of the plurality of tree nodes has a value no less than a cumulative summation of at least one corresponding value of the same sizing parameter of the set of descendant nodes associated with the horizontal row constraint.

58. The computer readable medium of claim 54 wherein the splitting or partitioning modifies the horizontal row layout constraint assigned to the oversized tree node.

59. The computer readable medium of claim 52 wherein the sizing parameters comprise a scalable width, a minimum width, an image area and a character number.

60. The computer readable medium of claim 59 wherein the minimum width sizing parameter of the oversized tree node has a value exceeding a width threshold value associated with the one of the plurality of layout constraints.

61. The computer readable medium of claim 52 wherein one of the sizing parameters assigned to one of the plurality of tree nodes is a cumulative summation of corresponding values of the same sizing parameter of one or more of its child nodes.

62. An apparatus for structured document transcoding, comprising:
    means for generating in response to receiving of a structured document including a first ordered list of document elements in a markup language, a source document based on a document element of the first ordered list of document elements, the source document including a second ordered list of document elements in the markup language;
    means for replacing the document element with the second ordered list of document elements to insert the source document into the first ordered list of document elements to update the structured document;
    means for building a document tree including a plurality of tree nodes associated with document elements of the updated structured document;
    means for generating a plurality of new document trees according to the document tree such that the plurality of new document trees are ordered and hierarchically linked;
    means for determining sizing parameters for one or more new tree nodes of at least one of the new document trees; and
    means for producing, from the at least one of the new document trees, one structured data such that it is suitable for a browser to render in a browser device,
wherein the one or more new tree nodes including one root node and one or more leaf nodes, the determined sizing parameters of the root node satisfying constraints associated with a display area and processing capacity for the browser, each of the one or more new tree nodes except the root node having a single parent node belonging to the one or more new tree nodes and each of the one or more new tree nodes except the one or more leaf nodes having at least one child node belonging to one or more new tree nodes, and wherein each leaf node is associated with no more than one of the plurality of new document trees.

\* \* \* \* \*